(12) United States Patent
Yanagida et al.

(10) Patent No.: US 12,257,992 B2
(45) Date of Patent: Mar. 25, 2025

(54) VEHICLE BRAKE DEVICE AND VEHICLE BRAKE SYSTEM

(71) Applicant: DENSO CORPORATION, Kariya (JP)

(72) Inventors: Etsugou Yanagida, Kariya (JP); Daisuke Hokuto, Kariya (JP); Kunio Nanba, Kariya (JP)

(73) Assignee: DENSO CORPORATION, Kariya (JP)

( * ) Notice: Subject to any disclaimer, the term of this patent is extended or adjusted under 35 U.S.C. 154(b) by 371 days.

(21) Appl. No.: 17/837,561

(22) Filed: Jun. 10, 2022

(65) Prior Publication Data

US 2022/0297645 A1    Sep. 22, 2022

Related U.S. Application Data

(63) Continuation of application No. PCT/JP2020/046369, filed on Dec. 11, 2020.

(30) Foreign Application Priority Data

Dec. 13, 2019   (JP) .................................. 2019-225657

(51) Int. Cl.
| | |
|---|---|
| *B60T 8/17* | (2006.01) |
| *B60T 7/04* | (2006.01) |
| *B60T 7/06* | (2006.01) |
| *B60T 8/96* | (2006.01) |
| *B60T 17/22* | (2006.01) |

(52) U.S. Cl.
CPC ................ *B60T 8/17* (2013.01); *B60T 7/042* (2013.01); *B60T 7/06* (2013.01); *B60T 8/96* (2013.01); *B60T 17/22* (2013.01); *B60Y 2400/81* (2013.01)

(58) Field of Classification Search
CPC ... B60T 8/17; B60T 7/042; B60T 7/06; B60T 8/96; B60T 17/22; B60T 13/146; B60T 13/686; B60T 13/662; B60T 2220/04; G05G 1/30; G05G 5/03; B60Y 2400/81
See application file for complete search history.

(56) References Cited

U.S. PATENT DOCUMENTS

| 4,404,439 A | * | 9/1983 | Leighton | ................. | B60T 7/042 |
| | | | | | 200/61.89 |
| 5,954,407 A | * | 9/1999 | Schramm | .............. | B60T 8/3255 |
| | | | | | 303/155 |

(Continued)

FOREIGN PATENT DOCUMENTS

| DE | 198 36 690 | 2/2000 |
|---|---|---|
| JP | 2002-104153 | 4/2002 |

(Continued)

*Primary Examiner* — Bradley T King
*Assistant Examiner* — James K Hsiao
(74) *Attorney, Agent, or Firm* — Nixon & Vanderhye P.C.

(57) ABSTRACT

A vehicle brake device includes a brake pedal having a pedal part and a lever part rotatable about a rotational shaft according to an operation of the pedal part, a housing rotatably supporting the lever part and being located in a vehicle compartment of a vehicle and on a partition wall that separates an outside of the vehicle compartment and an inside of the vehicle compartment, and a reaction force generator connected to the housing and the lever part and configured to generate a reaction force on the lever part in accordance with a stroke amount of the brake pedal.

6 Claims, 28 Drawing Sheets

(56) References Cited

U.S. PATENT DOCUMENTS

| | | | | |
|---|---|---|---|---|
| 6,149,247 A * | 11/2000 | Hofmann | | B60T 8/4072 303/113.2 |
| 6,309,032 B1 * | 10/2001 | Kusano | | B60T 8/326 303/116.1 |
| 6,367,886 B1 * | 4/2002 | Shaw | | B60T 8/4086 303/50 |
| 6,526,844 B1 * | 3/2003 | Weis | | B60K 26/021 74/513 |
| 6,554,088 B2 * | 4/2003 | Severinsky | | B60K 6/22 180/65.23 |
| 6,591,710 B1 * | 7/2003 | Shaw | | G05G 1/30 74/513 |
| 6,612,416 B2 * | 9/2003 | Kupper | | B60W 30/18063 192/220 |
| 6,658,963 B2 * | 12/2003 | Yaddehige | | G05G 5/03 74/473.16 |
| 6,877,821 B2 * | 4/2005 | Yokoyama | | B60T 8/17616 303/113.1 |
| 7,425,042 B2 * | 9/2008 | Fujiwara | | B60T 7/042 303/114.1 |
| 7,866,761 B2 * | 1/2011 | Gerum | | B60T 8/321 303/127 |
| 8,007,055 B2 * | 8/2011 | Leiter | | B60T 7/085 701/70 |
| 8,757,734 B2 * | 6/2014 | Toyohira | | B60T 7/042 303/119.3 |
| 9,501,083 B2 * | 11/2016 | Zhou | | F02D 11/02 |
| 10,099,670 B2 * | 10/2018 | Ngomssu | | B60T 8/442 |
| 10,137,874 B2 * | 11/2018 | Pennala | | B60T 7/042 |
| 10,166,964 B2 * | 1/2019 | Lesinski, Jr. | | B60T 8/885 |
| 10,946,741 B1 * | 3/2021 | Kim | | B60T 7/06 |
| 2001/0015111 A1 * | 8/2001 | Rixon | | G05G 1/38 74/512 |
| 2001/0043009 A1 * | 11/2001 | Anderson | | G05G 5/03 303/3 |
| 2002/0108463 A1 * | 8/2002 | Shaw | | G05G 1/30 74/512 |
| 2005/0046273 A1 * | 3/2005 | Jung | | B60T 7/042 303/113.4 |
| 2005/0160867 A1 * | 7/2005 | Mannle | | B60T 7/042 74/512 |
| 2005/0235820 A1 * | 10/2005 | Fujiwara | | B60T 7/042 91/369.2 |
| 2006/0163941 A1 * | 7/2006 | Von Hayn | | B60T 7/042 303/155 |
| 2007/0170774 A1 * | 7/2007 | Gerum | | B60T 13/66 188/140 R |
| 2008/0196983 A1 * | 8/2008 | Von Hayn | | B60T 7/042 188/156 |
| 2011/0056327 A1 * | 3/2011 | Mazzucchi | | B62D 11/08 74/512 |
| 2011/0254358 A1 * | 10/2011 | Strengert | | B60T 13/745 303/3 |
| 2013/0020858 A1 * | 1/2013 | Maki | | B60T 8/4872 303/3 |
| 2013/0020859 A1 * | 1/2013 | Maki | | B60T 13/57 303/3 |
| 2016/0009267 A1 * | 1/2016 | Lesinski, Jr. | | B60T 7/12 303/10 |
| 2017/0282877 A1 * | 10/2017 | Besier | | B60T 8/885 |
| 2017/0361825 A1 * | 12/2017 | Drumm | | B60T 8/4081 |
| 2018/0037202 A1 * | 2/2018 | Pennala | | B60T 8/409 |
| 2018/0148019 A1 * | 5/2018 | Graham | | B60T 7/107 |
| 2018/0162332 A1 * | 6/2018 | Nakazawa | | B60T 7/22 |
| 2018/0273008 A1 * | 9/2018 | Kim | | B60T 13/58 |
| 2019/0100137 A1 * | 4/2019 | Wolf-Monheim | | B60T 17/22 |
| 2020/0290576 A1 | 9/2020 | Kobayashi et al. | | |
| 2022/0089135 A1 * | 3/2022 | Austermeier | | B60T 8/409 |
| 2023/0077416 A1 * | 3/2023 | Hong | | B60T 11/18 74/514 |

FOREIGN PATENT DOCUMENTS

| | | |
|---|---|---|
| JP | 2015-010613 | 1/2015 |
| JP | 2018-016161 | 2/2018 |

* cited by examiner

VEHICLE BRAKE DEVICE AND VEHICLE BRAKE SYSTEM

CROSS REFERENCE TO RELATED APPLICATIONS

The present application is a continuation application of International Patent Application No. PCT/JP2020/046369 filed on Dec. 11, 2020, which designated the U.S. and claims the benefit of priority from Japanese Patent Application No. 2019-225657 filed on Dec. 13, 2019. The entire disclosures of all of the above applications are incorporated herein by reference.

TECHNICAL FIELD

The present disclosure relates to a vehicle brake device and a vehicle brake system.

BACKGROUND

A vehicle brake device in which a brake pedal and a master cylinder are connected is conventionally known.

SUMMARY

According to an aspect of the present disclosure, a vehicle brake device includes a brake pedal, a housing and a reaction force generator. The brake pedal includes a pedal part and a lever part rotatable about a rotational shaft according to an operation of the pedal part. The housing rotatably supports the lever part and is located in a vehicle compartment of a vehicle and on a partition wall that separates an outside of the vehicle compartment and an inside of the vehicle compartment. The reaction force generator is connected to the housing and the lever part and generates a reaction force on the lever part in accordance with a stroke amount of the brake pedal.

BRIEF DESCRIPTION OF DRAWINGS

The details of one or more embodiments are set forth in the accompanying drawings and the description below. Other features and advantages will be apparent from the description and drawings, and from the claims.

FIG. 9 is a sectional view of the vehicle brake device when a brake pedal is stepped on.

DETAILED DESCRIPTION

Figure 1:
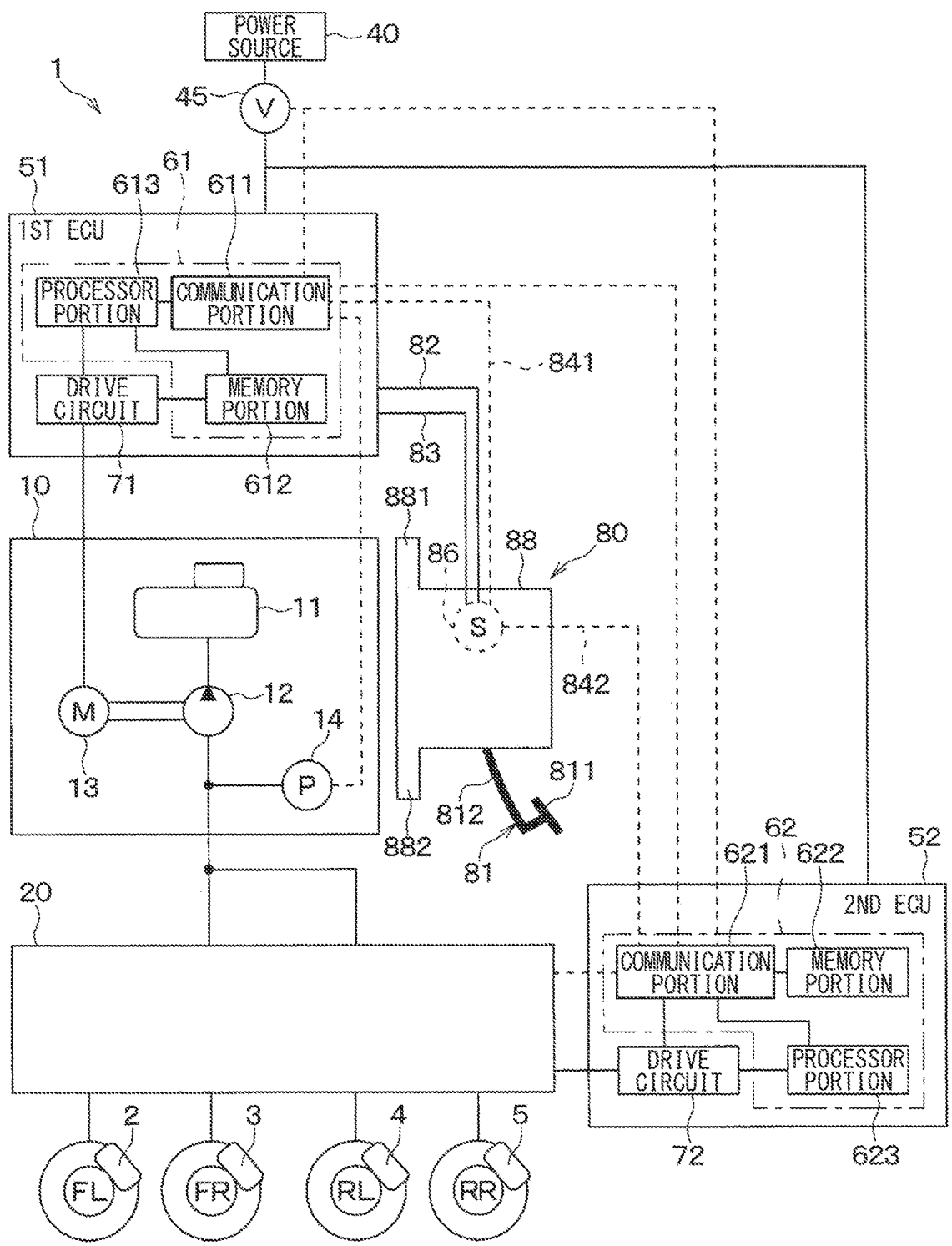
FIG. 1 is a configuration diagram of a vehicle brake system according to a first embodiment.

To begin with, examples of relevant techniques will be described. A vehicle brake device of a comparative example includes a brake pedal and a master cylinder which are connected.

According to a study by the inventors and the like, when the brake pedal and the master cylinder are connected, it may be necessary to adjust an initial position of the brake pedal and a stroke amount of the brake pedal from the initial position to a position where a hydraulic pressure in the master cylinder is generated. In addition, since the initial position and the stroke amount change due to aging deterioration of each part of the brake pedal and the master cylinder, readjustment of the initial position and the stroke amount may be required. However, since the brake pedal and the master cylinder are connected with a body of the vehicle interposed therebetween, adjustment of the brake pedal is relatively difficult.

According to an aspect of the present disclosure, a vehicle brake device includes a brake pedal, a housing and a reaction force generator. The brake pedal includes a pedal part and a lever part rotatable about a rotational shaft according to an operation of the pedal part. The housing rotatably supports the lever part and is located in a vehicle compartment of a vehicle and on a partition wall that separates an outside of the vehicle compartment and an inside of the vehicle compartment. The reaction force generator is connected to the housing and the lever part and generates a reaction force on the lever part in accordance with a stroke amount of the brake pedal.

According to another aspect of the present disclosure, a vehicle brake system includes a vehicle brake device, a first fluid pressure generator, a second fluid pressure generator, and a fluid pressure controller. The vehicle brake device includes a brake pedal, a stroke sensor, a housing and a reaction force generator. The brake pedal includes a pedal part and a lever part rotatable about a rotational shaft according to an operation of the pedal part. The stroke sensor outputs a signal in accordance with a stroke amount of the brake pedal. The housing rotatably supports the lever part and is located in a vehicle compartment of a vehicle and on a partition wall that separates an outside of the vehicle compartment and an inside of the vehicle compartment. The reaction force generator is connected to the housing and the lever part and generates a reaction force on the lever part in accordance with the stroke amount. The first fluid pressure generator generates a fluid pressure for braking the vehicle. The second fluid pressure generator generates a fluid pressure for braking the vehicle. The fluid pressure controller controls the fluid pressure generated by the first fluid pressure generator and the fluid pressure generated by the second fluid pressure generator based on the signal from the stroke sensor.

Thus, adjustment of the brake pedal is facilitated.

Hereinafter, embodiments will be described referring to drawings. Among the respective embodiments, parts which are the same or equivalent to each other are assigned the same reference numeral, and explanations thereof will be omitted.

First Embodiment

A vehicle brake device 80 according to a first embodiment is used in a vehicle brake system 1 that controls a left front wheel FL, a right front wheel FR, a left rear wheel RL, and a right rear wheel RR, which are wheels of a vehicle 6. First, the vehicle brake system 1 will be described.

As illustrated in FIG. 1, the vehicle brake system 1 includes a left front wheel cylinder, a right front wheel cylinder, a left rear wheel cylinder, and a right rear wheel cylinder. The vehicle brake system 1 also includes a first actuator 10, a power source 40, a voltage sensor 45, a first ECU 51, a second actuator 20, a second ECU 52, and the vehicle brake device 80. A wheel cylinder is hereinafter referred to as W/C for convenience. The ECU is an abbreviation of Electronic Control Unit.

The left front wheel W/C 2 is disposed on the left front wheel FL. The right front wheel W/C 3 is disposed on the right front wheel FR. The left rear wheel W/C 4 is disposed on the left rear wheel RL. The right rear wheel W/C 5 is disposed on the right rear wheel RR. The left front wheel W/C 2, the right front wheel W/C 3, the left rear wheel W/C 4, and the right rear wheel W/C 5 are connected to corresponding brake pads (not illustrated) of the vehicle 6.

The first actuator 10 corresponds to a first fluid pressure generator, and generates a brake fluid pressure. In addition, the first actuator 10 increases the brake fluid pressure to increase the brake fluid pressure of each of the left front wheel W/C 2, the right front wheel W/C 3, the left rear wheel W/C 4, and the right rear wheel W/C 5. Specifically, the first actuator 10 includes a reservoir 11, a first pump 12, a first actuator motor 13, and a first pressure sensor 14.

The reservoir 11 stores brake fluid such as oil, and also supplies the brake fluid to the first pump 12.

The first pump 12 is driven by the first actuator motor 13. Thus, the first pump 12 increases the pressure of the brake fluid from the reservoir 11. The brake fluid with the increased fluid pressure flows from the first actuator 10 to the second actuator 20.

The first pressure sensor 14 outputs, to the first ECU 51 described later, a signal in accordance with the fluid pressure of the brake fluid flowing to the second actuator 20.

The power source 40 supplies power to the first ECU 51 and the second ECU 52.

The voltage sensor 45 outputs, to the first ECU 51 described later, a signal in accordance with a voltage applied from the power source 40 to the first ECU 51 and the second ECU 52.

The first ECU 51 corresponds to a first fluid pressure controller, and controls the first actuator 10 by controlling the first actuator motor 13. Specifically, the first ECU 51 includes a first microcontroller 61 and a first drive circuit 71.

The first microcontroller 61 corresponds to a first fluid pressure control portion, and controls the first actuator 10 by controlling the first drive circuit 71. Specifically, the first microcontroller 61 includes a first communication portion 611, a first memory portion 612, and a first control processor portion 613.

The first communication portion 611 includes an interface for communicating with the first pressure sensor 14 and an interface for communicating with the voltage sensor 45. The first communication portion 611 also includes an interface for communicating with a second microcontroller 62 of the second ECU 52 described later and an interface for communicating with a stroke sensor 86 of the vehicle brake device 80 described later.

The first memory portion 612 includes a non-volatile memory such as a ROM and a flash memory, and a volatile memory such as a RAM. The non-volatile memory and the volatile memory are both non-transitory tangible memory media.

The first control processor portion 613 includes a CPU or the like, and outputs a signal for driving the first actuator motor 13 to the first drive circuit 71 by executing a program stored in the ROM of the first memory portion 612.

The first drive circuit 71 includes, for example, a switching element, and drives the first actuator 10 by supplying power to the first actuator motor 13 on the basis of a signal from the first control processor portion 613.

Figure 2:
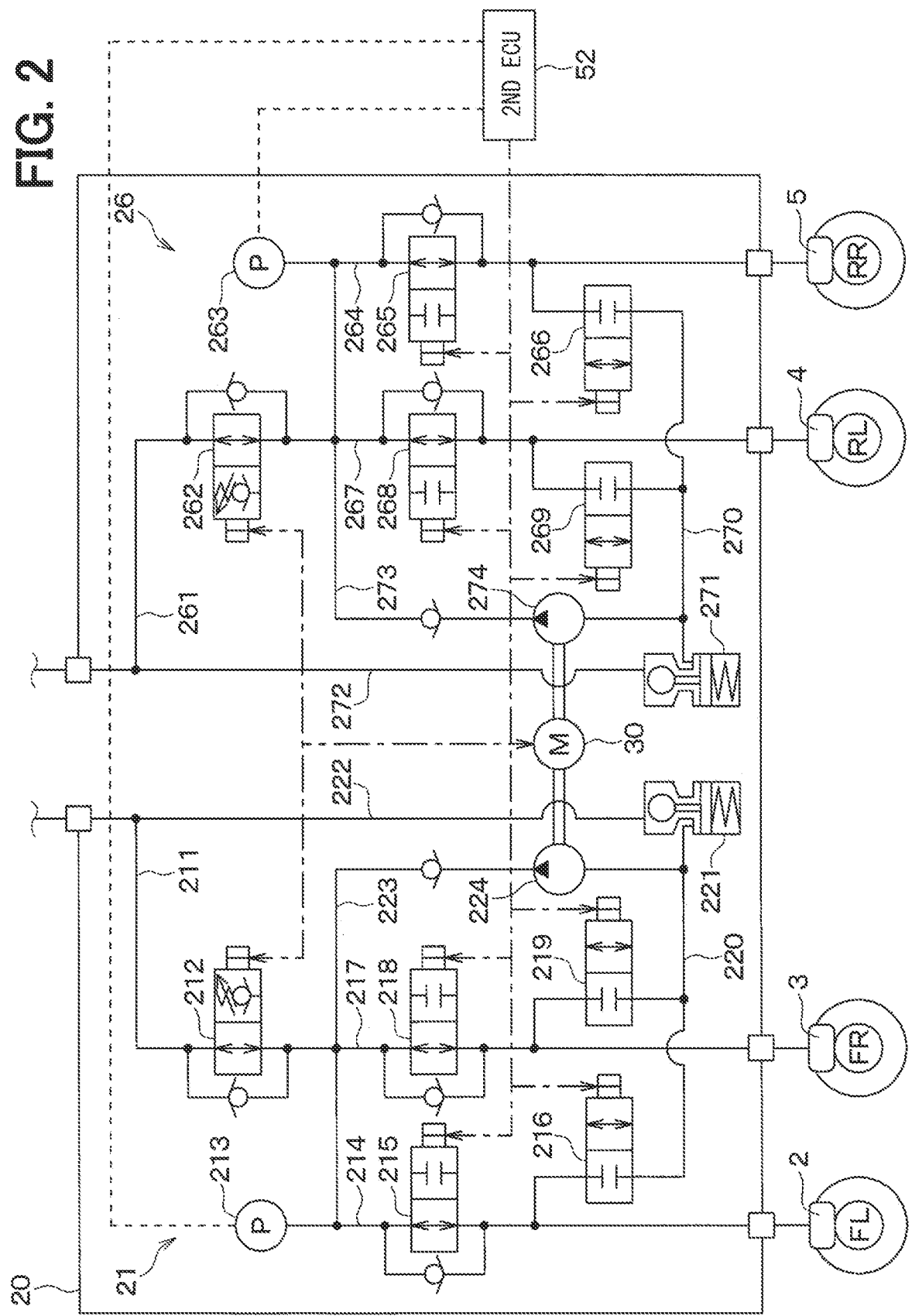
FIG. 2 is a configuration diagram of a second actuator.

The second actuator 20 corresponds to a second fluid pressure generator, and generates a brake fluid pressure. In addition, the second actuator 20 controls the brake fluid pressure of each of the left front wheel W/C 2, the right front wheel W/C 3, the left rear wheel W/C 4, and the right rear wheel W/C 5 on the basis of a signal from the second ECU 52 described later. For example, as illustrated in FIG. 2, the second actuator 20 includes a first piping system 21, a second piping system 26, and a second actuator motor 30.

The first piping system 21 controls the brake fluid pressures of the left front wheel W/C 2 and the right front wheel W/C 3. Specifically, the first piping system 21 includes a first main pipeline 211, a first differential pressure control valve 212, a second pressure sensor 213, a first branch pipeline 214, a first pressure-increasing control valve 215, and a first pressure-reducing control valve 216. The first piping system 21 also includes a second branch pipeline 217, a second pressure-increasing control valve 218, a second pressure-reducing control valve 219, a first pressure-reducing pipeline 220, a first pressure-regulating reservoir 221, a first auxiliary pipeline 222, a first return pipeline 223, and a second pump 224.

The first main pipeline 211 is connected to the first actuator 10, and transmits the brake fluid pressure from the first actuator 10 to the first differential pressure control valve 212.

The first differential pressure control valve 212 controls a differential pressure between upstream and downstream of the first main pipeline 211 by a signal from the second ECU 52 described later. For example, when the brake fluid pressure on the left front wheel W/C 2 and right front wheel W/C 3 side is higher than the brake fluid pressure on the first actuator 10 side by a predetermined pressure or more, the first differential pressure control valve 212 allows the brake fluid to flow from the left front wheel W/C 2 and right front wheel W/C 3 side to the first actuator 10 side. Thus, the brake fluid pressure on the left front wheel W/C 2 and right front wheel W/C 3 side is maintained so as not to be higher than the brake fluid pressure on the first actuator 10 side by a predetermined pressure or more.

The second pressure sensor 213 outputs, to the second ECU 52 described later, a signal in accordance with the brake fluid pressure downstream of the first differential pressure control valve 212.

The first branch pipeline 214 guides the brake fluid from the first differential pressure control valve 212 to the first pressure-increasing control valve 215.

The first pressure-increasing control valve 215 is a normally open two-position electromagnetic valve capable of controlling a communicating state and a cutoff state. Specifically, when a solenoid coil (not illustrated) of the first pressure-increasing control valve 215 is not energized, the first pressure-increasing control valve 215 is switched to a communicating state to allow the brake fluid to flow to the left front wheel W/C 2 and the first pressure-reducing control valve 216. When the solenoid coil (not illustrated) of the first pressure-increasing control valve 215 is energized, the first pressure-increasing control valve 215 is switched to a cutoff state to cut off the flow of the brake fluid to the left front wheel W/C 2 and the first pressure-reducing control valve 216.

The first pressure-reducing control valve 216 is a normally closed two-position electromagnetic valve capable of controlling a cutoff state and a communicating state. Specifically, when a solenoid coil (not illustrated) of the first pressure-reducing control valve 216 is not energized, the first pressure-reducing control valve 216 is switched to a cutoff state to cut off the flow of the brake fluid to the first pressure-reducing pipeline 220 described later. When the solenoid coil (not illustrated) of the first pressure-reducing control valve 216 is energized, the first pressure-reducing control valve 216 is switched to a communicating state to allow the brake fluid to flow to the first pressure-reducing pipeline 220 described later.

The second branch pipeline 217 guides the brake fluid from the first differential pressure control valve 212 to the second pressure-increasing control valve 218.

In a similar manner to the first pressure-increasing control valve 215, the second pressure-increasing control valve 218 is a normally open two-position electromagnetic valve. Specifically, when a solenoid coil (not illustrated) of the second pressure-increasing control valve 218 is not energized, the second pressure-increasing control valve 218 is switched to a communicating state to allow the brake fluid to flow to the right front wheel W/C 3 and the second pressure-reducing control valve 219. When the solenoid coil (not illustrated) of the second pressure-increasing control valve 218 is energized, the second pressure-increasing control valve 218 is switched to a cutoff state to cut off the flow of the brake fluid to the right front wheel W/C 3 and the second pressure-reducing control valve 219.

In a similar manner to the second pressure-reducing control valve 219, the second pressure-reducing control valve 219 is a normally closed two-position electromagnetic valve. Specifically, when a solenoid coil (not illustrated) of the second pressure-reducing control valve 219 is not energized, the second pressure-reducing control valve 219 is switched to a cutoff state to cut off the flow of the brake fluid to the first pressure-reducing pipeline 220 described later. When the solenoid coil (not illustrated) of the second pressure-reducing control valve 219 is energized, the second pressure-reducing control valve 219 is switched to a communicating state to allow the brake fluid to flow to the first pressure-reducing pipeline 220 described later.

The first pressure-reducing pipeline 220 guides the brake fluid from the first pressure-reducing control valve 216 and the second pressure-reducing control valve 219 to the first pressure-regulating reservoir 221.

The first auxiliary pipeline 222 branches from the first main pipeline 211, and guides the brake fluid from the first actuator 10 to the first pressure-regulating reservoir 221.

The first pressure-regulating reservoir 221 stores the brake fluid that has flowed from the first pressure-reducing control valve 216 and the second pressure-reducing control valve 219 via the first pressure-reducing pipeline 220. In addition, the first pressure-regulating reservoir 221 stores the brake fluid that has flowed from the first actuator 10 via the first auxiliary pipeline 222. Furthermore, when the brake fluid is sucked by the second pump 224 described later, the first pressure-regulating reservoir 221 adjusts flow rates of these brake fluids to be stored.

The first return pipeline 223 is connected among the first differential pressure control valve 212, the first pressure-increasing control valve 215, and the second pressure-increasing control valve 218. The first return pipeline 223 is also connected to the second pump 224.

The second pump 224 is connected to the first pressure-reducing pipeline 220, and is driven by the second actuator motor 30 corresponding to a second motor. Thus, the second pump 224 sucks the brake fluid stored in the first pressure-regulating reservoir 221. The sucked brake fluid flows among the first differential pressure control valve 212, the first pressure-increasing control valve 215, and the second pressure-increasing control valve 218 via the first return pipeline 223. Thus, the brake fluid pressure of each of the left front wheel W/C 2 and the right front wheel W/C 3 increases.

The second piping system 26 controls the brake fluid pressures of the left rear wheel W/C 4 and the right rear wheel W/C 5. Specifically, the second piping system 26 includes a second main pipeline 261, a second differential pressure control valve 262, a third pressure sensor 263, a third branch pipeline 264, a third pressure-increasing control valve 265, and a third pressure-reducing control valve 266. The second piping system 26 also includes a fourth branch pipeline 267, a fourth pressure-increasing control valve 268, a fourth pressure-reducing control valve 269, a second pressure-reducing pipeline 270, a second pressure-regulating reservoir 271, a second auxiliary pipeline 272, a second return pipeline 273, and a third pump 274.

Here, the second piping system 26 is configured in a similar manner to the first piping system 21. Thus, the left front wheel W/C 2 described above can be replaced with the right rear wheel W/C 5. The right front wheel W/C 3 described above can be replaced with the left rear wheel W/C 4. Furthermore, the second main pipeline 261 corresponds to the first main pipeline 211. The second differential pressure control valve 262 corresponds to the first differential pressure control valve 212. The third pressure sensor 263 corresponds to the second pressure sensor 213. The third branch pipeline 264 corresponds to the first branch pipeline 214. The third pressure-increasing control valve 265 corresponds to the first pressure-increasing control valve 215. The third pressure-reducing control valve 266 corresponds to the first pressure-reducing control valve 216. The fourth branch pipeline 267 corresponds to the second branch pipeline 217. The fourth pressure-increasing control valve 268 corresponds to the second pressure-increasing control valve 218. The fourth pressure-reducing control valve 269 corresponds to the second pressure-reducing control valve 219. The second pressure-reducing pipeline 270 corresponds to the first pressure-reducing pipeline 220. The second pressure-regulating reservoir 271 corresponds to the first pressure-regulating reservoir 221. The second auxiliary pipeline 272 corresponds to the first auxiliary pipeline 222. The second return pipeline 273 corresponds to the first return pipeline 223. The third pump 274 corresponds to the second pump 224.

The second ECU 52 corresponds to a second fluid pressure controller, and controls the second actuator 20 by controlling each valve of the second actuator 20, the second actuator motor 30, and the like. Specifically, the second ECU 52 includes the second microcontroller 62 and a second drive circuit 72.

The second microcontroller 62 corresponds to a second fluid pressure control portion, and controls the second actuator 20 by controlling the second drive circuit 72. Specifically, the second microcontroller 62 includes a second communication portion 621, a second memory portion 622, and a second control processor portion 623.

The second communication portion 621 includes an interface for communicating with the second pressure sensor 213, an interface for communicating with the third pressure sensor 263, and an interface for communicating with the voltage sensor 45. The second communication portion 621 also includes an interface for communicating with the first communication portion 611 of the first microcontroller 61 and an interface for communicating with the stroke sensor 86 of the vehicle brake device 80 described later.

The second memory portion 622 includes a non-volatile memory such as a ROM and a flash memory, and a volatile memory such as a RAM. The non-volatile memory and the volatile memory are both non-transitory tangible memory media.

The second control processor portion 623 includes a CPU or the like, and outputs a signal for driving the second actuator motor 30 to the second drive circuit 72 by executing a program stored in the ROM of the second memory portion 622.

The second drive circuit 72 includes, for example, a switching element, and drives the second actuator 20 by supplying power to each valve of the second actuator 20 and the second actuator motor 30 on the basis of a signal from the second control processor portion 623.

Figure 3:
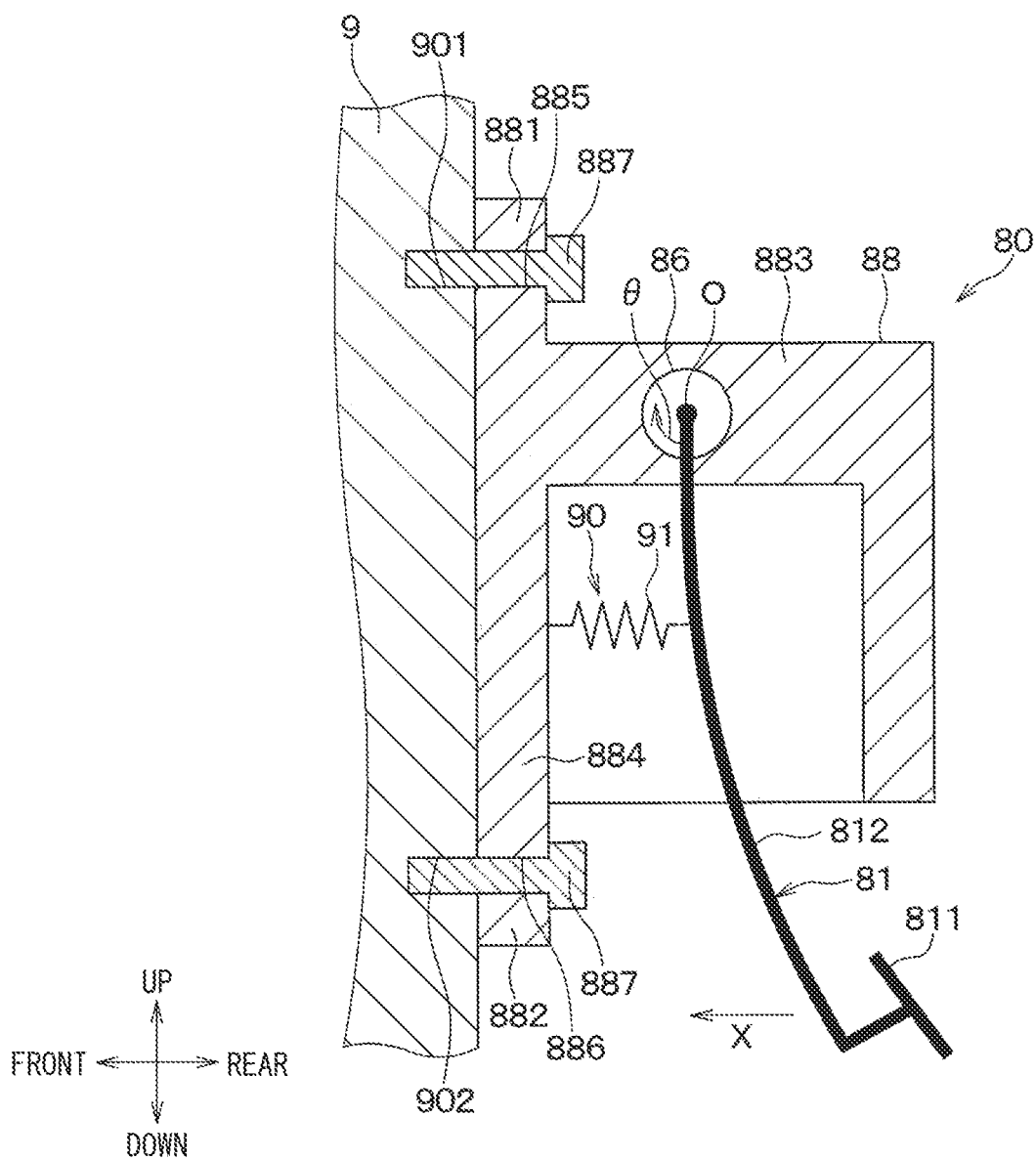
FIG. 3 is a sectional view of a vehicle brake device.
Figure 4:
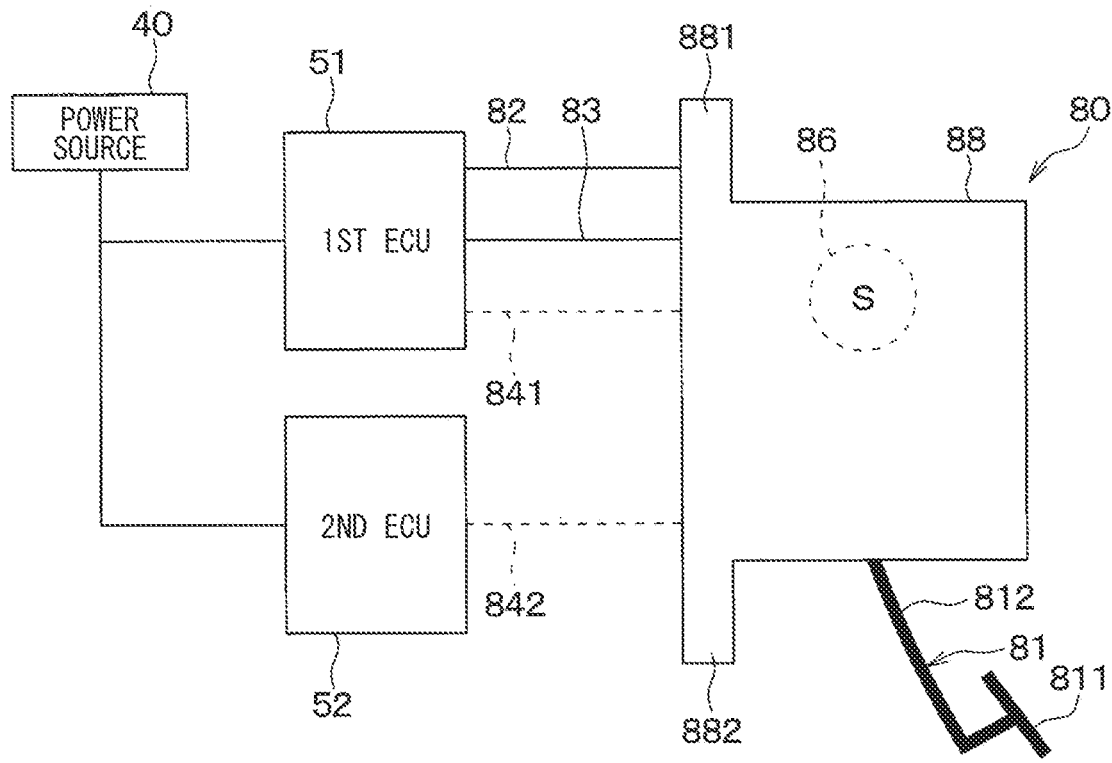
FIG. 4 is a wire diagram of the vehicle brake system.

As illustrated in FIGS. 1, 3, and 4, the vehicle brake device 80 includes a brake pedal 81, a sensor power source wire 82, a sensor ground wire 83, a first sensor output wire 841, and a second sensor output wire 842. The vehicle brake device 80 also includes the stroke sensor 86, a housing 88, and a reaction force generator 90.

The brake pedal 81 is operated by being stepped on by a driver of the vehicle 6. Specifically, the brake pedal 81 includes a pedal part 811 and a lever part 812. The pedal part 811 is stepped on by the driver of the vehicle 6. The lever part 812 is connected to the pedal part 811, and rotates about a rotational shaft O when the driver of the vehicle 6 steps on the pedal part 811.

As illustrated in FIGS. 1 and 4, the sensor power source wire 82 is connected to the first ECU 51 and the stroke sensor 86 described later. Thus, power from the power source 40 is supplied to the stroke sensor 86 via the first ECU 51 and the sensor power source wire 82. The sensor power source wire 82 may be connected to the second ECU 52 and the stroke sensor 86 described later. Thus, power from the power source 40 is supplied to the stroke sensor 86 via the second ECU 52 and the sensor power source wire 82.

The sensor ground wire 83 is connected to the first ECU 51 and the stroke sensor 86 described later. The sensor ground wire 83 may be connected to the second ECU 52 and the stroke sensor 86 described later.

The first sensor output wire 841 is connected to the first ECU 51 and the stroke sensor 86.

The second sensor output wire 842 is connected to the second ECU 52 and the stroke sensor 86.

Figure 5:
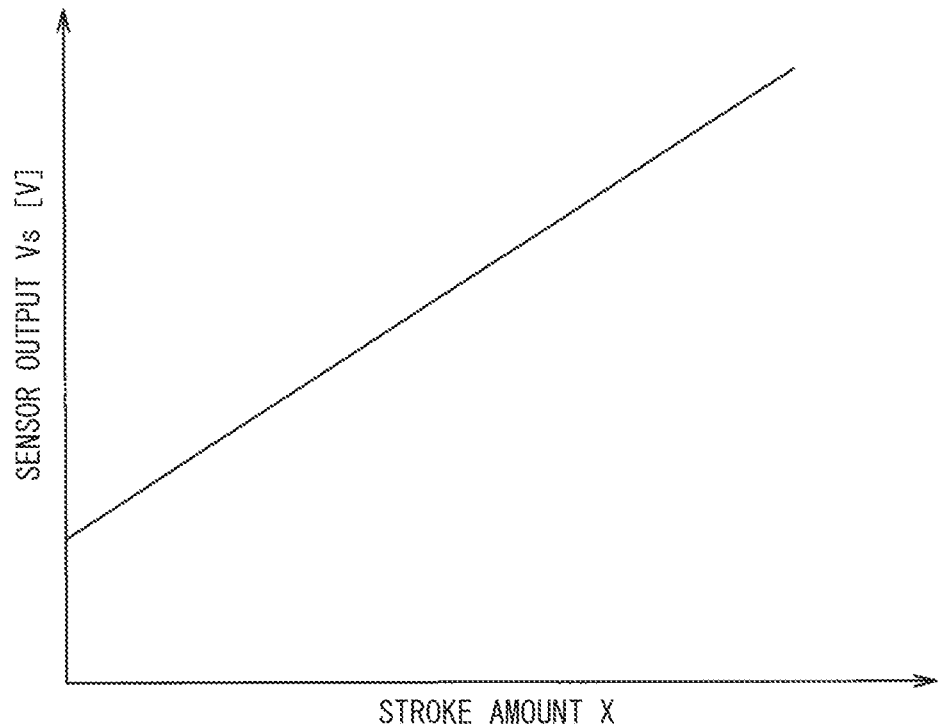
FIG. 5 is a diagram illustrating a relationship between a stroke amount and a sensor output.

As illustrated in FIG. 3, the stroke sensor 86 is disposed, for example, next to the rotational shaft O of the lever part 812. As illustrated in FIGS. 1 and 4, the stroke sensor 86 outputs, to the first ECU 51 via the first sensor output wire 841, a signal in accordance with a stroke amount X, which is an amount of operation on the brake pedal 81 by a pedal force of the driver of the vehicle 6. Furthermore, the stroke sensor 86 outputs, to the second ECU 52 via the second sensor output wire 842, the signal in accordance with the stroke amount X of the brake pedal 81. Here, the stroke amount X is, for example, a translational movement amount of the pedal part 811 toward the front of the vehicle 6. Furthermore, as illustrated in FIG. 5, the stroke amount X and a sensor output Vs of the stroke sensor 86 are adjusted so as to have a linear relationship. Here, the sensor output Vs is represented by, for example, the voltage. The stroke sensor 86 may output a signal in accordance with a rotation angle $\theta$ about the rotational shaft O of the lever part 812 to the first ECU 51 via the first sensor output wire 841. Furthermore, the stroke sensor 86 may output the signal in accordance with the rotation angle $\theta$ of the brake pedal 81 to the second ECU 52 via the second sensor output wire 842. At this time, the rotation angle $\theta$ and the signal of the stroke sensor 86 are adjusted so as to have a linear relationship, in a similar manner to the relationship between the stroke amount X and the sensor output Vs.

Figure 6:
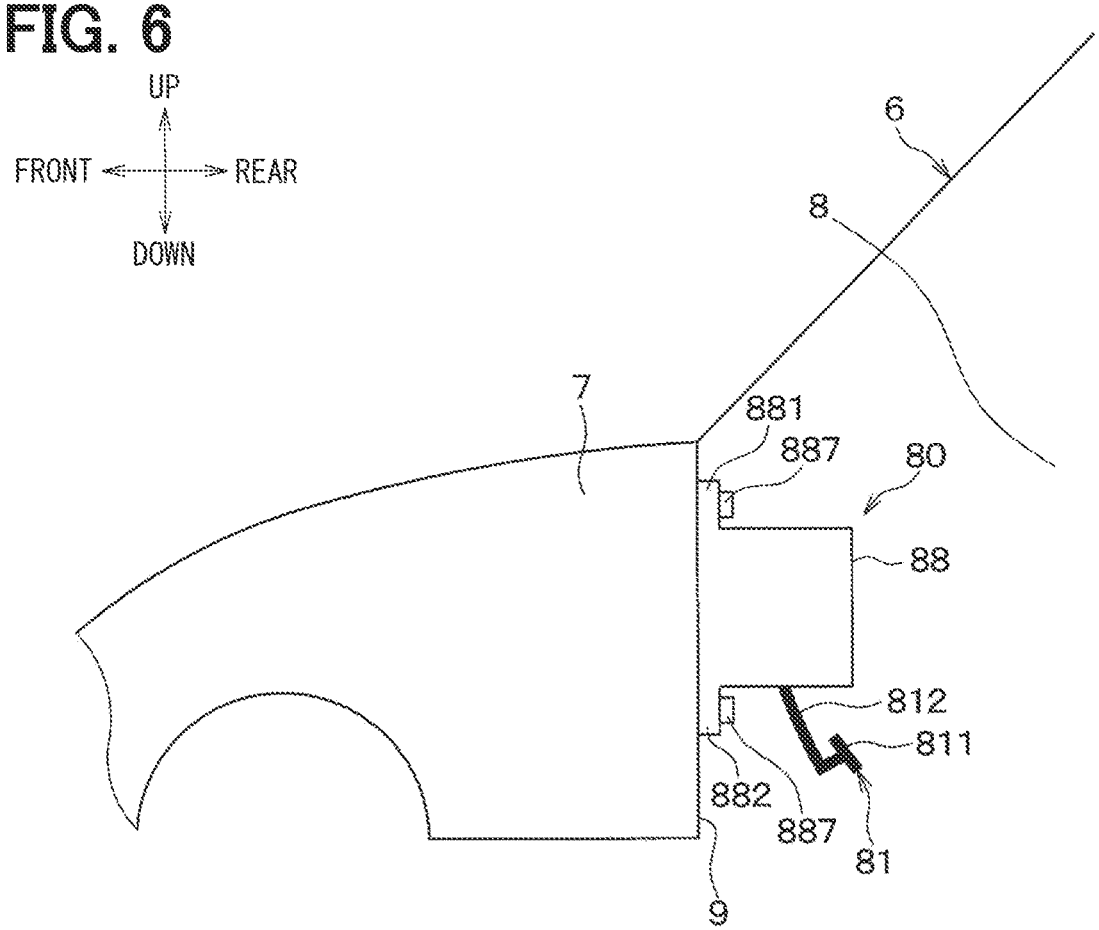
FIG. 6 is a diagram illustrating the vehicle brake device attached to a vehicle.

As illustrated in FIGS. 3 and 6, the housing 88 is attached to a dash panel 9, which is a partition wall separating a vehicle compartment 8 and an outside-of-vehicle compartment 7 such as an engine compartment of the vehicle 6. The dash panel 9 may be referred to as a bulkhead. In the outside-of-vehicle compartment 7, not only an engine of the vehicle 6 but also a battery, an air conditioner, and the like of the vehicle 6 are disposed.

As illustrated in FIG. 3, the housing 88 is formed into a bottomed cylindrical shape, and includes a first attachment portion 881, a second attachment portion 882, a housing bottom portion 883, and a housing cylindrical portion 884. Here, for explanatory convenience, the upside with respect to the front of the vehicle 6 will be simply referred to as the upside. The downside with respect to the front of the vehicle 6 will be simply referred to as the downside.

The first attachment portion 881 is connected to the housing bottom portion 883 described later, and extends upward from the housing bottom portion 883. The first attachment portion 881 includes a first attachment hole 885. A bolt 887 is inserted into the first attachment hole 885 and a first hole 901 in the dash panel 9 so that the first attachment portion 881 is attached to the dash panel 9. Here, the bolt 887 is inserted without penetrating the dash panel 9.

The second attachment portion 882 is connected to the housing cylindrical portion 884 described later, and extends downward from the housing cylindrical portion 884. The second attachment portion 882 includes a second attachment hole 886. The bolt 887 is inserted into the second attachment hole 886 and a second hole 902 in the dash panel 9 so that the second attachment portion 882 is attached to the dash panel 9.

The housing bottom portion 883 supports a part of the lever part 812 such that the lever part 812 is rotatable about the rotational shaft O, and also supports the stroke sensor 86.

The housing cylindrical portion 884 has a cylindrical shape, is connected to the housing bottom portion 883, and extends downward from the housing bottom portion 883. The housing cylindrical portion 884 houses a part of the lever part 812.

The reaction force generator 90 is connected to the housing cylindrical portion 884 and the lever part 812, and generates a reaction force Fr on the lever part 812 in accordance with the stroke amount X. Specifically, the reaction force generator 90 includes an elastic member 91.

Figure 7:
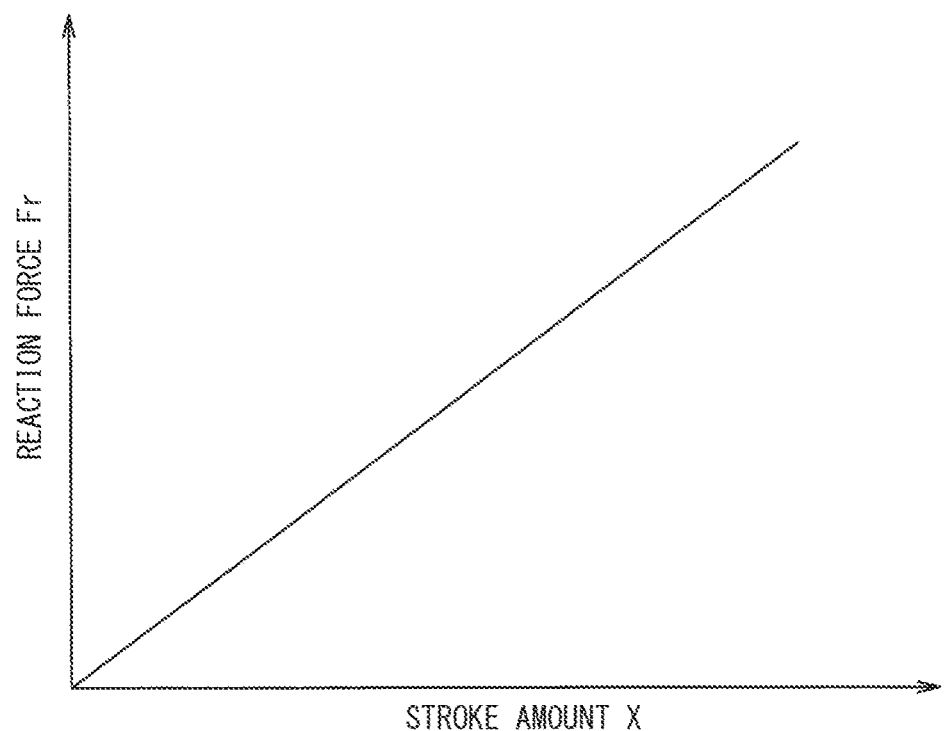
FIG. 7 is a diagram illustrating a relationship between a stroke amount and a reaction force.

The elastic member 91 is, for example, a compression coil spring. The elastic member 91 is connected to the front of the housing cylindrical portion 884 and the lever part 812. Thus, when the brake pedal 81 is operated by a pedal force of the driver of the vehicle 6, a force corresponding to the pedal force is transmitted from the lever part 812 to the elastic member 91. Thus, the elastic member 91 is elastically deformed, here, contracts, so that a restoring force is generated. The restoring force generates the reaction force Fr on the lever part 812. The restoring force of the elastic member 91 is proportional to a deformation amount of the elastic member 91. Furthermore, the deformation amount of the elastic member 91 is proportional to the stroke amount X. Thus, the restoring force of the elastic member 91 is proportional to the stroke amount X. The stroke amount X and the reaction force Fr therefore have a linear relationship as illustrated in FIG. 7. Here, the rotation angle θ described above is also adjusted to have a linear relationship with the reaction force Fr.

The vehicle brake system 1 is configured as described above. The first control processor portion 613 of the first ECU 51 and the second control processor portion 623 of the second ECU 52 of the vehicle brake system 1 perform processing to control the left front wheel FL, the right front wheel FR, the left rear wheel RL, and the right rear wheel RR of the vehicle 6.

Figure 8:
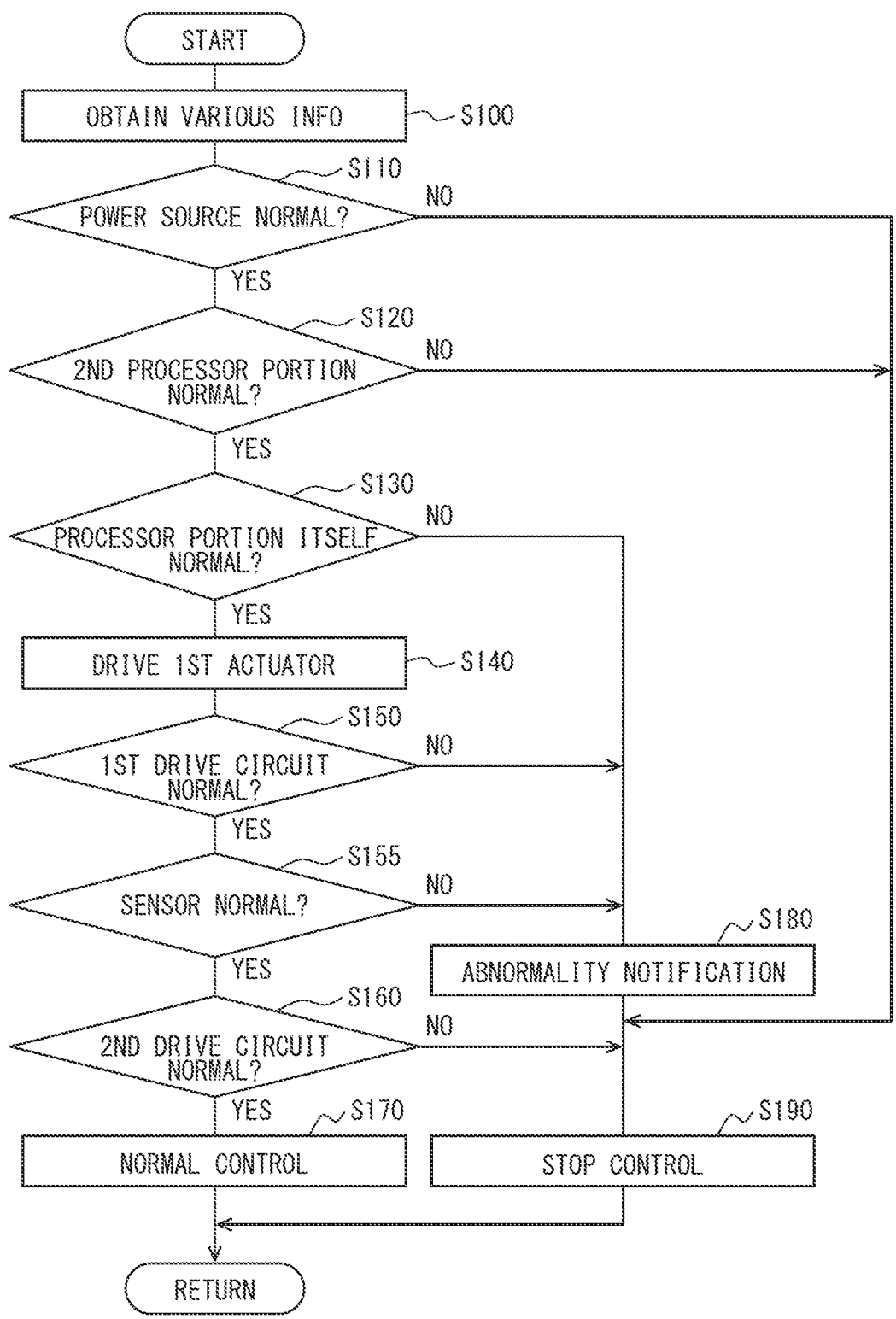
FIG. 8 is a flowchart illustrating processing by a first control processor portion.

Next, processing by the first control processor portion 613 will be described with reference to a flowchart in FIG. 8. Here, for example, when an ignition of the vehicle 6 is turned on, the first control processor portion 613 executes a program stored in the ROM of the first memory portion 612.

In step S100, the first control processor portion 613 obtains various types of information. Specifically, the first control processor portion 613 obtains a first voltage Vb1, which is a voltage applied from the power source 40 to the first ECU 51, from the voltage sensor 45 via the first communication portion 611. In addition, the first control processor portion 613 obtains, from the first pressure sensor 14 via the first communication portion 611, the fluid pressure of the brake fluid flowing from the first actuator 10 to the second actuator 20. Furthermore, the first control processor portion 613 obtains the sensor output Vs corresponding to the stroke amount X of the brake pedal 81 from the stroke sensor 86 via the first sensor output wire 841 and the first communication portion 611.

Subsequently, in step S110, the first control processor portion 613 determines whether the power source 40 is normal. Specifically, the first control processor portion 613 determines whether the first voltage Vb1 obtained in step S100 is within a predetermined range, for example, equal to or higher than a first voltage threshold Vb_th1 and equal to or lower than a second voltage threshold Vb_th2. When the first voltage Vb1 is equal to or higher than the first voltage threshold Vb_th1 and equal to or lower than the second voltage threshold Vb_th2, the power source 40 is normal, and thus the processing proceeds to step S120. When the first voltage Vb1 is less than the first voltage threshold Vb_th1, the power source 40 is abnormal, and thus the processing proceeds to step S190. Furthermore, when the first voltage Vb1 is higher than the second voltage threshold Vb_th2, the power source 40 is abnormal, and thus the processing proceeds to step S190. The first voltage threshold Vb_th1 and the second voltage threshold Vb_th2 are set on the basis of an experiment, a simulation, or the like.

In step S120 following step S110, the first control processor portion 613 determines whether the second control processor portion 623 is normal. Specifically, the first control processor portion 613 determines whether a signal indicating that the second control processor portion 623 is abnormal described later has been received from the second control processor portion 623. When the second control processor portion 623 is normal, the processing proceeds to step S130. When the second control processor portion 623 is abnormal, the processing proceeds to step S190.

In step S130 following step S120, the first control processor portion 613 determines whether the first control processor portion 613 itself is normal. For example, the first control processor portion 613 periodically outputs a watchdog signal to a monitoring IC (not illustrated). The monitoring IC determines whether the watchdog signal from the first control processor portion 613 has been detected. When the watchdog signal from the first control processor portion 613 has been detected, the monitoring IC determines that the first control processor portion 613 is normal, and outputs a low-level signal to the first control processor portion 613. When the first control processor portion 613 receives the low-level signal from the monitoring IC, the first control processor portion 613 is normal, and thus the processing proceeds to step S140. When the watchdog signal from the first control processor portion 613 has not been detected, the monitoring IC outputs a signal indicating that the first control processor portion 613 is abnormal, for example, a high-level signal, to the first control processor portion 613. When the first control processor portion 613 receives the high-level signal from the monitoring IC, the first control processor portion 613 is abnormal, and thus the processing proceeds to step S180.

In step S140 following step S130, the first control processor portion 613 drives the first actuator 10. Specifically, the first control processor portion 613 outputs a signal for driving the first actuator 10 to the first drive circuit 71. The first drive circuit 71 drives the first actuator motor 13 on the basis of the signal from the first control processor portion 613. The first actuator motor 13 rotates on the basis of a signal from the first drive circuit 71 to drive the first pump 12. Thus, the first pump 12 increases the pressure of the brake fluid from the reservoir 11. The brake fluid with the increased fluid pressure flows from the first actuator 10 to the second actuator 20.

Subsequently, in step S150, the first control processor portion 613 determines whether the first drive circuit 71 is normal. Specifically, the first control processor portion 613 obtains, from the first pressure sensor 14 via the first communication portion 611, a first fluid pressure P1, which is the fluid pressure of the brake fluid that has flowed from the first actuator 10 to the second actuator 20 in step S140. Then, the first control processor portion 613 determines whether the first fluid pressure P1 is equal to or higher than a first fluid pressure threshold value P1_th. When the first fluid pressure P1 is equal to or higher than the first fluid pressure threshold value P1_th, the first actuator 10 is normally driven by the first drive circuit 71, and thus the first drive circuit 71 is normal. At this time, the processing therefore proceeds to step S155. When the first fluid pressure P1 is less than the first fluid pressure threshold value P1_th, the first actuator 10 is not normally driven by the first drive circuit 71, and thus the first drive circuit 71 is abnormal. At this time, the processing therefore proceeds to step S180. The first fluid pressure threshold value P1_th is set on the basis of an experiment, a simulation, or the like. Here, when the first fluid pressure P1 is less than the first fluid pressure threshold value P1_th, it may be determined that the first actuator 10 is abnormal.

In step S155 following step S150, the first control processor portion 613 determines whether the stroke sensor 86 is normal. Specifically, the first control processor portion 613 determines whether the sensor output Vs obtained in step S100 is equal to or higher than a first sensor threshold Vs_th1 and equal to or lower than a second sensor threshold Vs_th2. When the sensor output Vs is equal to or higher than the first sensor threshold Vs_th1 and equal to or lower than the second sensor threshold Vs_th2, the stroke sensor 86 is normal, and thus the processing proceeds to step S160. When the sensor output Vs is less than the first sensor threshold Vs_th1, the stroke sensor 86 is abnormal, and thus the processing proceeds to step S180. Furthermore, when the sensor output Vs is larger than the second sensor threshold Vs_th2, the stroke sensor 86 is abnormal, and thus the processing proceeds to step S180. The first sensor threshold Vs_th1 is set on the basis of, for example, an initial position of the brake pedal 81 and a variation in position of the brake pedal 81. The second sensor threshold Vs_th2 is set on the basis of, for example, the maximum value of the stroke amount X of the brake pedal 81 and the variation in position of the brake pedal 81.

In step S160 following step S155, the first control processor portion 613 determines whether the second drive circuit 72 is normal. Specifically, the first control processor portion 613 determines whether a signal indicating that the second drive circuit 72 is abnormal from the second control processor portion 623 described later has been received. When the second drive circuit 72 is normal, the processing proceeds to step S170. When the second drive circuit 72 is abnormal, the processing proceeds to step S190.

In step S170 following step S160, the first control processor portion 613 performs normal control on the first actuator 10 on the basis of the sensor output Vs corresponding to the stroke amount X obtained in step S100.

Figure 9:
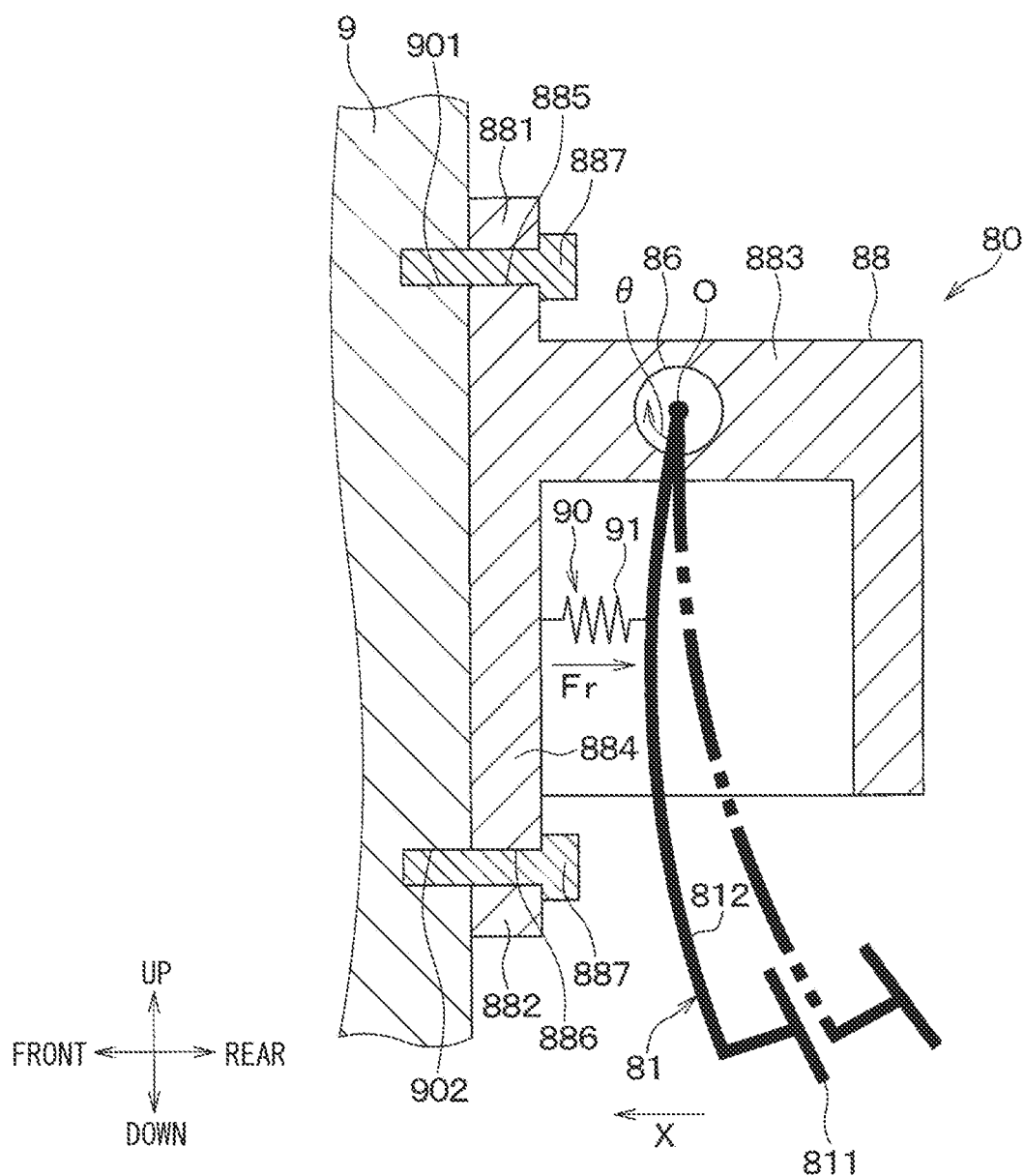

For example, as illustrated in FIG. 9, the lever part 812 rotates about the rotational shaft O when the driver of the vehicle 6 steps on the pedal part 811. As a result, the stroke amount X increases, and the sensor output Vs increases. At this time, in order to decelerate the vehicle 6, the first control processor portion 613 outputs, to the first drive circuit 71, a signal for driving the first actuator 10 so as to increase the first fluid pressure P1. The first drive circuit 71 drives the first actuator motor 13 on the basis of the signal from the first control processor portion 613. At this time, the rotation speed of the first actuator motor 13 increases. Thus, the first pump 12 increases the pressure of the brake fluid from the reservoir 11. Thus, the first fluid pressure P1 increases. The brake fluid having this relatively large first fluid pressure P1 flows from the first actuator 10 to the second actuator 20.

When the stroke amount X increases, the elastic member 91 contracts because the elastic member 91 is connected to the front of the housing cylindrical portion 884 and the lever part 812. Thus, the reaction force Fr accompanying the restoring force of the elastic member 91 is generated. This reaction force Fr causes the brake pedal 81 to return to the initial position when a foot of the driver of the vehicle 6 is removed from the pedal part 811. Thereafter, the processing returns to step S100. In FIG. 9, the position of the brake pedal 81 in the initial state is indicated by a two-dot chain line. Here, since the stroke amount X is a translational movement amount of the pedal part 811 toward the front of the vehicle 6, the direction of the reaction force Fr is rearward.

In step S180, when the first control processor portion 613 itself is abnormal, the first control processor portion 613 outputs a signal indicating that the first control processor portion 613 is abnormal to the second control processor portion 623. At this time, the first control processor portion 613 outputs a signal indicating that the first control processor portion 613 is abnormal to a notification device (not illustrated). When this signal has been received, this notification device notifies the driver of the vehicle 6 that the first control processor portion 613 is abnormal by screen display, sound, light, and the like.

When the first drive circuit 71 is abnormal, the first control processor portion 613 outputs a signal indicating that the first drive circuit 71 is abnormal to the second control processor portion 623. At this time, the first control processor portion 613 outputs a signal indicating that the first drive circuit 71 is abnormal to the notification device (not illustrated). When this signal has been received, this notification device notifies the driver of the vehicle 6 that the first drive circuit 71 is abnormal by screen display, sound, light, and the like.

Furthermore, when the stroke sensor 86 is abnormal, the first control processor portion 613 outputs a signal indicating that the stroke sensor 86 is abnormal to the notification device. When this signal has been received, this notification device notifies the driver of the vehicle 6 that the stroke sensor 86 is abnormal by screen display, sound, light, and the like. After step S180, the processing proceeds to step S190.

In step S190, in a case where the power source 40 is abnormal, in a case where the first control processor portion 613 itself is abnormal, or in a case where the first drive circuit 71 is abnormal, the first control processor portion 613 cannot normally control the first drive circuit 71. At this time, a processor portion or the like other than the first control processor portion 613 controls the vehicle 6 to decelerate and stop in order to ensure safety of the vehicle 6.

For example, in these cases, when the second control processor portion 623 and the second drive circuit 72 are normal, the second control processor portion 623 controls the second drive circuit 72 to control the second actuator 20 as described later. Thus, the vehicle 6 safely decelerates and stops.

In these cases, when the second control processor portion 623 and the second drive circuit 72 are abnormal, an ECU other than the first ECU 51 and the second ECU 52 controls a regenerative brake, a parking brake, and the like (not illustrated). Thus, the vehicle 6 safely decelerates and stops.

For example, in a case where the power source 40, the first control processor portion 613, and the first drive circuit 71 are normal, when the second control processor portion 623 or the second drive circuit 72 is abnormal, the first control processor portion 613 decelerates and stops the vehicle 6.

Specifically, the first control processor portion 613 outputs a signal for driving the first actuator 10 to the first drive circuit 71. The first drive circuit 71 drives the first actuator motor 13 on the basis of the signal from the first control processor portion 613. The first actuator motor 13 rotates on the basis of a signal from the first drive circuit 71 to drive the first pump 12.

At this time, the first pump 12 increases the pressure of the brake fluid from the reservoir 11. The brake fluid with the increased fluid pressure flows to the second actuator 20. The brake fluid that has flowed into the second actuator 20 flows to the left front wheel W/C 2, the right front wheel W/C 3, the left rear wheel W/C 4, and the right rear wheel W/C 5 via the corresponding pressure-increasing control valves. Thus, each brake pad (not illustrated) comes into frictional contact with the corresponding brake disc. Thus, the wheel corresponding to each brake disc is decelerated, and the vehicle 6 decelerates. Thus, the vehicle 6 stops. After step S190, the processing returns to step S100.

In this manner, the processing by the first control processor portion 613 is performed.

Figure 10:
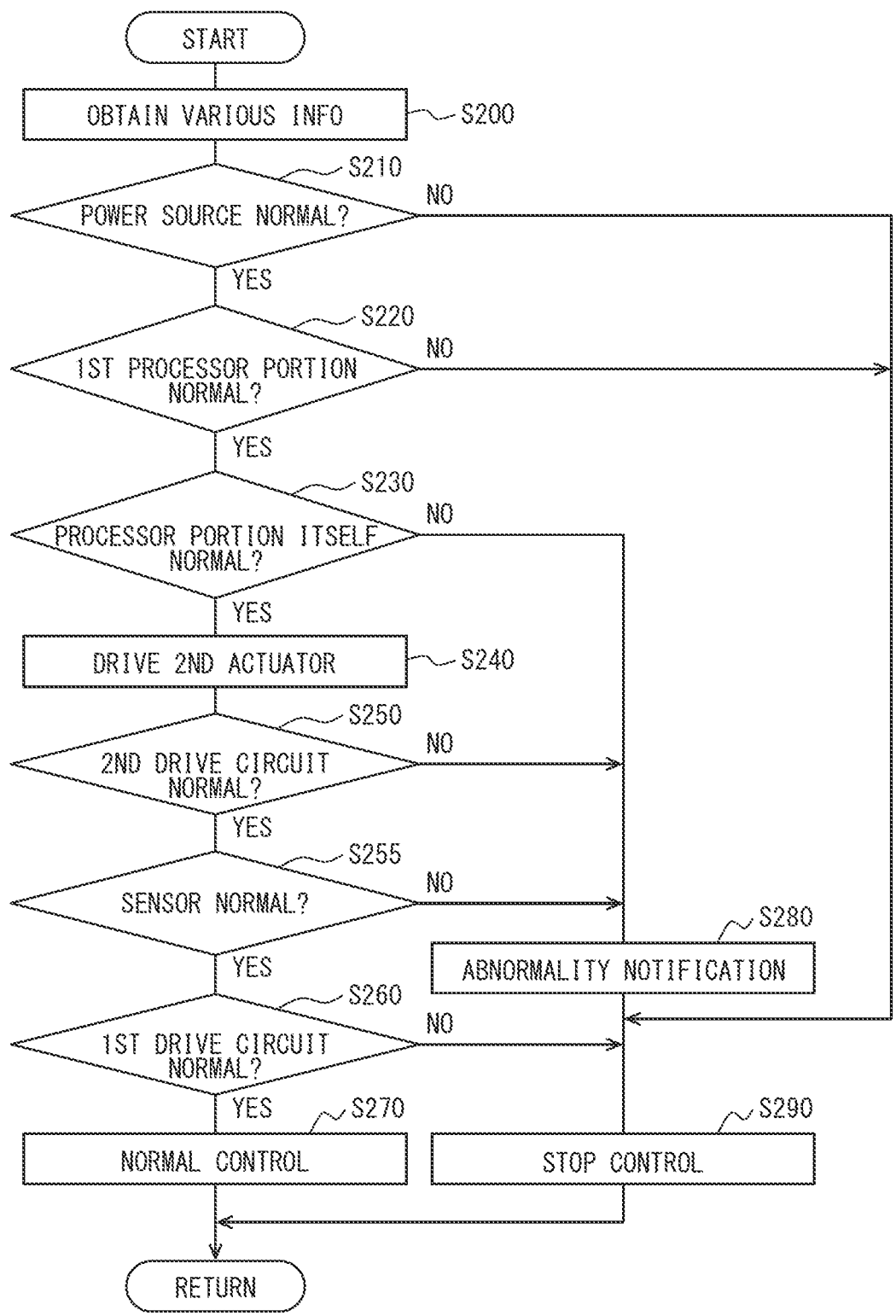
FIG. 10 is a flowchart illustrating processing by a second control processor portion.

Next, processing by the second control processor portion 623 will be described with reference to a flowchart in FIG. 10. Here, for example, when the ignition of the vehicle 6 is turned on, the second control processor portion 623 executes a program stored in the ROM of the second memory portion 622.

In step S200, the second control processor portion 623 obtains various types of information. For example, the second control processor portion 623 obtains a second voltage Vb2, which is a voltage applied from the power source 40 to the second ECU 52, from the voltage sensor 45 via the second communication portion 621. In addition, the second control processor portion 623 obtains the brake fluid pressure downstream of the first differential pressure control valve 212 from the second pressure sensor 213 via the second communication portion 621. Furthermore, the second control processor portion 623 obtains the brake fluid pressure downstream of the second differential pressure control valve 262 from the third pressure sensor 263 via the second communication portion 621. In addition, the second control processor portion 623 obtains the sensor output Vs corresponding to the stroke amount X of the brake pedal 81 from the stroke sensor 86 via the second sensor output wire 842 and the second communication portion 621. Furthermore, the second control processor portion 623 obtains a yaw rate, which is a change rate of the rotation angle in the turning direction of the vehicle 6, from a yaw rate sensor (not illustrated) via the second communication portion 621. In addition, the second control processor portion 623 obtains an acceleration of the vehicle 6 from an acceleration sensor (not illustrated) via the second communication portion 621. Furthermore, the second control processor portion 623 obtains a steering angle of the vehicle 6 from a steering angle sensor (not illustrated) via the second communication portion 621. In addition, the second control processor portion 623 obtains wheel speeds of the left front wheel FL, the right front wheel FR, the left rear wheel RL, and the right rear wheel RR from a wheel speed sensor (not illustrated) via the second communication portion 621. Furthermore, the second control processor portion 623 obtains a vehicle speed of the vehicle 6 from a vehicle speed sensor (not illustrated) via the second communication portion 621. Here, the vehicle speed is an abbreviation of estimated vehicle body speed.

Subsequently, in step S210, the second control processor portion 623 determines whether the power source 40 is normal, in a similar manner to step S110 by the first control processor portion 613 described above. Specifically, the second control processor portion 623 determines whether the second voltage Vb2 obtained in step S200 is equal to or higher than the first voltage threshold Vb_th1 and equal to or lower than the second voltage threshold Vb_th2. When the second voltage Vb2 is equal to or higher than the first voltage threshold Vb_th1 and equal to or lower than the second voltage threshold Vb_th2, the power source 40 is normal, and thus the processing proceeds to step S220. When the second voltage Vb2 is less than the first voltage threshold Vb_th1, the power source 40 is abnormal, and thus the processing proceeds to step S290. Furthermore, when the second voltage Vb2 is higher than the second voltage threshold Vb_th2, the power source 40 is abnormal, and thus the processing proceeds to step S290.

In step S220 following step S210, the second control processor portion 623 determines whether the first control processor portion 613 is normal. Specifically, the second control processor portion 623 determines whether a signal indicating that the first control processor portion 613 is abnormal in step S180 by the first control processor portion 613 described above has been received. When the first control processor portion 613 is abnormal, the processing proceeds to step S290. When the first control processor portion 613 is normal, the processing proceeds to step S230.

In step S230 following step S220, the second control processor portion 623 determines whether the second control processor portion 623 itself is normal, in a similar manner to step S130 by the first control processor portion 613 described above. Specifically, the second control processor portion 623 determines whether the second control processor portion 623 itself is normal by outputting a watchdog signal to the monitoring IC (not illustrated). When the second control processor portion 623 itself is normal, the processing proceeds to step S240. When the second control processor portion 623 itself is abnormal, the processing proceeds to step S280.

In step S240 following step S230, the second control processor portion 623 drives the second actuator 20. Specifically, the second control processor portion 623 outputs a signal for driving the second actuator 20 to the second drive circuit 72. The second drive circuit 72 drives the second actuator motor 30 on the basis of the signal from the second control processor portion 623. The second actuator motor 30 rotates on the basis of a signal from the second drive circuit 72 to drive the second pump 224 and the third pump 274.

At this time, the second pump 224 sucks the brake fluid stored in the first pressure-regulating reservoir 221. The sucked brake fluid flows among the first differential pressure control valve 212, the first pressure-increasing control valve 215, and the second pressure-increasing control valve 218 via the first return pipeline 223. Thus, the pressure of the brake fluid among the first differential pressure control valve 212, the first pressure-increasing control valve 215, and the second pressure-increasing control valve 218 increases.

At this time, the third pump 274 sucks the brake fluid stored in the second pressure-regulating reservoir 271. The sucked brake fluid flows among the second differential pressure control valve 262, the third pressure-increasing control valve 265, and the fourth pressure-increasing control valve 268 via the second return pipeline 273. Thus, the pressure of the brake fluid among the second differential pressure control valve 262, the third pressure-increasing control valve 265, and the fourth pressure-increasing control valve 268 increases.

Subsequently, in step S250, the second control processor portion 623 determines whether the second drive circuit 72 is normal. Specifically, the second control processor portion 623 obtains, from the second pressure sensor 213 via the second communication portion 621, a second fluid pressure P2, which is the pressure of the brake fluid among the first differential pressure control valve 212, the first pressure-increasing control valve 215, and the second pressure-increasing control valve 218 that has flowed in step S240. In addition, the second control processor portion 623 obtains, from the third pressure sensor 263 via the second communication portion 621, a third fluid pressure P3, which is the pressure of the brake fluid among the second differential pressure control valve 262, the third pressure-increasing control valve 265, and the fourth pressure-increasing control valve 268 that has flowed in step S240.

Then, the second control processor portion 623 determines whether the second fluid pressure P2 is equal to or higher than a second fluid pressure threshold value P2_th and the third fluid pressure P3 is equal to or higher than a third fluid pressure threshold value P3_th. When the second fluid pressure P2 is equal to or higher than the second fluid pressure threshold value P2_th and the third fluid pressure P3 is equal to or higher than the third fluid pressure threshold value P3_th, the second actuator 20 is normally driven by the second drive circuit 72, and thus the second drive circuit 72 is normal. At this time, the processing therefore proceeds to step S255. When the second fluid pressure P2 is less than the second fluid pressure threshold value P2_th or the third fluid pressure P3 is less than the third fluid pressure threshold value P3_th, the second actuator 20 is not normally driven by the second drive circuit 72, and thus the second drive circuit 72 is abnormal. At this time, the processing therefore proceeds to step S280. The second fluid pressure threshold value P2_th and the third fluid pressure threshold value P3_th are set on the basis of an experiment, a simulation, or the like. Here, when the second fluid pressure P2 is less than the second fluid pressure threshold value P2_th or the third fluid pressure P3 is less than the third fluid pressure threshold value P3_th, it may be determined that the second actuator 20 is abnormal.

In step S255 following step S250, the second control processor portion 623 determines whether the stroke sensor 86 is normal, in a similar manner to step S155 by the first control processor portion 613 described above. Specifically, the second control processor portion 623 determines whether the sensor output Vs obtained in step S200 is equal to or higher than the first sensor threshold Vs_th1 and equal to or lower than the second sensor threshold Vs_th2. When the sensor output Vs is equal to or higher than the first sensor threshold Vs_th1 and equal to or lower than the second sensor threshold Vs_th2, the stroke sensor 86 is normal, and thus the processing proceeds to step S260. When the sensor output Vs is less than the first sensor threshold Vs_th1, the stroke sensor 86 is abnormal here, and thus the processing proceeds to step S280. Furthermore, when the sensor output Vs is larger than the second sensor threshold Vs_th2, the stroke sensor 86 is abnormal, and thus the processing proceeds to step S280. As described above, the first sensor threshold Vs_th1 is set on the basis of, for example, the initial position of the brake pedal 81 and the variation in position of the brake pedal 81. The second sensor threshold Vs_th2 is set on the basis of, for example, the maximum value of the stroke amount X of the brake pedal 81 and the variation in position of the brake pedal 81.

In step S260 following step S255, the second control processor portion 623 determines whether the first drive circuit 71 is normal. Specifically, the second control processor portion 623 determines whether a signal indicating that the first drive circuit 71 is abnormal in step S180 by the first control processor portion 613 described above has been received. When the first drive circuit 71 is abnormal, the processing proceeds to step S290. When the first drive circuit 71 is normal, the processing proceeds to step S270.

In step S270 following step S260, the second control processor portion 623 performs normal control, ABS control, VSC control, and the like. ABS is an abbreviation of Antilock Brake System. VSC is an abbreviation of vehicle stability control.

For example, when the driver of the vehicle 6 steps on the pedal part 811, the second control processor portion 623 executes normal control, which is brake control by the driver of the vehicle 6 operating the brake pedal 81. At this time, the lever part 812 rotates about the rotational shaft O. As a result, the stroke amount X increases, and the sensor output Vs increases. At this time, the second control processor portion 623 controls the second drive circuit 72 to decelerate the vehicle 6. Thus, the second drive circuit 72 causes a pressure-increasing control valve of the second actuator 20 into a communicating state by causing a solenoid coil of the pressure-increasing control valve of the second actuator 20 to be not energized. Thus, the brake fluid that has flowed from the first actuator 10 to the second actuator 20 flows to the left front wheel W/C 2, the right front wheel W/C 3, the left rear wheel W/C 4, and the right rear wheel W/C 5 via the corresponding pressure-increasing control valves. Thus, each brake pad (not illustrated) comes into frictional contact with the corresponding brake disc. Thus, the wheel corresponding to each brake disc is decelerated, and the vehicle 6 decelerates. Thus, the vehicle 6 stops.

The second control processor portion 623 calculates a slip ratio of each of the left front wheel FL, the right front wheel FR, the left rear wheel RL, and the right rear wheel RR on the basis of the wheel speed and the vehicle speed obtained in step S200, for example. The second control processor portion 623 determines whether to execute ABS control on the basis of the slip ratio. When the second control processor portion 623 executes the ABS control, the second control processor portion 623 performs any one of a pressure reducing mode, a maintaining mode, and a pressure increasing mode in accordance with the slip ratio. In the pressure reducing mode, the pressure-increasing control valve corresponding to the wheel to be controlled is set to a cutoff state and the pressure-reducing control valve is set to a communicating state as appropriate, so that the pressure of the W/C corresponding to the wheel to be controlled is reduced. In the maintaining mode, the pressure-increasing control valve and the pressure-reducing control valve corresponding to the wheel to be controlled are set to a cutoff state, so that the pressure of the W/C corresponding to the wheel to be controlled is maintained. Furthermore, in the pressure increasing mode, the pressure-reducing control valve corresponding to the wheel to be controlled is set to a cutoff state and the pressure-increasing control valve is set to a communicating state as appropriate, so that the pressure of the W/C corresponding to the wheel to be controlled increases. Since the slip ratio of each wheel of the vehicle 6 is controlled in this manner, the left front wheel FL, the right front wheel FR, the left rear wheel RL, and the right rear wheel RR are prevented from being locking.

The second control processor portion 623 calculates a sideslip state of the vehicle 6 on the basis of, for example, the yaw rate, the steering angle, the acceleration, each wheel speed, and the vehicle speed obtained in step S200. The second control processor portion 623 determines whether to execute VSC control on the basis of the sideslip state of the vehicle 6. When the second control processor portion 623 executes the VSC control, the second control processor portion 623 selects a wheel to be controlled for stabilizing turning of the vehicle 6 on the basis of the sideslip state of the vehicle 6. Furthermore, the second control processor portion 623 controls the second drive circuit 72 so that the pressure of the W/C corresponding to the selected wheel to be controlled increases. At this time, the second drive circuit 72 drives the second actuator motor 30 to drive the pump corresponding to the wheel to be controlled. Thus, the pump corresponding to the wheel to be controlled sucks the brake fluid stored in the pressure-regulating reservoir corresponding to the wheel to be controlled. The sucked brake fluid flows to the W/C corresponding to the wheel to be controlled via the return pipeline corresponding to the wheel to be controlled. Thus, the brake fluid pressure of the W/C corresponding to the wheel to be controlled increases, so that the sideslip of the vehicle 6 is prevented. Thus, traveling of the vehicle 6 is stabilized.

In this manner, in step S270, the second control processor portion 623 performs normal control, ABS control, VSC control, and the like. Thereafter, the processing returns to step S200. In step S270, in addition to the normal control, the ABS control, and the VSC control described above, the second control processor portion 623 may perform collision avoidance control, regenerative cooperative control, and the like on the basis of a signal from another ECU (not illustrated).

In step S280, when the second control processor portion 623 itself is abnormal, the second control processor portion 623 outputs a signal indicating that the second control processor portion 623 is abnormal to the first control processor portion 613. At this time, the second control processor portion 623 outputs a signal indicating that the second control processor portion 623 is abnormal to the notification device (not illustrated). When this signal has been received, this notification device notifies the driver of the vehicle 6 that the second control processor portion 623 is abnormal by screen display, sound, light, and the like.

When the second drive circuit 72 is abnormal, the second control processor portion 623 outputs a signal indicating that the second drive circuit 72 is abnormal to the first control processor portion 613. At this time, the second control processor portion 623 outputs a signal indicating that the second drive circuit 72 is abnormal to the notification device (not illustrated). When this signal has been received, this notification device notifies the driver of the vehicle 6 that the second drive circuit 72 is abnormal by screen display, sound, light, and the like.

Furthermore, when the stroke sensor 86 is abnormal, the second control processor portion 623 outputs a signal indicating that the stroke sensor 86 is abnormal to the notification device, in a similar manner to the first control processor portion 613. When this signal has been received, this notification device notifies the driver of the vehicle 6 that the stroke sensor 86 is abnormal by screen display, sound, light, and the like. Thereafter, the processing proceeds to step S290.

In step S290, in a case where the power source 40 is abnormal, in a case where the second control processor portion 623 itself is abnormal, or in a case where the second drive circuit 72 is abnormal, the second control processor portion 623 cannot normally control the second drive circuit 72. At this time, a processor portion or the like other than the second control processor portion 623 controls the vehicle 6 to decelerate and stop in order to ensure the safety of the vehicle 6.

For example, in these cases, when the first control processor portion 613 and the first drive circuit 71 are normal, the first control processor portion 613 controls the first drive circuit 71 to control the first actuator 10 as described in step S190 described above. Thus, the vehicle 6 safely decelerates and stops.

In these cases, when the first control processor portion 613 and the first drive circuit 71 are abnormal, an ECU other than the first ECU 51 and the second ECU 52 controls the regenerative brake, the parking brake, and the like (not illustrated). Thus, the vehicle 6 safely decelerates and stops.

For example, in a case where the power source 40, the second control processor portion 623, and the second drive circuit 72 are normal, when the first control processor portion 613 or the first drive circuit 71 is abnormal, the second control processor portion 623 decelerates and stops the vehicle 6.

Specifically, the second control processor portion 623 outputs a signal for driving the second actuator 20 to the second drive circuit 72. The second drive circuit 72 drives the second actuator motor 30 on the basis of the signal from the second control processor portion 623. The second actuator motor 30 rotates on the basis of a signal from the second drive circuit 72 to drive the second pump 224 and the third pump 274.

At this time, the second pump 224 sucks the brake fluid stored in the first pressure-regulating reservoir 221. The sucked brake fluid flows among the first differential pressure control valve 212, the first pressure-increasing control valve 215, and the second pressure-increasing control valve 218 via the first return pipeline 223. The brake fluid that has been flowed by the second pump 224 flows to the left front wheel W/C 2 via the first pressure-increasing control valve 215. The brake fluid that has been flowed by the second pump 224 also flows to the right front wheel W/C 3 via the second pressure-increasing control valve 218.

At this time, the third pump 274 sucks the brake fluid stored in the second pressure-regulating reservoir 271. The sucked brake fluid flows among the second differential pressure control valve 262, the third pressure-increasing control valve 265, and the fourth pressure-increasing control valve 268 via the second return pipeline 273. The brake fluid that has been flowed by the third pump 274 flows to the right rear wheel W/C 5 via the third pressure-increasing control valve 265. The brake fluid that has been flowed by the third pump 274 flows to the left rear wheel W/C 4 via the fourth pressure-increasing control valve 268.

Thus, each brake pad (not illustrated) comes into frictional contact with the corresponding brake disc. Thus, the wheel corresponding to each brake disc is decelerated, and the vehicle 6 decelerates. Thus, the vehicle 6 stops. After step S290, the processing returns to step S200.

In this manner, the processing by the second control processor portion 623 is performed.

As described above, the vehicle brake system 1 controls the brake of the vehicle 6. This vehicle brake system 1 facilitates adjustment of the brake pedal 81. Hereinafter, ease of adjustment of the brake pedal 81 will be described.

In the present embodiment, as illustrated in FIGS. 3 and 6, the elastic member 91 of the reaction force generator 90 is connected to the housing 88 and the lever part 812 of the brake pedal 81. The elastic member 91 of the reaction force generator 90 generates the reaction force Fr on the lever part 812 in accordance with the stroke amount X of the brake pedal 81. The housing 88 is located in the vehicle compartment 8 and on the dash panel 9 that separates the vehicle compartment 8 and the outside-of-vehicle compartment 7 such as the engine compartment of the vehicle 6.

Since the housing 88 and the dash panel 9 are separated, the housing 88, the reaction force generator 90, and the brake pedal 81 can be adjusted in the vehicle brake device 80 alone. Thus, adjustment of the housing 88, the reaction force generator 90, and the brake pedal 81 does not need to be performed for each vehicle 6. Thus, the housing 88, the reaction force generator 90, and the brake pedal 81 can be easily adjusted. Since the housing 88, the reaction force generator 90, and the brake pedal 81 can be easily adjusted, the accuracy of the reaction force Fr with respect to the stroke amount X can be improved.

The vehicle brake device 80 also has effects as described below.

[1] In the configuration described in Patent Literature 1, a master cylinder is disposed in an engine compartment of a vehicle, and an engine and the like are disposed in the engine compartment of the vehicle. Thus, the degrees of freedom in mounting position of the master cylinder are relatively low. Thus, when a brake pedal and the master cylinder are connected, the degrees of freedom in mounting position of the brake pedal are relatively low.

In the vehicle brake device 80, the housing 88 is disposed on the vehicle compartment 8 side of the dash panel 9 separating the vehicle compartment 8 and the outside-of-vehicle compartment 7 of the vehicle 6. Thus, connection to the master cylinder or the like in the engine compartment is no longer required, and the degrees of freedom in mounting position of the vehicle brake device 80 become relatively high.

[2] In the configuration described in Patent Literature 1, a reaction force against the brake pedal is generated by the brake pedal, the master cylinder, a stroke simulator, and flow paths of a brake fluid corresponding to the brake pedal, the master cylinder, and the stroke simulator. Thus, the number of parts of the brake device becomes relatively large.

In the vehicle brake device 80, the elastic member 91 of the reaction force generator 90 is connected to the housing 88 and the lever part 812 of the brake pedal 81. The elastic member 91 of the reaction force generator 90 generates the reaction force Fr on the lever part 812 in accordance with the stroke amount X of the brake pedal 81. Thus, it is not necessary to dispose a flow path of the brake fluid for generating the reaction force Fr or the like, and the number of parts of the brake device can be reduced.

[3] In the configuration described in Patent Literature 1, a reaction force on the brake pedal is generated by the pressure of a viscous fluid such as oil. In this case, the reaction force on the brake pedal is likely to change due to mixing of air into the oil or the like, and drivability, that is, ease of driving the vehicle, may deteriorate.

In the vehicle brake device 80, the reaction force generator 90 includes the elastic member 91 that deforms in accordance with the stroke amount X. The restoring force of the elastic member 91 is not affected by mixing of air or the like, and is less likely to change due to mixing of air or the like. Thus, the reaction force Fr by the elastic member 91 is less likely to change due to mixing of air or the like as compared with the reaction force by the pressure of a viscous fluid such as oil, and the vehicle brake device 80 improves the drivability. In the vehicle brake device 80, the stroke amount X and the reaction force Fr have a linear relationship as illustrated in FIG. 7. Thus, an intention of the driver of the vehicle 6 is easily detected, and controllability of the reaction force Fr is improved.

[4] The housing 88 is disposed on the vehicle compartment 8 side of the dash panel 9 separating the vehicle compartment 8 and the outside-of-vehicle compartment 7 such as the engine compartment of the vehicle 6. Due to the dash panel 9, moisture and oil from the engine compartment are less likely to enter the vehicle compartment 8, and the moisture and oil from the engine compartment are less likely to adhere to the elastic member 91 of the reaction force generator 90. Due to the dash panel 9, external factors such as light and heat from the engine compartment are less likely to enter the vehicle compartment 8. Thus, the elastic member 91 of the reaction force generator 90 is less likely to deteriorate, so that durability is improved.

The vehicle brake system 1 also has effects as described below.

[5] The vehicle brake system 1 includes the first actuator 10 and the second actuator 20. Thus, even in a case where one of the first actuator 10 and the second actuator 20 fails, the vehicle brake system 1 can use the other, which is normal, to safely decelerate and stop the vehicle 6. Thus, redundancy of the vehicle brake system 1 can be secured, and the redundancy of the vehicle brake system 1 is improved.

[6] The vehicle brake system 1 includes the first drive circuit 71 and the second drive circuit 72. Thus, even in a case where one of the first drive circuit 71 and the second drive circuit 72 fails, the vehicle brake system 1 can use the other, which is normal, to safely decelerate and stop the vehicle 6. Thus, redundancy of the vehicle brake system 1 can be secured, and the redundancy of the vehicle brake system 1 is improved.

[7] The vehicle brake system 1 includes the first microcontroller 61 and the second microcontroller 62. Thus, even in a case where one of the first microcontroller 61 and the second microcontroller 62 fails, the other, which is normal, can be used to safely decelerate and stop the vehicle 6. Thus, redundancy of the vehicle brake system 1 can be secured, and the redundancy of the vehicle brake system 1 is improved.

Second Embodiment

In a second embodiment, a reaction force generator 90 of a vehicle brake device 80 includes a damper 92. Other than that, the present embodiment is similar to the first embodiment.

Figure 11:
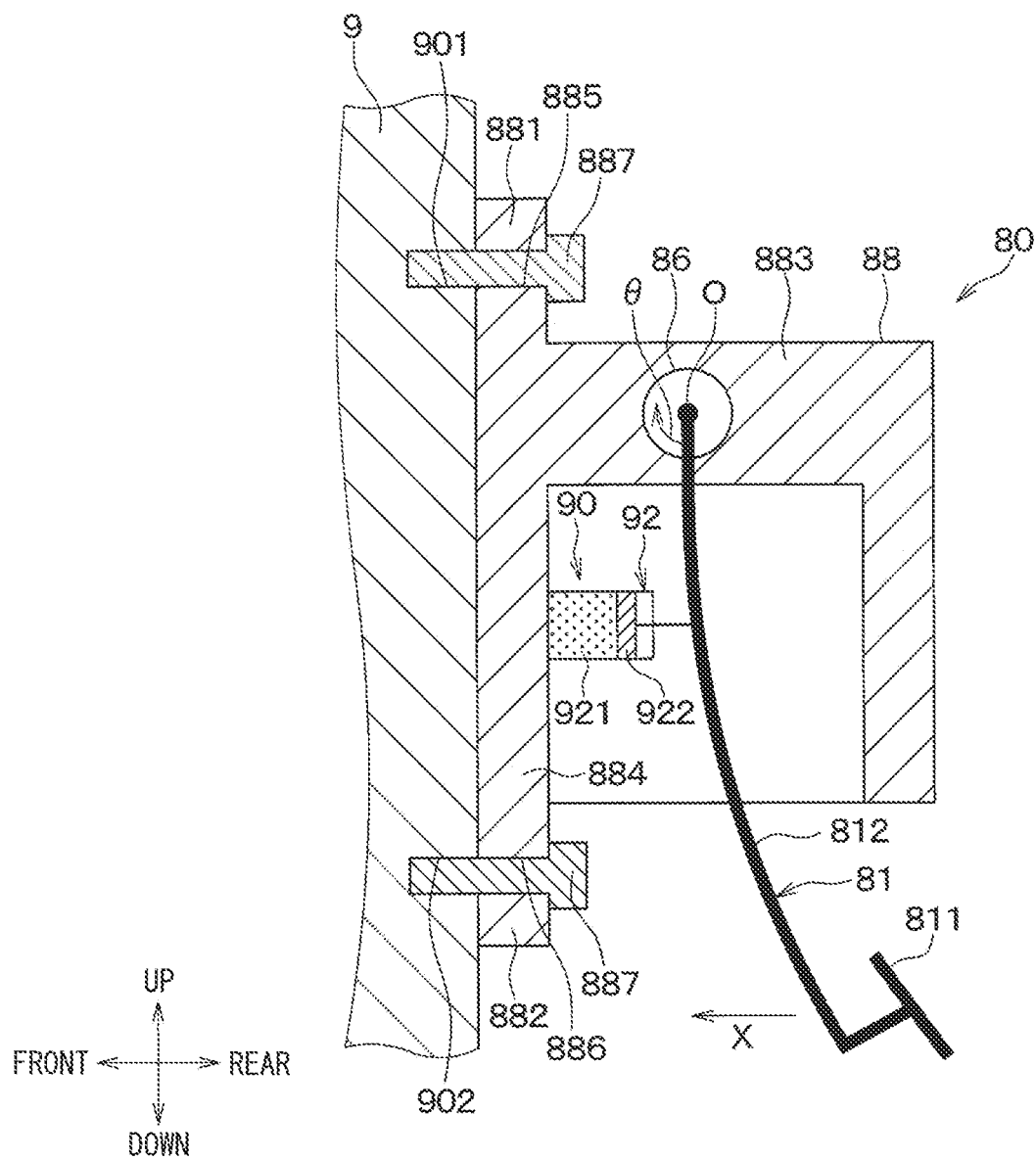
FIG. 11 is a sectional view of a vehicle brake device according to a second embodiment.

As illustrated in FIG. 11, the reaction force generator 90 of the vehicle brake device 80 according to the second embodiment includes the damper 92. The damper 92 generates a reaction force Fr in accordance with a stroke change ΔX, which is a change of a stroke amount X per unit time. Specifically, the damper 92 includes a damper cylinder 921 and a damper piston 922.

The damper cylinder 921 is formed into a bottomed cylindrical shape, and a fluid is sealed in the damper cylinder 921. The fluid is, for example, a viscous fluid such as oil and air. In FIG. 11, for clarification of the location of the viscous fluid in the damper cylinder 921, the viscous fluid in the damper cylinder 921 is indicated by a dot pattern.

Figure 12:
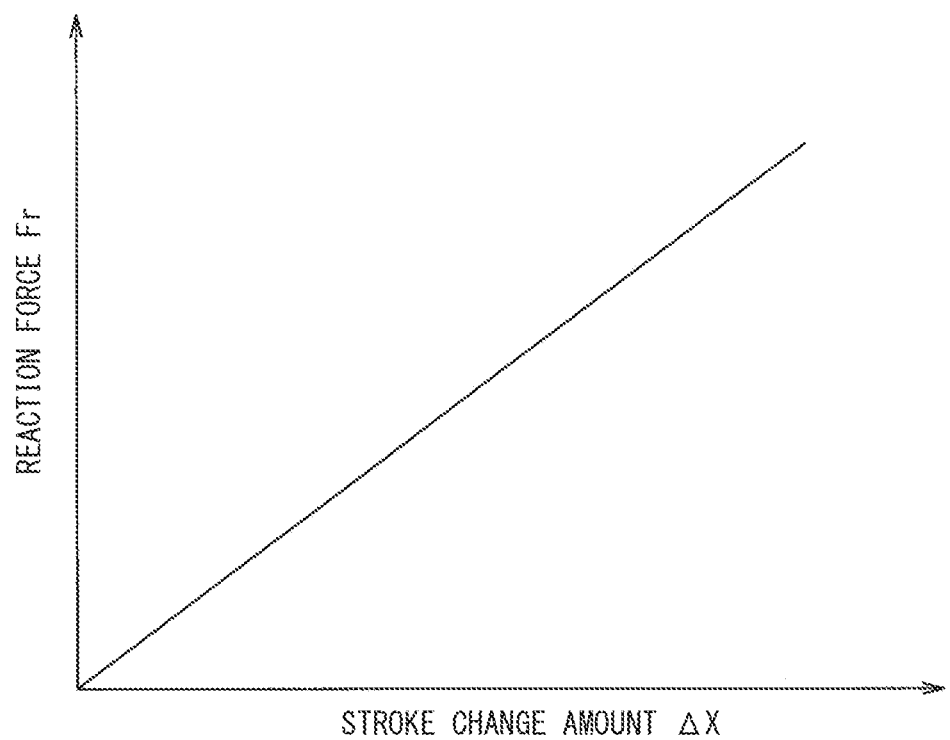
FIG. 12 is a diagram illustrating a relationship between a stroke change and a reaction force.

The damper piston 922 slides in the damper cylinder 921 in the axial direction of the damper cylinder 921. One end of the damper piston 922 is connected to a lever part 812 of a brake pedal 81. Thus, when the brake pedal 81 is operated by a pedal force of a driver of a vehicle 6, a force corresponding to the pedal force is transmitted from the lever part 812 to the damper piston 922. Thus, the damper piston 922 compresses the fluid sealed in the damper cylinder 921. At this time, the reaction force Fr in accordance with the stroke change ΔX is generated by the viscosity of the fluid in the damper cylinder 921. Here, the reaction force Fr due to the fluid is proportional to the stroke change ΔX. Thus, as illustrated in FIG. 12, the stroke change ΔX and the reaction force Fr have a linear relationship. Thus, controllability of the reaction force Fr is improved.

Figure 13:
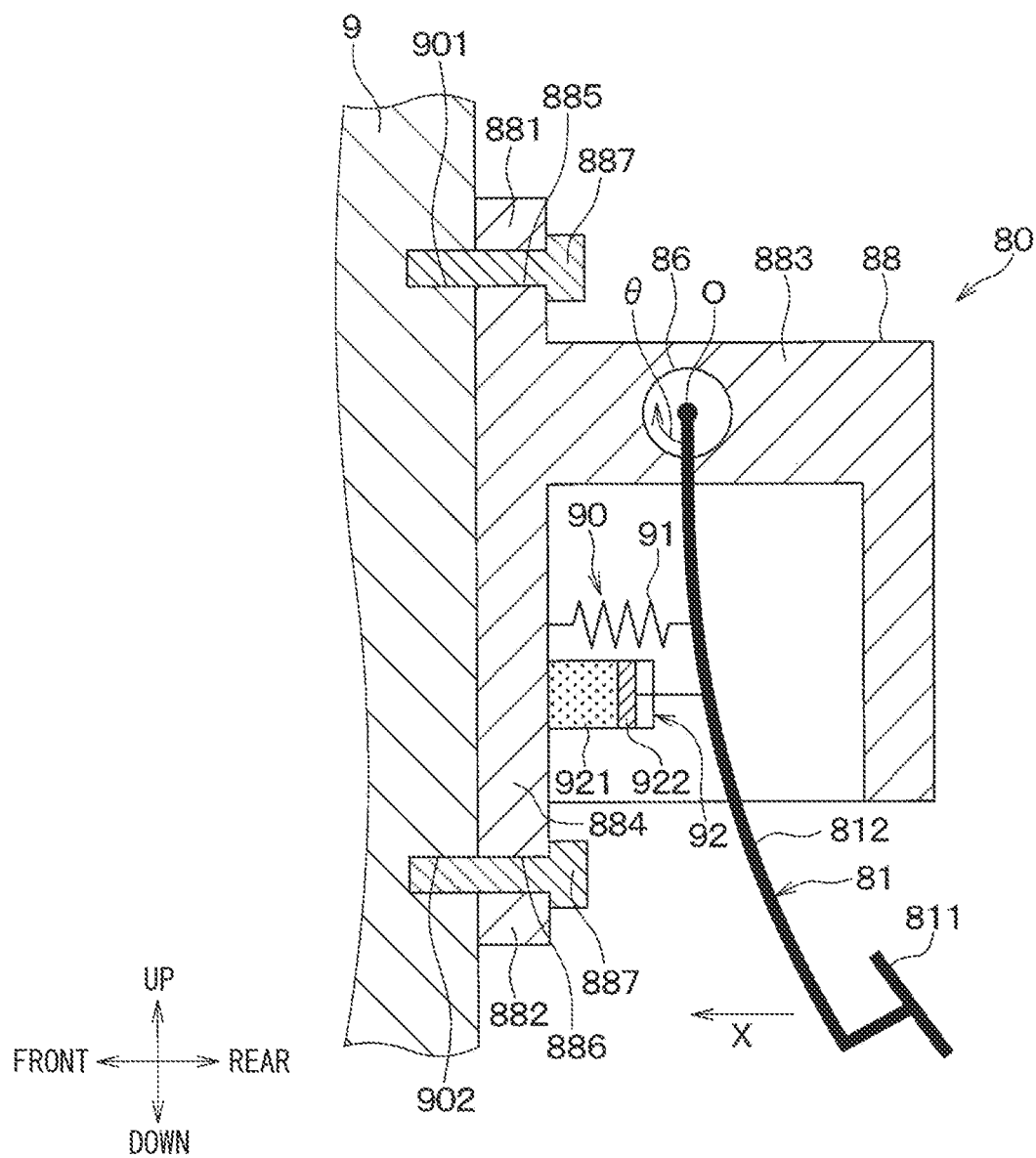
FIG. 13 is a sectional view of the vehicle brake device.

In the second embodiment, since an elastic member 91 is not included, effects similar to those of the first embodiment are obtained except for [3] described above. The first embodiment and the second embodiment may be combined. Specifically, as illustrated in FIG. 13, the reaction force generator 90 includes the elastic member 91 and the damper 92 described above. Even in such a mode, effects similar to those of the first embodiment are obtained.

Third Embodiment

In a third embodiment, a vehicle brake system 1 includes one ECU. A vehicle brake device 80 includes two stroke sensors. Other than that, the present embodiment is similar to the first embodiment.

Figure 14:
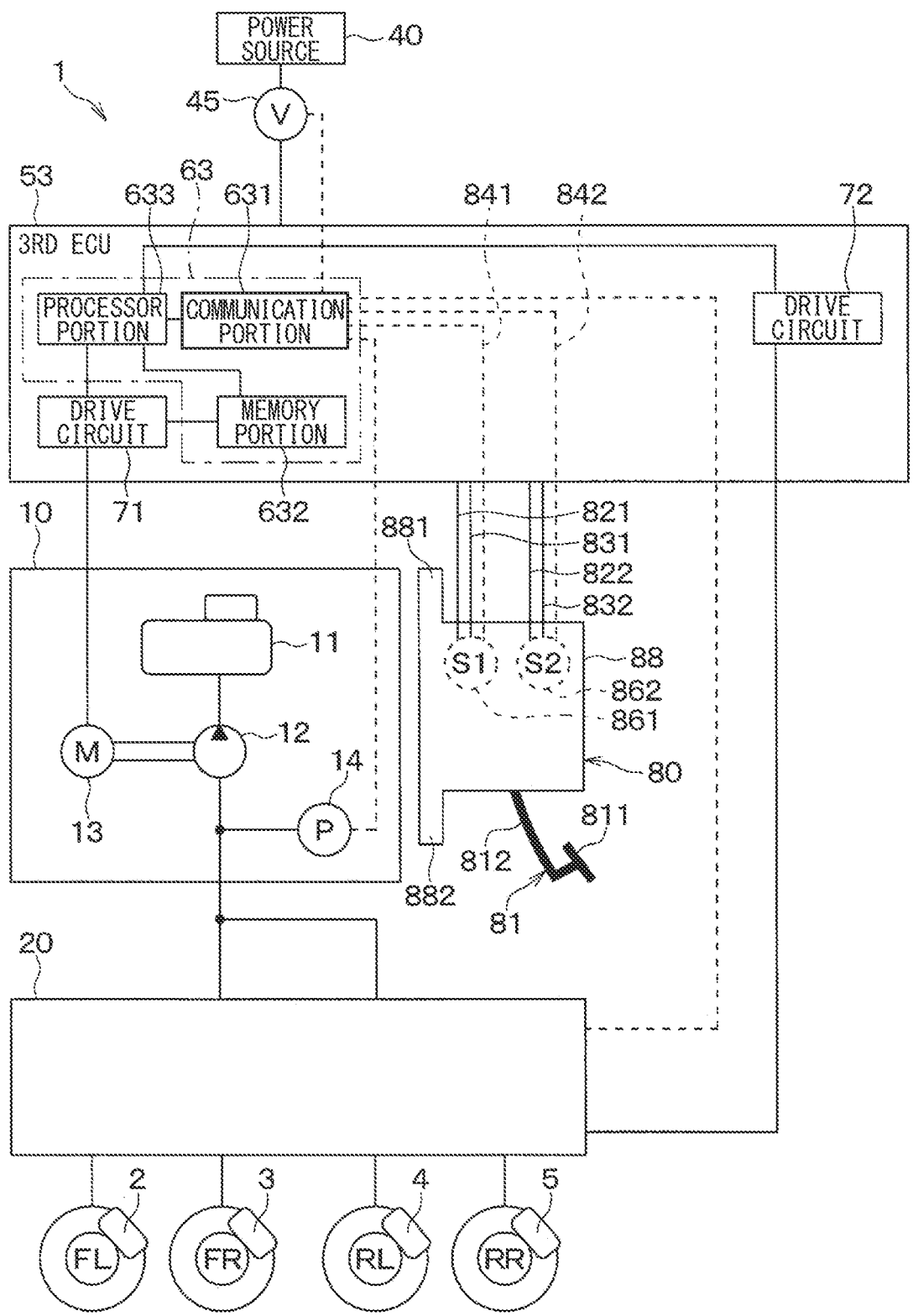
FIG. 14 is a configuration diagram of a vehicle brake system according to a third embodiment.

In the third embodiment, the vehicle brake system 1 further includes a third ECU 53 as illustrated in FIG. 14.

The third ECU 53 corresponds to a fluid pressure controller, and controls a first actuator 10 by controlling a first actuator motor 13. The third ECU 53 also controls a second actuator 20 by controlling a second actuator motor 30. Specifically, the third ECU 53 includes a third microcontroller 63, and the first drive circuit 71 and the second drive circuit 72 described above.

The third microcontroller 63 corresponds to a fluid pressure control portion, and controls the first actuator 10 by controlling the first drive circuit 71. The third microcontroller 63 also controls the second actuator 20 by controlling the second drive circuit 72. Specifically, the third microcontroller 63 includes a third communication portion 631, a third memory portion 632, and a third control processor portion 633.

The third communication portion 631 includes an interface for communicating with a voltage sensor 45. The third communication portion 631 also includes an interface for communicating with a first pressure sensor 14, an interface for communicating with a second pressure sensor 213, and an interface for communicating with a third pressure sensor 263. Furthermore, the third communication portion 631 includes an interface for communicating with a first stroke sensor 861 described later and an interface for communicating with a second stroke sensor 862.

The third memory portion 632 includes a non-volatile memory such as a ROM and a flash memory, and a volatile memory such as a RAM. The non-volatile memory and the volatile memory are both non-transitory tangible memory media.

The third control processor portion 633 includes a CPU or the like, and outputs a signal for driving the first actuator motor 13 to the first drive circuit 71 by executing a program stored in the ROM of the third memory portion 632. The third control processor portion 633 also outputs a signal for driving the second actuator motor 30 to the second drive circuit 72 by executing a program stored in the ROM of the third memory portion 632.

The vehicle brake device 80 includes the brake pedal 81, the housing 88, and the reaction force generator 90 described above. The vehicle brake device 80 also includes a first sensor power source wire 821, a first sensor ground wire 831, and a first sensor output wire 841. The vehicle brake device 80 further includes a second sensor power source wire 822, a second sensor ground wire 832, a second sensor output wire 842, the first stroke sensor 861, and the second stroke sensor 862.

Figure 15:
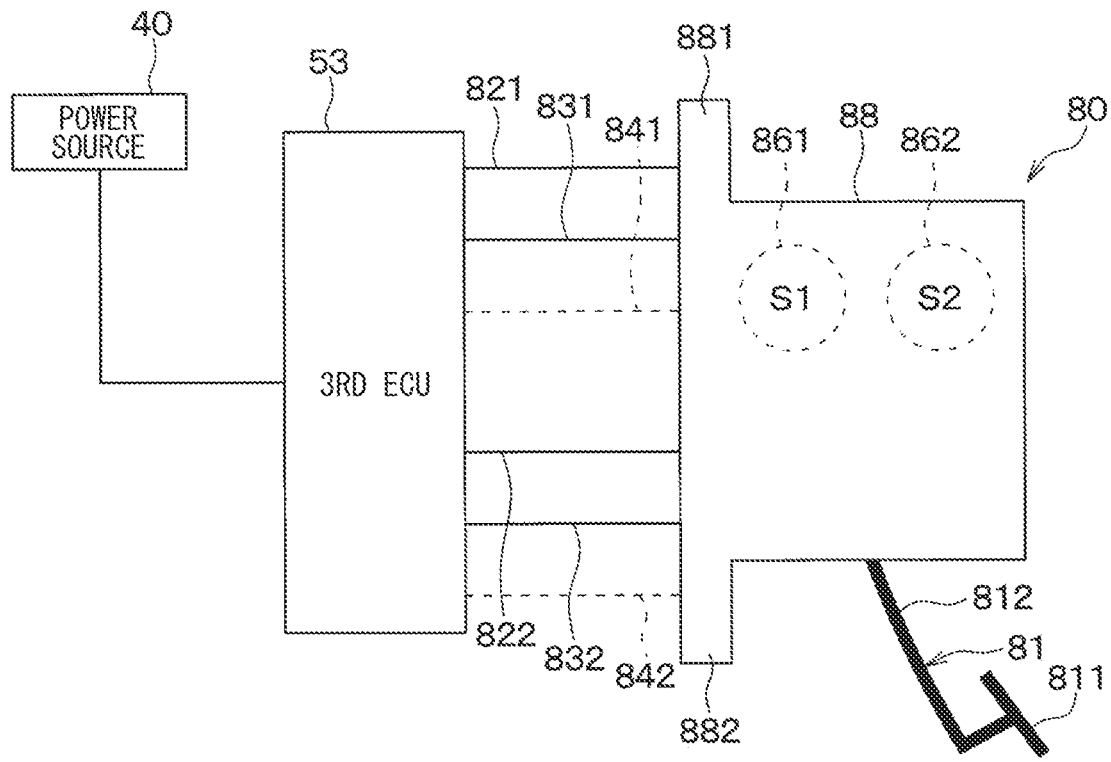
FIG. 15 is a wire diagram of the vehicle brake system.

As illustrated in FIGS. 14 and 15, the first sensor power source wire 821 is connected to the third ECU 53 and the first stroke sensor 861. Thus, power from a power source 40 is supplied to the first stroke sensor 861 via the third ECU 53 and the first sensor power source wire 821.

The first sensor ground wire 831 is connected to the third ECU 53 and the first stroke sensor 861.

The first sensor output wire 841 is connected to the third ECU 53 and the first stroke sensor 861.

The second sensor power source wire 822 is connected to the third ECU 53 and the second stroke sensor 862. Thus, power from the power source 40 is supplied to the second stroke sensor 862 via the third ECU 53 and the second sensor power source wire 822.

The second sensor ground wire 832 is connected to the third ECU 53 and the second stroke sensor 862.

The second sensor output wire 842 is connected to the third ECU 53 and the second stroke sensor 862.

Figure 16:
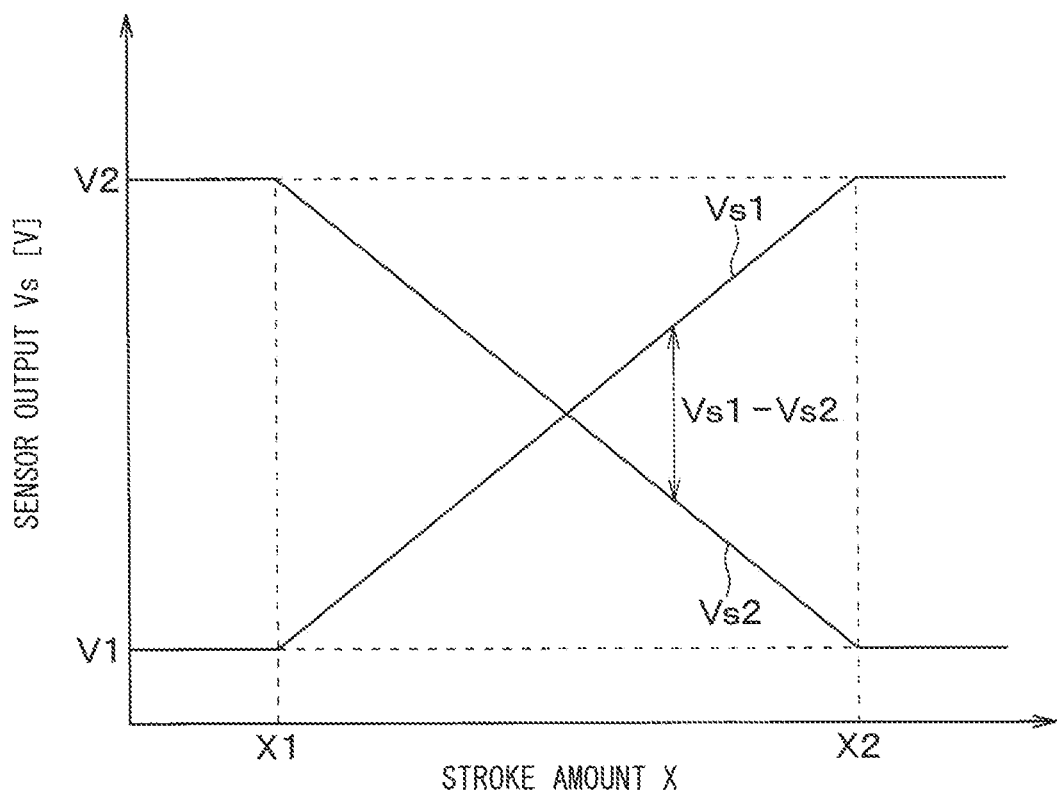
FIG. 16 is a diagram illustrating a relationship between a stroke amount and a sensor output.

The first stroke sensor 861 outputs, to the third ECU 53 via the first sensor output wire 841, a signal in accordance with a stroke amount X of the brake pedal 81. Here, as illustrated in FIG. 16, a first sensor output Vs1, which is a signal from the first stroke sensor 861, is adjusted to be constant at V1 when the stroke amount X is less than X1. The first sensor output Vs1 is adjusted to increase with an increase in the stroke amount X when the stroke amount X is equal to or higher than X1 and less than X2. Furthermore, the first sensor output Vs1 is adjusted to be constant at V2, which is a value larger than V1, when the stroke amount X is equal to or higher than X2. V1 and V2 are set on the basis of an experiment, a simulation, or the like. Here, V1 is set to a value smaller than the above-described first sensor threshold Vs_th1 as described later. Furthermore, V2 is set to a value larger than the second sensor threshold Vs_th2 described above.

As illustrated in FIGS. 14 and 15, the second stroke sensor 862 outputs, to the third ECU 53 via the second sensor output wire 842, a signal in accordance with the stroke amount X of the brake pedal 81. Here, as illustrated in FIG. 16, a second sensor output Vs2, which is a signal from the second stroke sensor 862, is adjusted to be constant at V2, which is a value larger than V1, when the stroke amount X is less than X1. The second sensor output Vs2 is adjusted to decrease with an increase in the stroke amount X when the stroke amount X is equal to or higher than X1 and less than X2. Furthermore, the second sensor output Vs2 is adjusted to be constant at V1, which is a value smaller than V2, when the stroke amount X is equal to or higher than X2.

Figure 17:
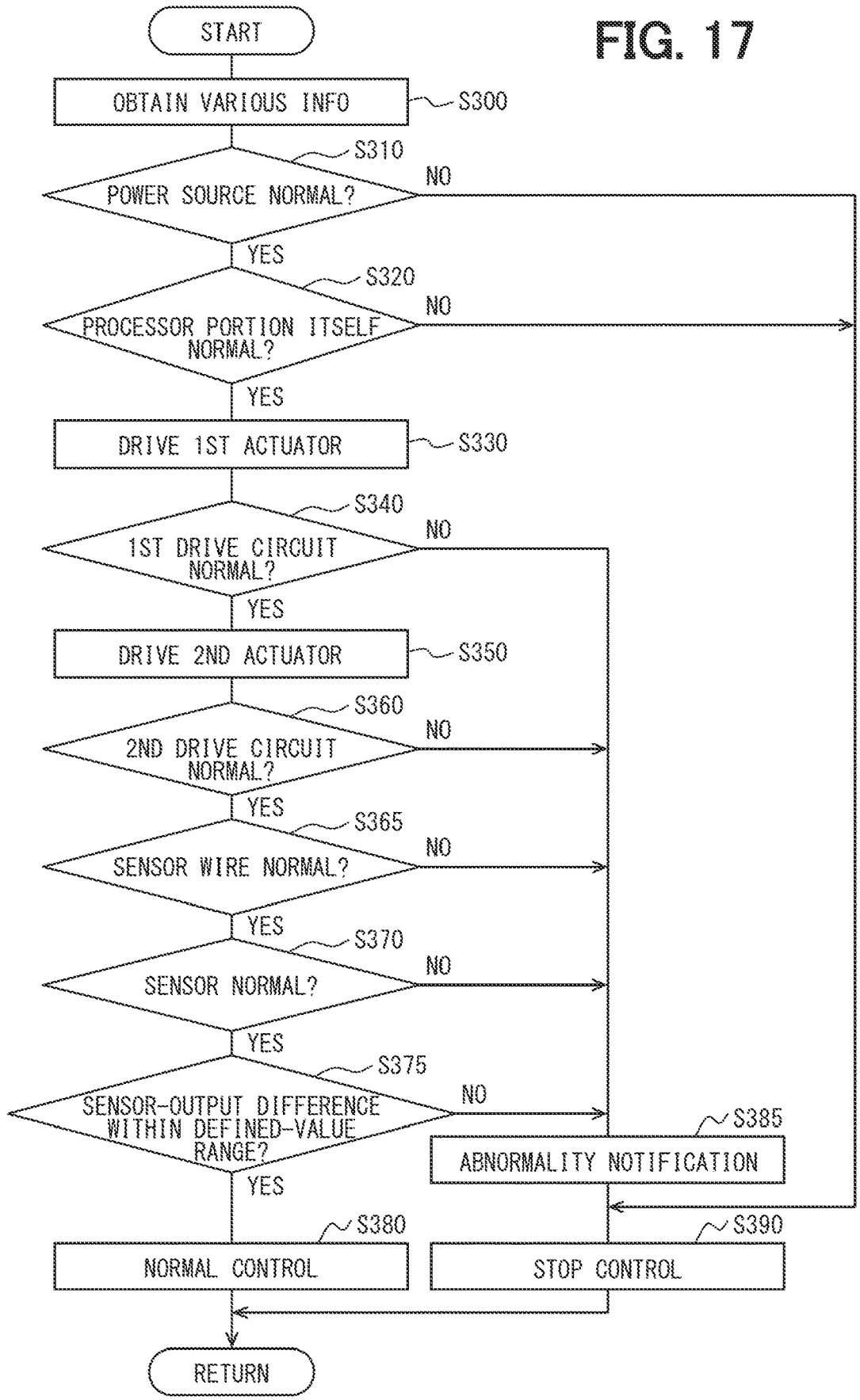
FIG. 17 is a flowchart illustrating processing by a third control processor portion.

Next, processing by the third control processor portion 633 will be described with reference to a flowchart in FIG. 17. Here, for example, when an ignition of a vehicle 6 is turned on, the third control processor portion 633 executes a program stored in the ROM of the third memory portion 632.

In step S300, the third control processor portion 633 obtains various types of information. Specifically, the third control processor portion 633 obtains a third voltage Vb3, which is a voltage applied from the power source 40 to the third ECU 53, from the voltage sensor 45 via the third communication portion 631. In addition, the third control processor portion 633 obtains, from the first pressure sensor 14 via the third communication portion 631, the fluid pressure of the brake fluid flowing from the first actuator 10 to the second actuator 20. Furthermore, the third control processor portion 633 obtains the brake fluid pressure downstream of a first differential pressure control valve 212 from the second pressure sensor 213 via the third communication portion 631. In addition, the third control processor portion 633 obtains the brake fluid pressure downstream of a second differential pressure control valve 262 from the third pressure sensor 263 via the third communication portion 631. Furthermore, the third control processor portion 633 obtains the first sensor output Vs1 corresponding to the stroke amount X of the brake pedal 81 from the first stroke sensor 861 via the first sensor output wire 841 and the third communication portion 631. In addition, the third control processor portion 633 obtains the second sensor output Vs2 corresponding to the stroke amount X of the brake pedal 81 from the second stroke sensor 862 via the second sensor output wire 842 and the third communication portion 631. Furthermore, the third control processor portion 633 obtains the yaw rate, the acceleration, the steering angle, each wheel speed, and the vehicle speed from each sensor (not illustrated) via the third communication portion 631, in a similar manner to step S200 by the second control processor portion 623.

Subsequently, in step S310, the third control processor portion 633 determines whether the power source 40 is normal, in a similar manner to step S110 by the first control processor portion 613 and step S210 by the second control processor portion 623 described above. Specifically, the third control processor portion 633 determines whether the third voltage Vb3 obtained in step S300 is equal to or higher than a first voltage threshold Vb_th1 and equal to or lower than a second voltage threshold Vb_th2. When the third voltage Vb3 is equal to or higher than the first voltage threshold Vb_th1 and equal to or lower than the second voltage threshold Vb_th2, the power source 40 is normal, and thus the processing proceeds to step S320. When the third voltage Vb3 is less than the first voltage threshold Vb_th1, the power source 40 is abnormal, and thus the processing proceeds to step S390. Furthermore, when the third voltage Vb3 is higher than the second voltage threshold Vb_th2, the power source 40 is abnormal, and thus the processing proceeds to step S390.

In step S320 following step S310, the third control processor portion 633 determines whether the third control processor portion 633 itself is normal, in a similar manner to step S130 by the first control processor portion 613 and step S230 by the second control processor portion 623 described above. Specifically, the third control processor portion 633 determines whether the third control processor portion 633 itself is normal by outputting a watchdog signal to a monitoring IC (not illustrated). When the third control processor portion 633 itself is normal, the processing proceeds to step S330. When the third control processor portion 633 itself is abnormal, the processing proceeds to step S385.

In step S330 following step S320, the third control processor portion 633 drives the first actuator 10 in a similar manner to step S140 by the first control processor portion 613 described above. Specifically, the third control processor portion 633 outputs a signal for driving the first actuator 10 to the first drive circuit 71. The first drive circuit 71 drives the first actuator motor 13 on the basis of the signal from the third control processor portion 633. The first actuator motor 13 rotates on the basis of a signal from the first drive circuit 71 to drive a first pump 12. The first pump 12 increases the pressure of the brake fluid from a reservoir 11. The brake fluid with the increased fluid pressure flows from the first actuator 10 to the second actuator 20.

Subsequently, in step S340, the third control processor portion 633 determines whether the first drive circuit 71 is normal, in a similar manner to step S150 by the first control processor portion 613 described above. Specifically, the third control processor portion 633 obtains, from the first pressure sensor 14 via the third communication portion 631, a first fluid pressure P1, which is the fluid pressure of the brake fluid that has flowed from the first actuator 10 to the second actuator 20 in step S330. Then, the third control processor portion 633 determines whether the first fluid pressure P1 is equal to or higher than a first fluid pressure threshold value P1_th. When the first fluid pressure P1 is equal to or higher than the first fluid pressure threshold value P1_th, the first actuator 10 is normally driven by the first drive circuit 71, and thus the first drive circuit 71 is normal. At this time, the processing therefore proceeds to step S350. When the first fluid pressure P1 is less than the first fluid pressure threshold value P1_th, the first actuator 10 is not normally driven by the first drive circuit 71, and thus the first drive circuit 71 is abnormal. At this time, the processing therefore proceeds to step S385.

In step S350 following step S340, the third control processor portion 633 drives the second actuator 20 in a similar manner to step S240 by the second control processor portion 623 described above. Specifically, the third control processor portion 633 outputs a signal for driving the second actuator 20 to the second drive circuit 72. The second drive circuit 72 drives the second actuator motor 30 on the basis of the signal from the third control processor portion 633. The second actuator motor 30 rotates on the basis of a signal from the second drive circuit 72 to drive a second pump 224 and a third pump 274.

At this time, the second pump 224 sucks the brake fluid stored in a first pressure-regulating reservoir 221. The sucked brake fluid flows among the first differential pressure control valve 212, a first pressure-increasing control valve 215, and a second pressure-increasing control valve 218 via a first return pipeline 223. Thus, the pressure of the brake fluid among the first differential pressure control valve 212, the first pressure-increasing control valve 215, and the second pressure-increasing control valve 218 increases.

At this time, the third pump 274 sucks the brake fluid stored in a second pressure-regulating reservoir 271. The sucked brake fluid flows among the second differential pressure control valve 262, a third pressure-increasing control valve 265, and a fourth pressure-increasing control valve 268 via a second return pipeline 273. Thus, the pressure of the brake fluid among the second differential pressure control valve 262, the third pressure-increasing control valve 265, and the fourth pressure-increasing control valve 268 increases.

Subsequently, in step S360, the third control processor portion 633 determines whether the second drive circuit 72 is normal, in a similar manner to step S250 by the second control processor portion 623 described above. Specifically, the third control processor portion 633 obtains, from the second pressure sensor 213 via the third communication portion 631, a second fluid pressure P2, which is the pressure of the brake fluid among the first differential pressure control valve 212, the first pressure-increasing control valve 215, and the second pressure-increasing control valve 218 that has flowed in step S350. In addition, the third control processor portion 633 obtains, from the third pressure sensor 263 via the third communication portion 631, a third fluid pressure P3, which is the pressure of the brake fluid among the second differential pressure control valve 262, the third pressure-increasing control valve 265, and the fourth pressure-increasing control valve 268 that has flowed in step S350.

Then, the third control processor portion 633 determines whether the second fluid pressure P2 is equal to or higher than a second fluid pressure threshold value P2_th and the third fluid pressure P3 is equal to or higher than a third fluid pressure threshold value P3_th. When the second fluid pressure P2 is equal to or higher than the second fluid pressure threshold value P2_th and the third fluid pressure P3 is equal to or higher than the third fluid pressure threshold value P3_th, the second actuator 20 is normally driven by the second drive circuit 72, and thus the second drive circuit 72 is normal. At this time, the processing therefore proceeds to step S365. When the second fluid pressure P2 is less than the second fluid pressure threshold value P2_th or the third fluid pressure P3 is less than the third fluid pressure threshold value P3_th, the second actuator 20 is not normally driven by the second drive circuit 72, and thus the second drive circuit 72 is abnormal. At this time, the processing therefore proceeds to step S385.

In step S365 following step S360, the third control processor portion 633 determines whether the first sensor power source wire 821 and the second sensor power source wire 822 are normal. Specifically, the third control processor portion 633 determines whether the first sensor output Vs1 and the second sensor output Vs2 obtained in step S300 are equal to or higher than V1 and equal to or lower than V2. As described above, V1 and V2 are set on the basis of an experiment, a simulation, or the like. Here, V1 is set to a value smaller than the above-described first sensor threshold Vs_th1 as described later. Furthermore, V2 is set to a value larger than the second sensor threshold Vs_th2 described above.

When the first sensor output Vs1 is equal to or higher than V1 and equal to or lower than V2, the first sensor power source wire 821 is normal. When the second sensor output Vs2 is equal to or higher than V1 and equal to or lower than V2, the second sensor power source wire 822 is normal. Thus, when the first sensor output Vs1 and the second sensor output Vs2 are equal to or higher than V1 and equal to or lower than V2, the first sensor power source wire 821 and the second sensor power source wire 822 are normal, and thus the processing proceeds to step S370. When the first sensor output Vs1 or the second sensor output Vs2 is less than V1, the first sensor power source wire 821 or the second sensor power source wire 822 is abnormal, for example, disconnected, and thus the processing proceeds to step S385. Furthermore, when the first sensor output Vs1 or the second sensor output Vs2 is larger than V2, the first sensor power source wire 821 or the second sensor power source wire 822 is abnormal, for example, disconnected, and thus the processing proceeds to step S385.

In step S370 following step S365, the third control processor portion 633 determines whether the first stroke sensor 861 is normal. Specifically, the third control processor portion 633 determines whether the first sensor output Vs1 obtained in step S300 is equal to or higher than the first sensor threshold Vs_th1 and equal to or lower than the second sensor threshold Vs_th2. As described above, the first sensor threshold Vs_th1 is set on the basis of, for example, the initial position of the brake pedal 81 and the variation in position of the brake pedal 81. The second sensor threshold Vs_th2 is set on the basis of, for example, the maximum value of the stroke amount X of the brake pedal 81 and the variation in position of the brake pedal 81. Here, when the stroke amount X is a value that is close to X1 and larger than X1, that is, when X>X1 holds, the brake pedal 81 is at the initial position. When the stroke amount X is a value that is close to X2 and smaller than X2, that is, when X2>X holds, the stroke amount X of the brake pedal 81 is at the maximum value. Here, V1, V2, the first sensor threshold Vs_th1, and the second sensor threshold Vs_th2 therefore have a relationship of V1<Vs_th1<Vs_th2<V2.

When the first sensor output Vs1 is equal to or higher than the first sensor threshold Vs_th1 and equal to or lower than the second sensor threshold Vs_th2, the first stroke sensor 861 is normal, and thus the processing proceeds to step S375. When the first sensor output Vs1 is equal to or higher than V1 and less than the first sensor threshold Vs_th1, the first stroke sensor 861 is abnormal, and thus the processing proceeds to step S385. Furthermore, when the first sensor output Vs1 is larger than the second sensor threshold Vs_th2 and equal to or lower than V2, the first stroke sensor 861 is abnormal, and thus the processing proceeds to step S385. At this time, in a similar manner to the above, the third control processor portion 633 may determine whether the second stroke sensor 862 is normal on the basis of the second sensor output Vs2 obtained in step S300.

In step S375 following step S370, the third control processor portion 633 determines whether the first stroke sensor 861 and the second stroke sensor 862 are normal. Specifically, the third control processor portion 633 calculates a sensor output difference Vs1−Vs2, which is a relative value of the difference between the first sensor output Vs1 and the second sensor output Vs2, on the basis of the first sensor output Vs1 and the second sensor output Vs2 obtained in step S300.

Here, as described above, the first sensor output Vs1 is adjusted to be constant at V1 when the stroke amount X is less than X1 as illustrated in FIG. 16. The first sensor output Vs1 is adjusted to increase with an increase in the stroke amount X when the stroke amount X is equal to or higher than X1 and less than X2. Furthermore, the first sensor output Vs1 is constant at V2 when the stroke amount X is equal to or higher than X2. The second sensor output Vs2 is adjusted to be constant at V2, which is a value larger than V1, when the stroke amount X is less than X1. The second sensor output Vs2 is adjusted to decrease with an increase in the stroke amount X when the stroke amount X is equal to or higher than X1 and less than X2. Furthermore, the second sensor output Vs2 is adjusted to be constant at V1, which is a value smaller than V2, when the stroke amount X is equal to or higher than X2. Thus, when the first sensor output Vs1 and the second sensor output Vs2 are normal, the sensor output difference Vs1−Vs2 becomes a value defined by the stroke amount X.

Thus, the third control processor portion 633 determines whether the calculated sensor output difference Vs1−Vs2 is within the range of the defined value described above. When the sensor output difference Vs1−Vs2 is within the range of the defined value described above, the first sensor output Vs1 and the second sensor output Vs2 are normal, and thus the processing proceeds to step S380. When the sensor output difference Vs1−Vs2 is outside the range of the defined value described above, the first sensor output Vs1 or the second sensor output Vs2 is abnormal. At this time, the third control processor portion 633 identifies which of the first stroke sensor 861 or the second stroke sensor 862 is abnormal. Thereafter, the processing proceeds to step S385.

In step S380 following step S375, the third control processor portion 633 controls the first actuator 10 in a similar manner to step S170 by the first control processor portion 613 described above. Specifically, the third control processor portion 633 performs normal control on the first actuator 10 on the basis of the first sensor output Vs1 corresponding to the stroke amount X obtained in step S300. At this time, the third control processor portion 633 may perform normal control on the first actuator 10 on the basis of the second sensor output Vs2 corresponding to the stroke amount X obtained in step S300.

The third control processor portion 633 controls the second actuator 20 in a similar manner to step S270 by the second control processor portion 623 described above. Specifically, the third control processor portion 633 performs normal control, ABS control, VSC control, and the like. Thereafter, the processing returns to step S300. The third control processor portion 633 may perform normal control on the second actuator 20 on the basis of the second sensor output Vs2 corresponding to the stroke amount X obtained in step S300.

In step S385, when the third control processor portion 633 itself is abnormal, the third control processor portion 633 outputs a signal indicating that the third control processor portion 633 is abnormal to a notification device (not illustrated). When this signal has been received, this notification device notifies the driver of the vehicle 6 that the third control processor portion 633 is abnormal by screen display, sound, light, and the like.

When the first drive circuit 71 is abnormal, the third control processor portion 633 outputs a signal indicating that the first drive circuit 71 is abnormal to the notification device (not illustrated). When this signal has been received, this notification device notifies the driver of the vehicle 6 that the first drive circuit 71 is abnormal by screen display, sound, light, and the like.

Furthermore, when the second drive circuit 72 is abnormal, the third control processor portion 633 outputs a signal indicating that the second drive circuit 72 is abnormal to the notification device (not illustrated). When this signal has been received, this notification device notifies the driver of the vehicle 6 that the second drive circuit 72 is abnormal by screen display, sound, light, and the like.

When the first sensor power source wire 821 is abnormal, the third control processor portion 633 outputs a signal indicating that the first sensor power source wire 821 is abnormal to the notification device (not illustrated). When this signal has been received, this notification device notifies the driver of the vehicle 6 that the first sensor power source wire 821 is abnormal by screen display, sound, light, and the like.

Furthermore, when the second sensor power source wire 822 is abnormal, the third control processor portion 633 outputs a signal indicating that the second sensor power source wire 822 is abnormal to the notification device (not illustrated). When this signal has been received, this notification device notifies the driver of the vehicle 6 that the second sensor power source wire 822 is abnormal by screen display, sound, light, and the like.

When the first stroke sensor 861 is abnormal, the third control processor portion 633 outputs a signal indicating that the first stroke sensor 861 is abnormal to the notification device (not illustrated). When this signal has been received, this notification device notifies the driver of the vehicle 6 that the first stroke sensor 861 is abnormal by screen display, sound, light, and the like.

Furthermore, when the second stroke sensor 862 is abnormal, the third control processor portion 633 outputs a signal indicating that the second stroke sensor 862 is abnormal to the notification device (not illustrated). When this signal has been received, this notification device notifies the driver of the vehicle 6 that the second stroke sensor 862 is abnormal by screen display, sound, light, and the like. After step S385, the processing proceeds to step S390.

Subsequently, in step S390, in a case where the power source 40 is abnormal or in a case where the third control processor portion 633 itself is abnormal, the third control processor portion 633 cannot normally control the first drive circuit 71 and the second drive circuit 72. At this time, a processor portion or the like other than the third control processor portion 633 controls the vehicle 6 to decelerate and stop in order to ensure the safety of the vehicle 6.

For example, in a similar manner to the cases of step S190 by the first control processor portion 613 and step S290 by the second control processor portion 623 described above, an ECU other than the third ECU 53 controls a regenerative brake, a parking brake, and the like (not illustrated). Thus, the vehicle 6 safely decelerates and stops.

In a case where the power source 40 and the third control processor portion 633 are normal, the third control processor portion 633 can normally control the first drive circuit 71 and the second drive circuit 72. At this time, the third control processor portion 633 controls the first drive circuit 71 or the second drive circuit 72 that are normal to decelerate and stop the vehicle 6, in a similar manner to the cases of step S190 and step S290 described above. After step S390, the processing returns to step S300.

In this manner, the processing by the third control processor portion 633 is performed.

Also in the third embodiment, effects similar to those of the first embodiment are obtained.

In the third embodiment, the third control processor portion 633 determines whether the first sensor power source wire 821 is normal on the basis of the first sensor output Vs1 of the first stroke sensor 861, V1, and V2. Furthermore, the third control processor portion 633 determines whether the second sensor power source wire 822 is normal on the basis of the second sensor output Vs2 of the second stroke sensor 862, V1, and V2. In addition, the third control processor portion 633 determines whether the first stroke sensor 861 is normal on the basis of the first sensor output Vs1 of the first stroke sensor 861, the first sensor threshold Vs_th1, and the second sensor threshold Vs_th2. Furthermore, the third control processor portion 633 determines whether the second stroke sensor 862 is normal on the basis of the second sensor output Vs2 of the second stroke sensor 862, the first sensor threshold Vs_th1, and the second sensor threshold Vs_th2. Thus, it is possible to distinguish between wire abnormality and sensor abnormality. As described above, V1, V2, the first sensor threshold Vs_th1, and the second sensor threshold Vs_th2 have a relationship of $V1<Vs\_th1<Vs\_th2<V2$.

Furthermore, the third control processor portion 633 determines whether the first stroke sensor 861 and the second stroke sensor 862 are normal on the basis of the sensor output difference Vs1−Vs2. Thus, sensor abnormality is easily detected.

The vehicle brake system 1 includes the first stroke sensor 861 and the second stroke sensor 862. Thus, even in a case where one of the first stroke sensor 861 and the second stroke sensor 862 fails, the other, which is normal, can be used to safely decelerate and stop the vehicle 6. Thus, redundancy of the vehicle brake system 1 can be secured, and the redundancy of the vehicle brake system 1 is improved.

Fourth Embodiment

In a fourth embodiment, a vehicle brake system 1 includes two power sources and two voltage sensors. A vehicle brake device 80 includes two stroke sensors. Furthermore, processing by a first control processor portion 613 and a second control processor portion 623 is different from the processing in the first embodiment. Other than that, the present embodiment is similar to the first embodiment.

Figure 18:
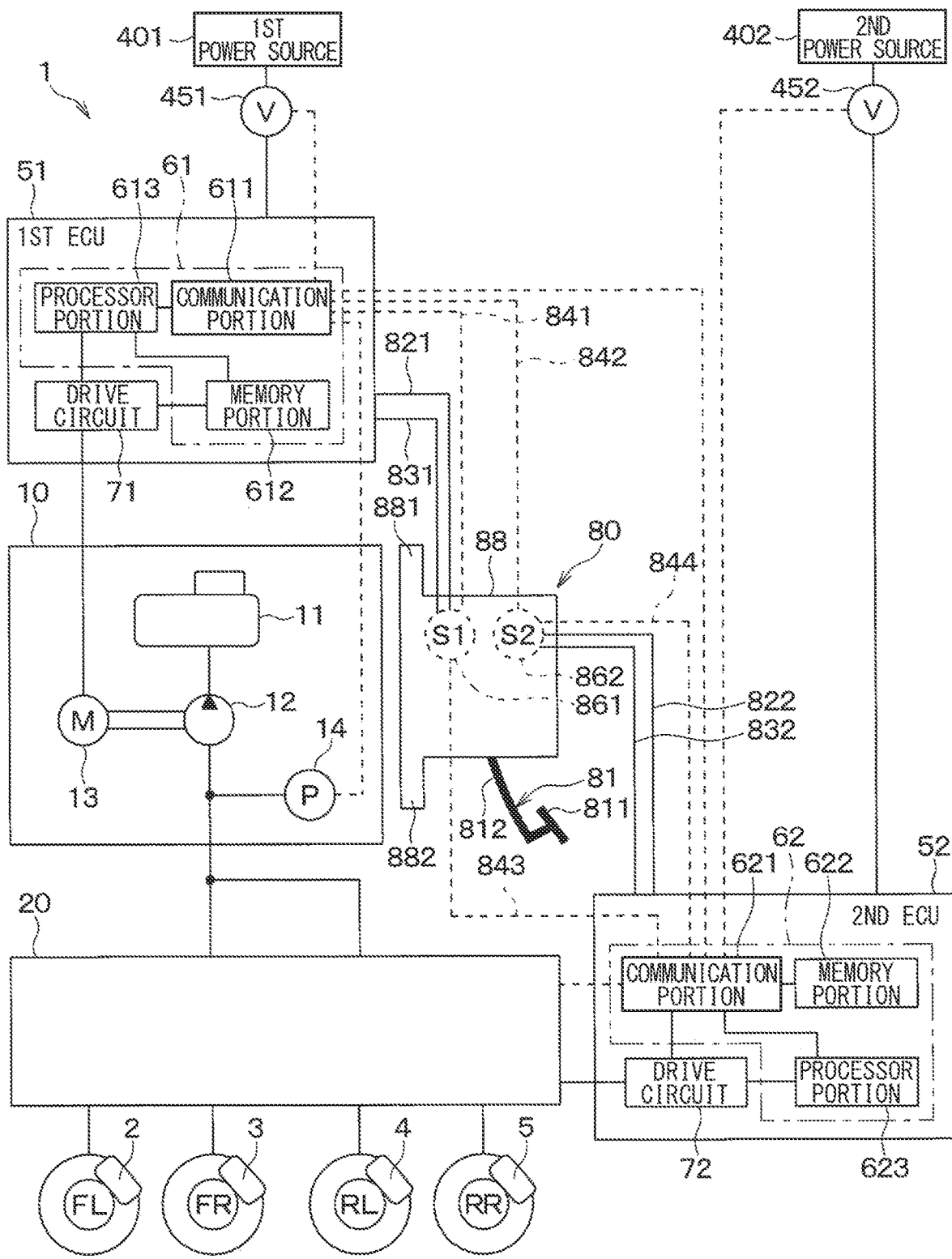
FIG. 18 is a configuration diagram of a vehicle brake system according to a fourth embodiment.

In the fourth embodiment, as illustrated in FIG. 18, the vehicle brake system 1 includes a first power source 401, a second power source 402, a first voltage sensor 451, and a second voltage sensor 452.

The first power source 401 supplies power to a first ECU 51.

The first voltage sensor 451 outputs, to the first ECU 51, a signal in accordance with a voltage applied from the first power source 401 to the first ECU 51.

The second power source 402 supplies power to a second ECU 52.

The second voltage sensor 452 outputs, to the second ECU 52, a signal in accordance with a voltage applied from the second power source 402 to the second ECU 52.

The vehicle brake device 80 includes a brake pedal 81, a housing 88, and a reaction force generator 90 similar to those in the first embodiment described above. The vehicle brake device 80 also includes a first sensor power source wire 821, a first sensor ground wire 831, a first sensor output wire 841, and a second sensor output wire 842. Furthermore, the vehicle brake device 80 includes a second sensor power source wire 822, a second sensor ground wire 832, a third sensor output wire 843, a fourth sensor output wire 844, a first stroke sensor 861, and a second stroke sensor 862.

Figure 19:
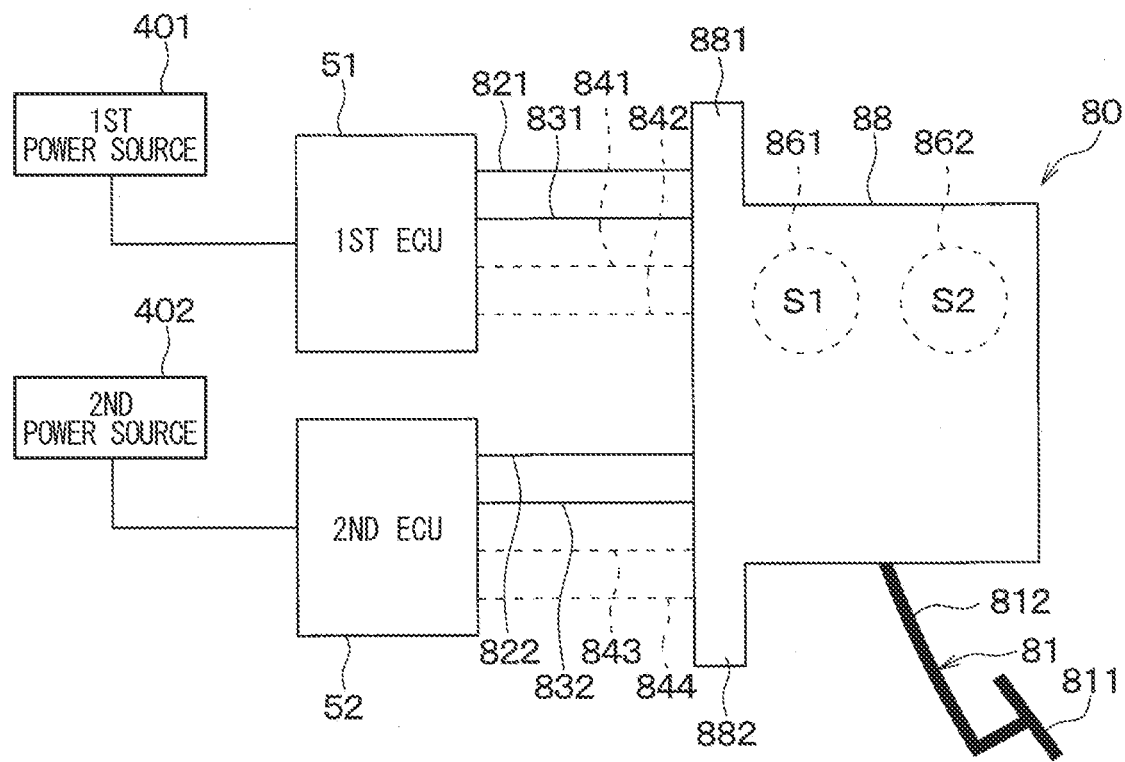
FIG. 19 is a wire diagram of the vehicle brake system.

As illustrated in FIGS. 18 and 19, the first sensor power source wire 821 is connected to the first ECU 51 and the first stroke sensor 861. Thus, power from the first power source 401 is supplied to the first stroke sensor 861 via the first ECU 51 and the first sensor power source wire 821.

The first sensor ground wire 831 is connected to the first ECU 51 and the first stroke sensor 861.

The first sensor output wire 841 is connected to the first ECU 51 and the first stroke sensor 861.

The second sensor output wire 842 is connected to the first ECU 51 and the second stroke sensor 862.

The second sensor power source wire 822 is connected to the second ECU 52 and the second stroke sensor 862. Thus, power from the second power source 402 is supplied to the second stroke sensor 862 via the second ECU 52 and the second sensor power source wire 822.

The second sensor ground wire 832 is connected to the second ECU 52 and the second stroke sensor 862.

The third sensor output wire 843 is connected to the second ECU 52 and the first stroke sensor 861.

The fourth sensor output wire 844 is connected to the second ECU 52 and the second stroke sensor 862.

The first stroke sensor 861 outputs, to the first ECU 51 via the first sensor output wire 841, a signal in accordance with a stroke amount X of the brake pedal 81. The first stroke sensor 861 also outputs, to the second ECU 52 via the third sensor output wire 843, a signal in accordance with the stroke amount X of the brake pedal 81. Here, in a similar manner to the third embodiment described above, a first sensor output Vs1, which is a signal from the first stroke sensor 861, is adjusted as illustrated in FIG. 16.

The second stroke sensor 862 outputs, to the first ECU 51 via the second sensor output wire 842, a signal in accordance with the stroke amount X of the brake pedal 81. The second stroke sensor 862 also outputs, to the second ECU 52 via the fourth sensor output wire 844, a signal in accordance with the stroke amount X of the brake pedal 81. Here, in a similar manner to the third embodiment described above, a second sensor output Vs2, which is a signal from the second stroke sensor 862, is adjusted as illustrated in FIG. 16.

In the fourth embodiment, the vehicle brake system 1 is configured as described above.

Figure 20:
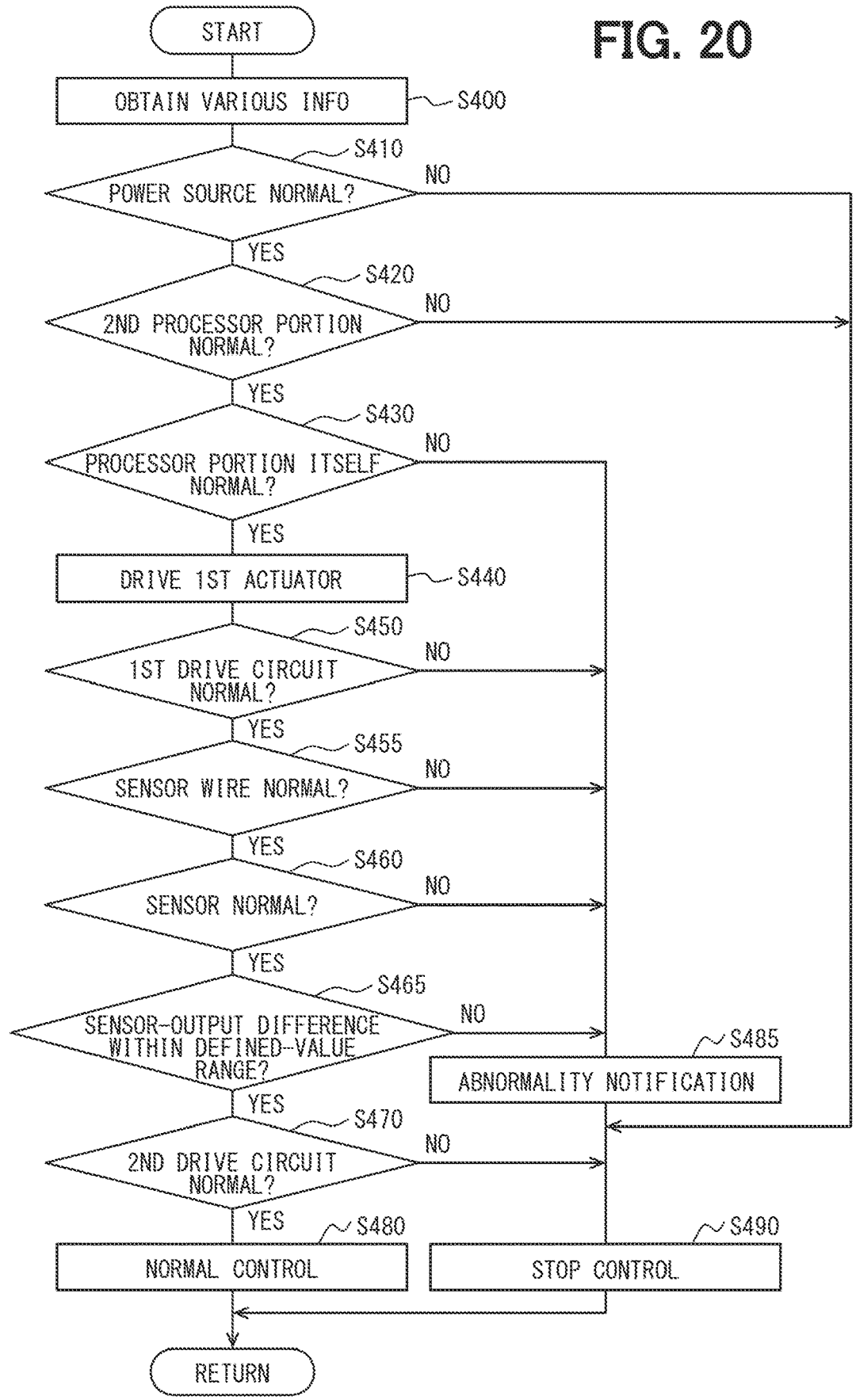
FIG. 20 is a flowchart illustrating processing by a first control processor portion.

Next, processing by the first control processor portion 613 will be described with reference to a flowchart in FIG. 20. In a similar manner to the above, when an ignition of a vehicle 6 is turned on, the first control processor portion 613 executes a program stored in a ROM of a first memory portion 612.

In step S400, the first control processor portion 613 obtains various types of information. Specifically, the first control processor portion 613 obtains a first voltage Vb1, which is a voltage applied from the first power source 401 to the first ECU 51, from the first voltage sensor 451 via a first communication portion 611. In addition, the first control processor portion 613 obtains, from a first pressure sensor 14 via the first communication portion 611, the fluid pressure of the brake fluid flowing from a first actuator 10 to a second actuator 20. Furthermore, the first control processor portion 613 obtains the first sensor output Vs1 corresponding to the stroke amount X of the brake pedal 81 from the first stroke sensor 861 via the first sensor output wire 841 and the first communication portion 611. In addition, the first control processor portion 613 obtains the second sensor output Vs2 corresponding to the stroke amount X of the brake pedal 81 from the second stroke sensor 862 via the second sensor output wire 842 and the first communication portion 611.

Subsequently, in step S410, the first control processor portion 613 determines whether the first power source 401 is normal, in a similar manner to step S110. Specifically, the first control processor portion 613 determines whether the first voltage Vb1 obtained in step S400 is equal to or higher than a first voltage threshold Vb_th1 and equal to or lower than a second voltage threshold Vb_th2. When the first voltage Vb1 is equal to or higher than the first voltage threshold Vb_th1 and equal to or lower than the second voltage threshold Vb_th2, the first power source 401 is normal, and thus the processing proceeds to step S420. When the first voltage Vb1 is less than the first voltage threshold Vb_th1, the first power source 401 is abnormal, and thus the processing proceeds to step S490. Furthermore, when the first voltage Vb1 is higher than the second voltage threshold Vb_th2, the first power source 401 is abnormal, and thus the processing proceeds to step S490.

In step S420 following step S410, the first control processor portion 613 determines whether the second control processor portion 623 is normal on the basis of a signal from the second control processor portion 623, in a similar manner to step S120 described above. When the second control processor portion 623 is normal, the processing proceeds to step S430. When the second control processor portion 623 is abnormal, the processing proceeds to step S490.

In step S430 following step S420, the first control processor portion 613 determines whether the first control processor portion 613 itself is normal by using a watchdog signal and a monitoring IC, in a similar manner to step S130 described above. When the first control processor portion 613 itself is normal, the processing proceeds to step S440. When the first control processor portion 613 itself is abnormal, the processing proceeds to step S485.

In step S440 following step S430, the first control processor portion 613 drives the first actuator 10 in a similar manner to step S140 described above.

Subsequently, in step S450, the first control processor portion 613 determines whether a first drive circuit 71 is normal on the basis of a first fluid pressure P1, in a similar manner to step S150 described above. When the first drive circuit 71 is normal, the processing proceeds to step S455. When the first drive circuit 71 is abnormal, the processing proceeds to step S485. As described above, the first fluid pressure P1 is the fluid pressure of the brake fluid that has flowed from the first actuator 10 to the second actuator 20.

In step S455 following step S450, the first control processor portion 613 determines whether the first sensor power source wire 821 and the second sensor power source wire 822 are normal, in a similar manner to step S365 by the third control processor portion 633 described above. Specifically, the first control processor portion 613 determines whether the first sensor power source wire 821 and the second sensor power source wire 822 are normal on the basis of the first sensor output Vs1 and the second sensor output Vs2. When the first sensor power source wire 821 and the second sensor power source wire 822 are normal, the processing proceeds to step S460. When the first sensor power source wire 821 or the second sensor power source wire 822 is abnormal, for example, disconnected, the processing proceeds to step S485.

In step S460 following step S455, the first control processor portion 613 determines whether the first stroke sensor 861 is normal on the basis of the first sensor output Vs1, in a similar manner to step S370 by the third control processor portion 633 described above. When the first stroke sensor 861 is normal, the processing proceeds to step S465. When the first stroke sensor 861 is abnormal, the processing proceeds to step S485. At this time, the first control processor portion 613 may determine whether the second stroke sensor 862 is normal on the basis of the second sensor output Vs2.

In step S465 following step S460, the first control processor portion 613 determines whether the first stroke sensor 861 and the second stroke sensor 862 are normal, in a similar manner to step S375 by the third control processor portion 633 described above. Specifically, the first control processor portion 613 determines whether the first stroke sensor 861 and the second stroke sensor 862 are normal on the basis of a sensor output difference Vs1−Vs2. When the first stroke sensor 861 and the second stroke sensor 862 are normal, the processing proceeds to step S470. When the first stroke sensor 861 or the second stroke sensor 862 is abnormal, the first control processor portion 613 identifies which of the first stroke sensor 861 or the second stroke sensor 862 is abnormal. Thereafter, the processing proceeds to step S485.

In step S470 following step S465, the first control processor portion 613 determines whether a second drive circuit 72 is normal on the basis of a signal from the second control processor portion 623, in a similar manner to step S160 described above. When the second drive circuit 72 is normal, the processing proceeds to step S480. When the second drive circuit 72 is abnormal, the processing proceeds to step S490.

In step S480 following step S470, the first control processor portion 613 performs normal control on the first actuator 10 in a similar manner to step S170 described above. Specifically, the first control processor portion 613 performs normal control on the first actuator 10 on the basis of the first sensor output Vs1 corresponding to the stroke amount X obtained in step S300. At this time, the first control processor portion 613 may perform normal control on the first actuator 10 on the basis of the second sensor output Vs2 corresponding to the stroke amount X obtained in step S300. Thereafter, the processing returns to step S400.

In step S485, the first control processor portion 613 notifies the second control processor portion 623 and a notification device (not illustrated) of each abnormality, in a similar manner to step S180 and step S385 by the third control processor portion 633 described above.

In step S490, the first control processor portion 613 decelerates and stops the vehicle 6 to ensure the safety of the vehicle 6, in a similar manner to step S190 described above. Thereafter, the processing returns to step S400.

In this manner, the processing by the first control processor portion 613 is performed.

Figure 21:
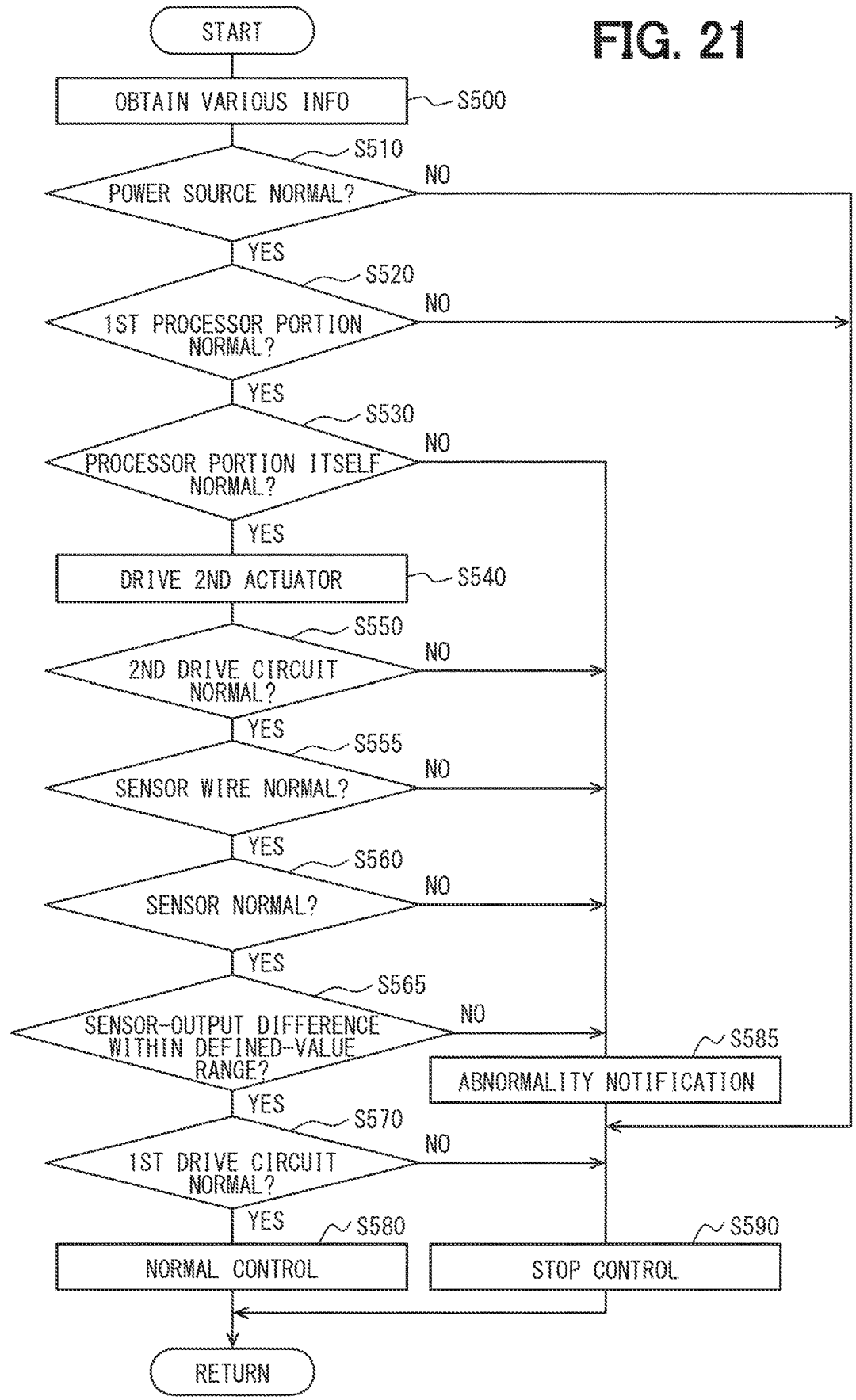
FIG. 21 is a flowchart illustrating processing by a second control processor portion.

Next, processing by the second control processor portion 623 will be described with reference to a flowchart in FIG. 21.

In step S500, the second control processor portion 623 obtains various types of information. Specifically, the second control processor portion 623 obtains a second voltage Vb2, which is a voltage applied from the second power source 402 to the second ECU 52, from the second voltage sensor 452 via a second communication portion 621. In addition, the second control processor portion 623 obtains the brake fluid pressure downstream of a first differential pressure control valve 212 from a second pressure sensor 213 via the second communication portion 621. Furthermore, the second control processor portion 623 obtains the brake fluid pressure downstream of a second differential pressure control valve 262 from a third pressure sensor 263 via the second communication portion 621. In addition, the second control processor portion 623 obtains the first sensor output Vs1 corresponding to the stroke amount X of the brake pedal 81 from the first stroke sensor 861 via the third sensor output wire 843 and the second communication portion 621. Furthermore, the second control processor portion 623 obtains the second sensor output Vs2 corresponding to the stroke amount X of the brake pedal 81 from the second stroke sensor 862 via the fourth sensor output wire 844 and the second communication portion 621. In addition, the second control processor portion 623 obtains the yaw rate, the acceleration, the steering angle, each wheel speed, and the vehicle speed from each sensor (not illustrated) via the second communication portion 621, in a similar manner to step S200.

Subsequently, in step S510, the second control processor portion 623 determines whether the second power source 402 is normal, in a similar manner to step S210. Specifically, the second control processor portion 623 determines whether the second voltage Vb2 obtained in step S500 is equal to or higher than the first voltage threshold Vb_th1 and equal to or lower than the second voltage threshold Vb_th2. When the second voltage Vb2 is equal to or higher than the first voltage threshold Vb_th1 and equal to or lower than the second voltage threshold Vb_th2, the second power source 402 is normal, and thus the processing proceeds to step S520. When the first voltage Vb1 is less than the first voltage threshold Vb_th1, the second power source 402 is abnormal, and thus the processing proceeds to step S590. Furthermore, when the first voltage Vb1 is higher than the second voltage threshold Vb_th2, the second power source 402 is abnormal, and thus the processing proceeds to step S590.

In step S520 following step S510, the second control processor portion 623 determines whether the first control processor portion 613 is normal on the basis of a signal from the first control processor portion 613, in a similar manner to step S220. When the first control processor portion 613 is normal, the processing proceeds to step S530. When the first control processor portion 613 is abnormal, the processing proceeds to step S590.

In step S530 following step S520, the second control processor portion 623 determines whether the second control processor portion 623 itself is normal by using a watchdog signal and the monitoring IC, in a similar manner to step S230. When the second control processor portion 623 itself is normal, the processing proceeds to step S540. When the second control processor portion 623 itself is abnormal, the processing proceeds to step S585.

In step S540 following step S530, the second control processor portion 623 drives the second actuator 20 in a similar manner to step S240.

Subsequently, in step S550, the second control processor portion 623 determines whether the second drive circuit 72 is normal on the basis of a second fluid pressure P2 and a third fluid pressure P3, in a similar manner to step S250. When the second drive circuit 72 is normal, the processing proceeds to step S555. When the second drive circuit 72 is abnormal, the processing proceeds to step S585. As described above, the second fluid pressure P2 is the pressure of the brake fluid among the first differential pressure control valve 212, a first pressure-increasing control valve 215, and a second pressure-increasing control valve 218. As described above, the third fluid pressure P3 is the pressure of the brake fluid among the second differential pressure control valve 262, a third pressure-increasing control valve 265, and a fourth pressure-increasing control valve 268.

In step S555 following step S550, the second control processor portion 623 determines whether the first sensor power source wire 821 and the second sensor power source wire 822 are normal, in a similar manner to step S365 by the third control processor portion 633 described above. Specifically, the second control processor portion 623 determines whether the first sensor power source wire 821 and the second sensor power source wire 822 are normal on the basis of the first sensor output Vs1 and the second sensor output Vs2. When the first sensor power source wire 821 and the second sensor power source wire 822 are normal, the processing proceeds to step S560. When the first sensor power source wire 821 or the second sensor power source wire 822 is abnormal, for example, disconnected, the processing proceeds to step S585.

In step S560 following step S555, the second control processor portion 623 determines whether the first stroke sensor 861 is normal on the basis of the first sensor output Vs1, in a similar manner to step S370 by the third control processor portion 633 described above. When the first stroke sensor 861 is normal, the processing proceeds to step S565. When the first stroke sensor 861 is abnormal, the processing proceeds to step S585. At this time, the second control processor portion 623 may determine whether the second stroke sensor 862 is normal on the basis of the second sensor output Vs2.

In step S565 following step S560, the second control processor portion 623 determines whether the first stroke sensor 861 and the second stroke sensor 862 are normal, in a similar manner to step S375 by the third control processor portion 633 described above. Specifically, the second control processor portion 623 determines whether the first stroke sensor 861 and the second stroke sensor 862 are normal on the basis of the sensor output difference Vs1−Vs2. When the first stroke sensor 861 and the second stroke sensor 862 are normal, the processing proceeds to step S570 described above. When the first stroke sensor 861 or the second stroke sensor 862 is abnormal, the second control processor portion 623 identifies which of the first stroke sensor 861 or the second stroke sensor 862 is abnormal, and the processing proceeds to step S585.

In step S570 following step S565, the second control processor portion 623 determines whether the first drive circuit 71 is normal on the basis of a signal from the first control processor portion 613, in a similar manner to step S260 described above. When the first drive circuit 71 is normal, the processing proceeds to step S580. When the first drive circuit 71 is abnormal, the processing proceeds to step S590.

In step S580 following step S570, the second control processor portion 623 controls the second actuator 20 in a similar manner to step S270 described above. Specifically, the second control processor portion 623 performs normal control, ABS control, VSC control, and the like. Thereafter, the processing returns to step S500.

In step S585, the second control processor portion 623 notifies the first control processor portion 613 and the notification device (not illustrated) of each abnormality, in a similar manner to the processing in step S280 and step S385 by the third control processor portion 633 described above.

In step S590, the second control processor portion 623 decelerates and stops the vehicle 6 to ensure the safety of the vehicle 6, in a similar manner to step S290 described above. Thereafter, the processing returns to step S500.

In this manner, the processing by the second control processor portion 623 is performed.

Also in the fourth embodiment, effects similar to those of the first embodiment are obtained.

The vehicle brake system 1 includes the first power source 401 and the second power source 402. Thus, even in a case where one of the first power source 401 and the second power source 402 fails, the vehicle brake system 1 can use the other, which is normal, to secure power, so that the vehicle 6 can be safely decelerated and stopped. Thus, redundancy of the vehicle brake system 1 can be secured, and the redundancy of the vehicle brake system 1 is improved.

Fifth Embodiment

Figure 22:
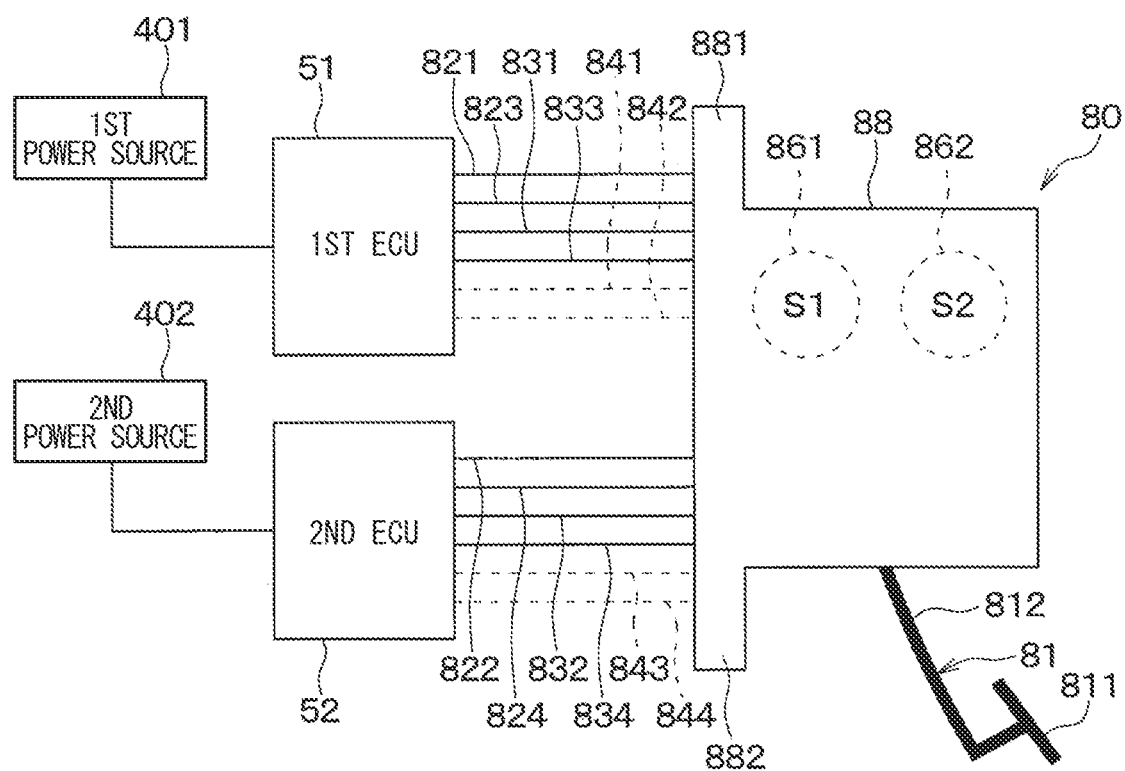
FIG. 22 is a wire diagram of a vehicle brake system according to a fifth embodiment.

In a fifth embodiment, as illustrated in FIG. 22, a vehicle brake device 80 further includes a third sensor power source wire 823, a third sensor ground wire 833, a fourth sensor power source wire 824, and a fourth sensor ground wire 834. Other than that, the present embodiment is similar to the fourth embodiment.

The third sensor power source wire 823 is connected in a similar manner to a first sensor power source wire 821, and is connected to a first ECU 51 and a first stroke sensor 861.

The third sensor ground wire 833 is connected in a similar manner to a first sensor ground wire 831, and is connected to the first ECU 51 and the first stroke sensor 861.

The fourth sensor power source wire 824 is connected in a similar manner to a second sensor power source wire 822, and is connected to a second ECU 52 and a second stroke sensor 862.

The fourth sensor ground wire 834 is connected in a similar manner to a second sensor ground wire 832, and is connected to the second ECU 52 and the second stroke sensor 862.

Also in the fifth embodiment, effects similar to those of the first embodiment and the fourth embodiment are obtained. In the fifth embodiment, the vehicle brake device 80 further includes the third sensor power source wire 823, the third sensor ground wire 833, the fourth sensor power source wire 824, and the fourth sensor ground wire 834. Thus, even in a case where any of the wires described above is disconnected, wires that are normal are used to supply power to the first stroke sensor 861 and the second stroke sensor 862. Thus, redundancy of a vehicle brake system 1 can be secured, and the redundancy of the vehicle brake system 1 is improved.

Sixth Embodiment

In a sixth embodiment, a vehicle brake device 80 does not include a first sensor output wire 841, a second sensor output wire 842, a third sensor output wire 843, and a fourth sensor output wire 844, but includes a fifth sensor output wire 845 and a sixth sensor output wire 846. Other than that, the present embodiment is similar to the fourth embodiment.

Figure 23:
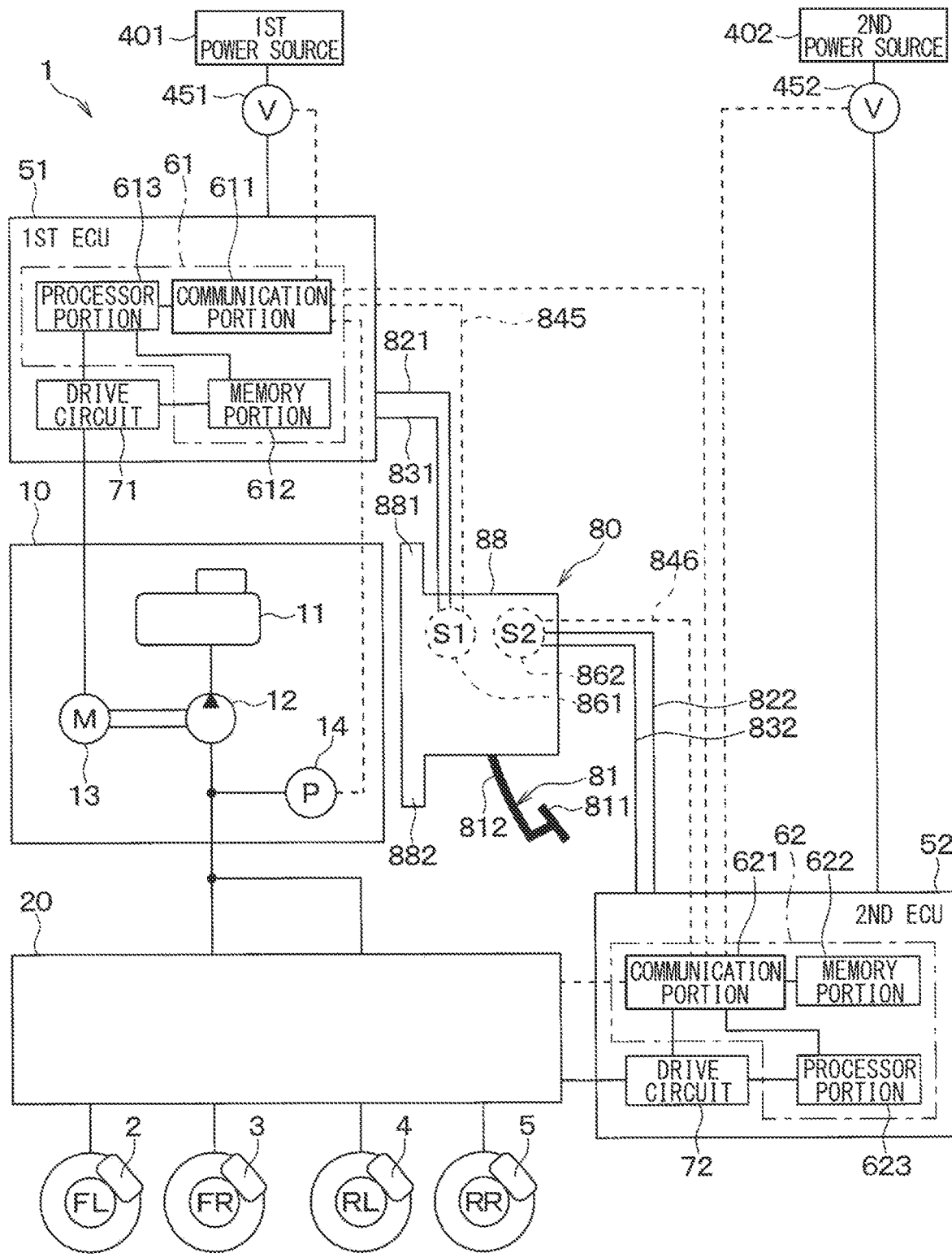
FIG. 23 is a configuration diagram of a vehicle brake system according to a sixth embodiment.
Figure 24:
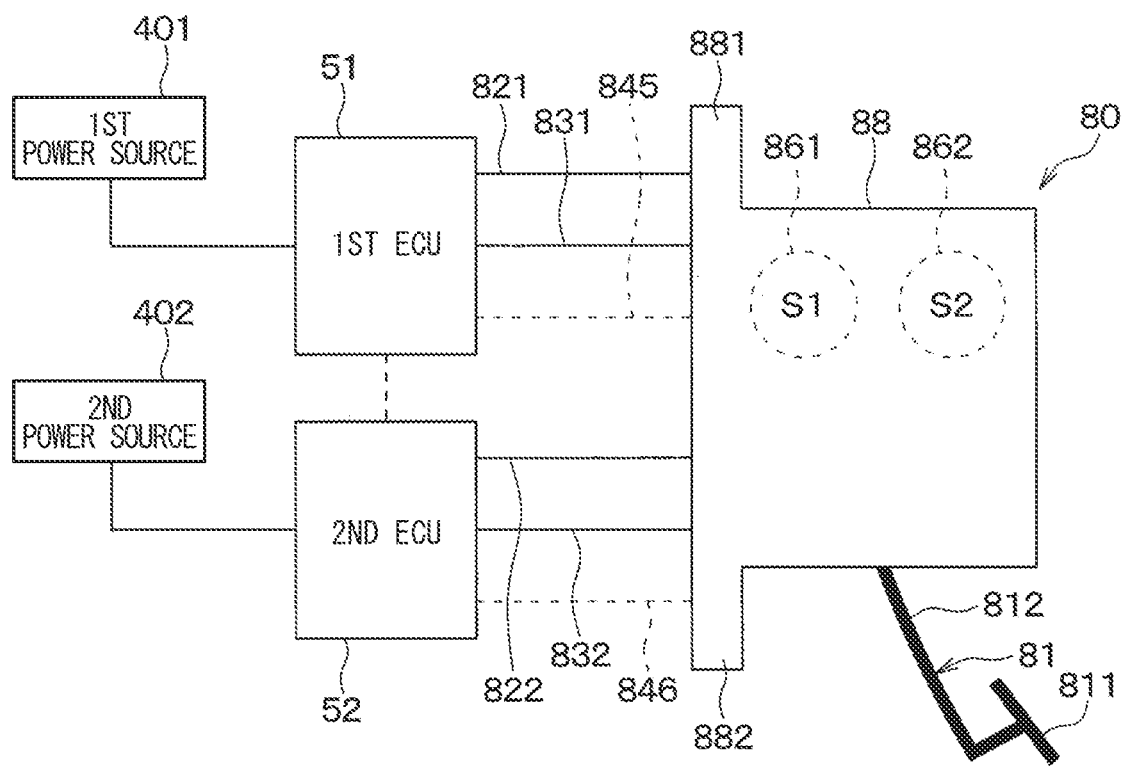
FIG. 24 is a wire diagram of the vehicle brake system.

As illustrated in FIGS. 23 and 24, the fifth sensor output wire 845 is connected to a first ECU 51 and a first stroke sensor 861.

The sixth sensor output wire 846 is connected to a second ECU 52 and a second stroke sensor 862.

In this case, in step S400, a first control processor portion 613 obtains a first sensor output Vs1 corresponding to a stroke amount X of a brake pedal 81 from the first stroke sensor 861 via the fifth sensor output wire 845 and a first communication portion 611. In step S400, the first control processor portion 613 also obtains a second sensor output Vs2 corresponding to the stroke amount X of the brake pedal 81 by wirelessly communicating with the second ECU 52. Pieces of processing other than this processing are similar to those described above.

In step S500, a second control processor portion 623 obtains the second sensor output Vs2 corresponding to the stroke amount X of the brake pedal 81 from the second stroke sensor 862 via the sixth sensor output wire 846 and a second communication portion 621. Furthermore, in step S500, the second control processor portion 623 obtains the first sensor output Vs1 corresponding to the stroke amount X of the brake pedal 81 by wirelessly communicating with the first ECU 51. Pieces of processing other than this processing are similar to those described above.

Also in the sixth embodiment, effects similar to those of the fourth embodiment are obtained. In the sixth embodiment, since the number of wires can be reduced as compared with the fourth embodiment, it is possible to reduce the weight of the vehicle brake device 80 and costs such as a material cost.

Seventh Embodiment

A seventh embodiment is different from the fourth embodiment in the form of wiring, and a vehicle brake system 1 further includes a power source switching circuit 403. Processing by a first control processor portion 613 and a second control processor portion 623 is different from the processing in the fourth embodiment. Other than those, the present embodiment is similar to the fourth embodiment.

Figure 25:
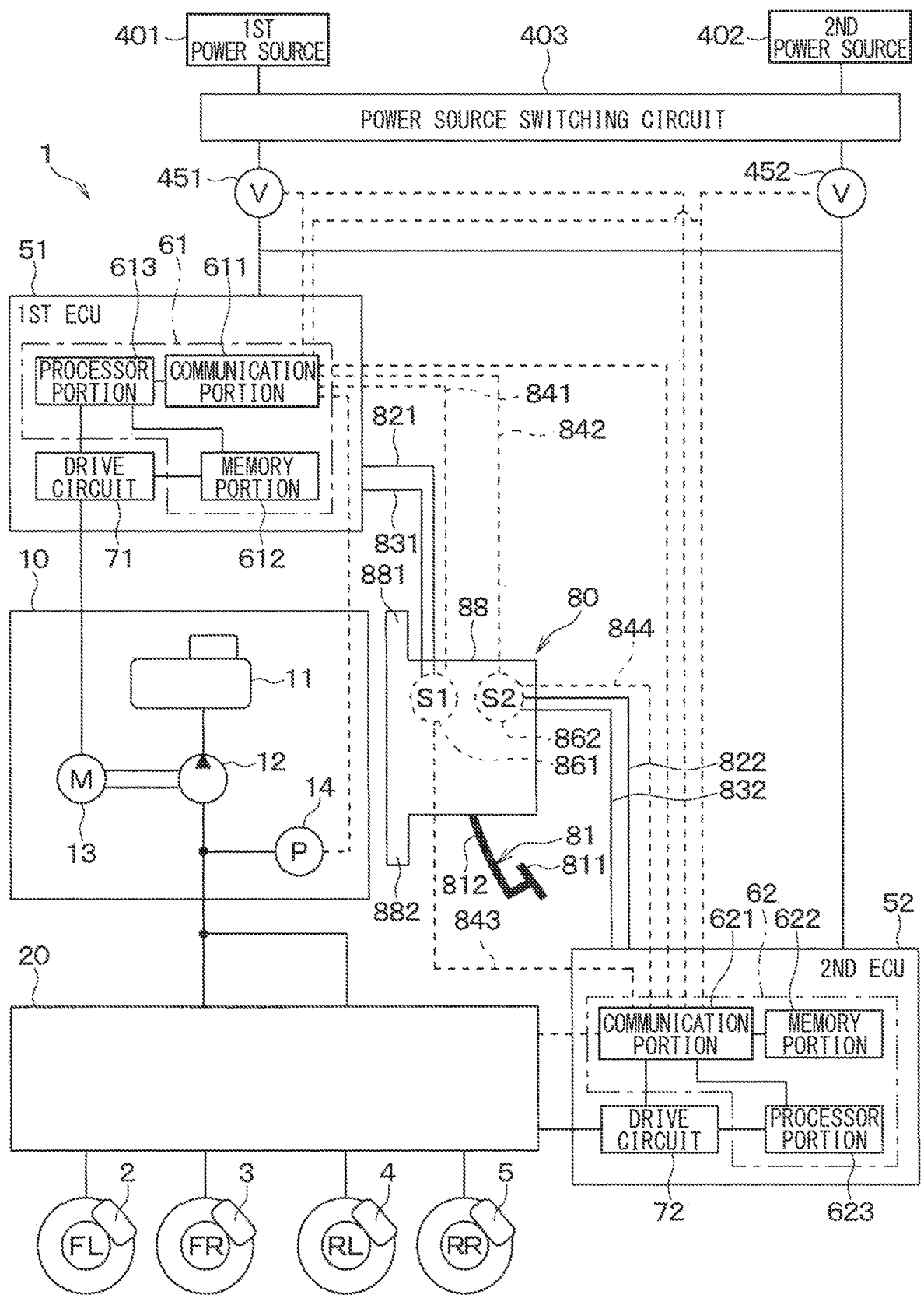
FIG. 25 is a configuration diagram of a vehicle brake system according to a seventh embodiment.

In the seventh embodiment, as illustrated in FIG. 25, a first power source 401 supplies power to a first ECU 51 and a second ECU 52.

A second power source 402 also supplies power to the first ECU 51 and the second ECU 52.

On the basis of signals from the first ECU 51 and the second ECU 52, the power source switching circuit 403 switches, to either the first power source 401 or the second power source 402, the source of power for supplying power to the first ECU 51 and the second ECU 52.

Here, a first voltage sensor 451 outputs, to the first ECU 51 and the second ECU 52, a signal in accordance with a voltage applied from the first power source 401 to the first ECU 51 and the second ECU 52.

A second voltage sensor 452 outputs, to the first ECU 51 and the second ECU 52, a signal in accordance with a voltage applied from the second power source 402 to the first ECU 51 and the second ECU 52.

The processing in step S410 by the first control processor portion 613 and the processing in step S510 by the second control processor portion 623 are different from those in the fourth embodiment. Other than those pieces of processing, the present embodiment is similar to the fourth embodiment.

Figure 26:
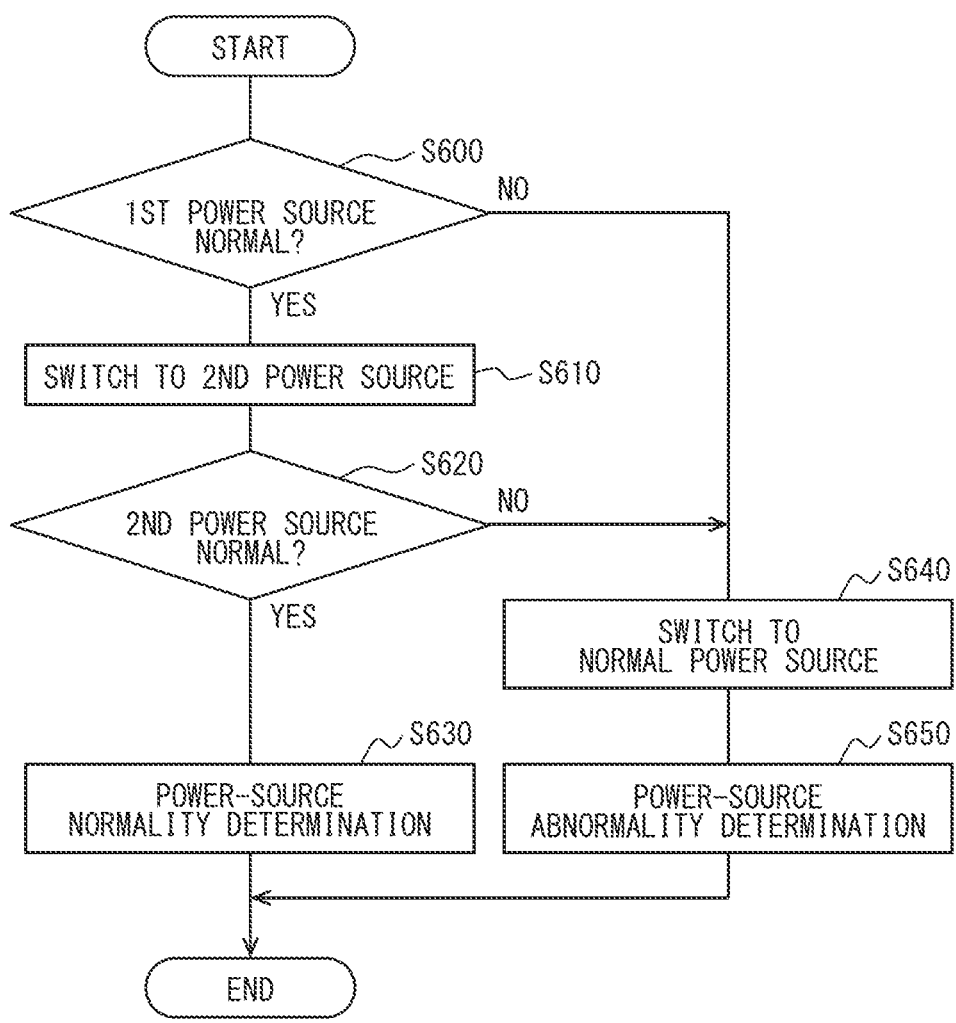
FIG. 26 is a sub-flowchart illustrating processing by a first control processor portion.

Next, the processing of step S410 by the first control processor portion 613 will be described with reference to a flowchart in FIG. 26. In an initial state, the source of power for supplying power to the first ECU 51 and the second ECU 52 is set to the first power source 401.

In step S600, the first control processor portion 613 determines whether a first voltage Vb1 obtained in step S400 is equal to or higher than a first voltage threshold Vb_th1 and equal to or lower than a second voltage threshold Vb_th2. When the first voltage Vb1 is equal to or higher than the first voltage threshold Vb_th1 and equal to or lower than the second voltage threshold Vb_th2, the first power source 401 is normal, and thus the processing proceeds to step S610. When the first voltage Vb1 is less than the first voltage threshold Vb_th1, the first power source 401 is abnormal, and thus the processing proceeds to step S640. Furthermore, when the first voltage Vb1 is higher than the second voltage threshold Vb_th2, the first power source 401 is abnormal, and thus the processing proceeds to step S640.

In step S610 following step S600, the first control processor portion 613 outputs, to the power source switching circuit 403, a signal for switching, to the second power source 402, the source of power for supplying power to the first ECU 51 and the second ECU 52. Thus, the power source switching circuit 403 switches, from the first power source 401 to the second power source 402, the source of power for supplying power to the first ECU 51 and the second ECU 52.

Subsequently, in step S620, the first control processor portion 613 obtains the second voltage Vb2, which is a voltage applied from the second power source 402 to the first ECU 51 and the second ECU 52, from the second voltage sensor 452 via a first communication portion 611. The first control processor portion 613 determines whether the obtained second voltage Vb2 is equal to or higher than the first voltage threshold Vb_th1 and equal to or lower than the second voltage threshold Vb_th2. When the second voltage Vb2 is equal to or higher than the first voltage threshold Vb_th1 and equal to or lower than the second voltage threshold Vb_th2, the second power source 402 is normal, and thus the processing proceeds to step S630. When the second voltage Vb2 is less than the first voltage threshold Vb_th1, the second power source 402 is abnormal, and thus the processing proceeds to step S640. Furthermore, when the second voltage Vb2 is higher than the second voltage threshold Vb_th2, the second power source 402 is abnormal, and thus the processing proceeds to step S640.

In step S630 following step S620, both the first power source 401 and the second power source 402 are normal, and thus the first control processor portion 613 turns on a power source normal flag, for example. Thereafter, the processing proceeds to step S420. In step S420, the processing is performed in a similar manner to the above.

In step S640, since the first power source 401 or the second power source 402 is abnormal, the first control processor portion 613 identifies which of the first power source 401 or the second power source 402 is normal. The first control processor portion 613 outputs, to the power source switching circuit 403, a signal for switching, to a normal one, the source of power for supplying power to the first ECU 51 and the second ECU 52. Thus, the power source switching circuit 403 switches, to the first power source 401 or the second power source 402, whichever is normal, the source of power for supplying power to the first ECU 51 and the second ECU 52. Thereafter, the processing proceeds to step S650. When both the first power source 401 and the second power source 402 are abnormal, the processing proceeds to step S650.

In step S650 following step S640, since the first power source 401 or the second power source 402 is abnormal, the first control processor portion 613 turns on a power source abnormality flag, for example. Thereafter, the processing proceeds to step S490. In step S490, the processing is performed in a similar manner to the above.

In this manner, the processing of step S410 by the first control processor portion 613 is performed.

The processing of step S510 by the second control processor portion 623 is executed in a similar manner to the processing by the first control processor portion 613 described above. Thus, the first control processor portion 613 described above can be replaced with the second control processor portion 623. Step S420 can be replaced with step S520. Furthermore, step S490 can be replaced with step S590.

Also in the seventh embodiment, effects similar to those of the first embodiment are obtained. In the seventh embodiment, the first power source 401 supplies power to the first ECU 51 and the second ECU 52. The second power source 402 also supplies power to the first ECU 51 and the second ECU 52. Furthermore, on the basis of signals from the first ECU 51 and the second ECU 52, the power source switching circuit 403 switches, to the first power source 401 or the second power source 402, whichever is normal, the source of power for supplying power to the first ECU 51 and the second ECU 52. Thus, even in a case where either the first power source 401 or the second power source 402 is abnormal, it is possible to prevent a first actuator 10 and a second actuator 20 from being unable to be driven. Thus, safety of a vehicle 6 is improved.

Eighth Embodiment

In an eighth embodiment, the pressure of the brake fluid from a reservoir 11 increases without a first pump 12. Other than that, the present embodiment is similar to the first embodiment.

Figure 27:
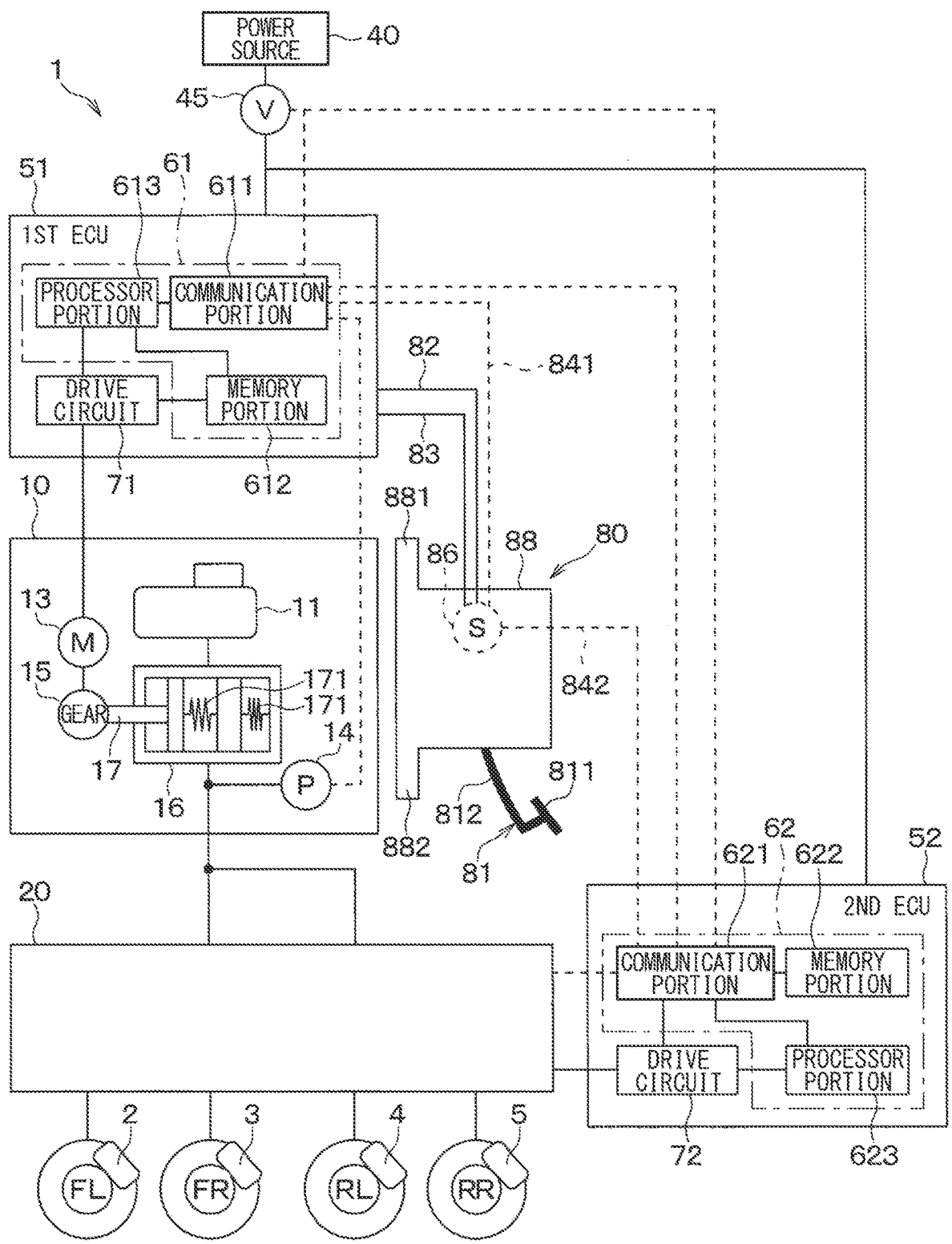
FIG. 27 is a configuration diagram of a vehicle brake system according to an eighth embodiment.

As illustrated in FIG. 27, a first actuator 10 includes a gear mechanism 15, an actuator cylinder 16, and an actuator piston 17, in addition to the reservoir 11, the first actuator motor 13, and the first pressure sensor 14 described above.

The gear mechanism 15 includes a ball screw and a rack and pinion (not illustrated). The gear mechanism 15 is connected to the first actuator motor 13. Thus, the gear mechanism 15 makes a translational motion by rotation of the first actuator motor 13.

The actuator cylinder 16 is formed into a bottomed cylindrical shape, and is connected to the reservoir 11. Thus, the brake fluid in the reservoir 11 flows into the actuator cylinder 16 via a hole in the reservoir 11 and a hole in the actuator cylinder 16 (not illustrated).

The actuator piston 17 is connected to the gear mechanism 15, and includes a plurality of actuator springs 171. Thus, when rotation of the first actuator motor 13 causes the gear mechanism 15 to make a translational motion, the actuator piston 17 makes a translational motion together with the gear mechanism 15. Thus, the actuator piston 17 slides in the actuator cylinder 16 in the axial direction of the actuator cylinder 16. When the actuator piston 17 slides, the pressure of the brake fluid in the actuator cylinder 16 increases, and a hole (not illustrated) in the actuator cylinder 16 connected to a first main pipeline 211 and a second main pipeline 261 is opened. At this time, the brake fluid with the increased fluid pressure flows through the hole (not illustrated) in the actuator cylinder 16 toward a second actuator 20.

When power supply from a first drive circuit 71 to the first actuator motor 13 stops, the rotation of the first actuator motor 13 stops. When the rotation of the first actuator motor 13 stops, restoring force of the plurality of actuator springs 171 causes the actuator piston 17 to make a translational motion together with the gear mechanism 15. Thus, the actuator piston 17 returns to its initial position.

Also in the eighth embodiment, effects similar to those of the first embodiment are obtained.

Ninth Embodiment

A ninth embodiment is different from the first embodiment in the form of a housing 88 of a vehicle brake device 80. Other than that, the present embodiment is similar to the first embodiment.

Figure 28:
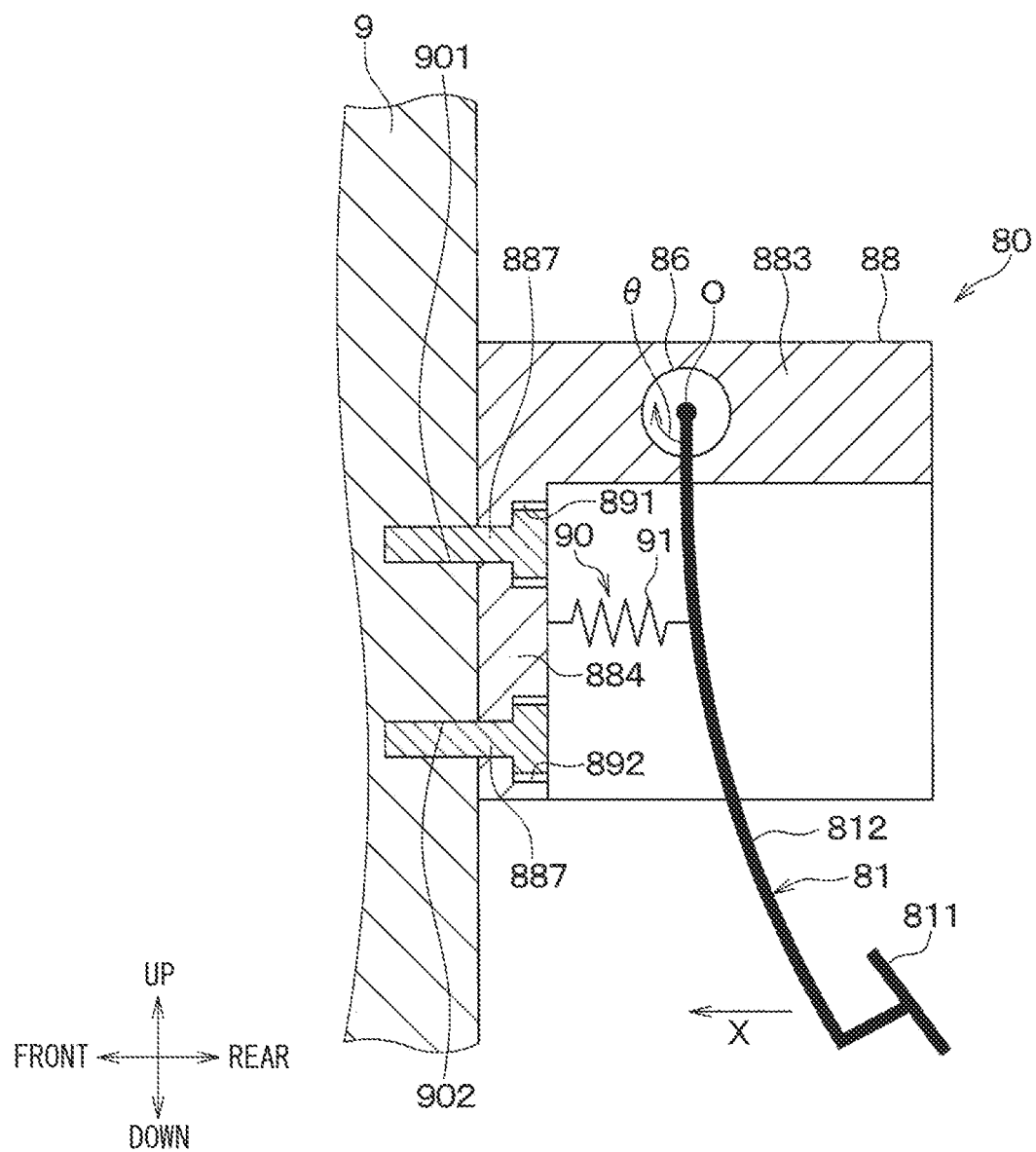
FIG. 28 is a sectional view of a vehicle brake device according to a ninth embodiment.

As illustrated in FIG. 28, the housing 88 of the vehicle brake device 80 does not include a first attachment portion 881 or a second attachment portion 882, but includes a housing bottom portion 883 and a housing cylindrical portion 884.

Here, a first counterbore hole 891 corresponding to a first hole 901 in a dash panel 9 is formed on the front of the housing cylindrical portion 884. A bolt 887 is inserted into the first counterbore hole 891 and the first hole 901 in the dash panel 9 so that the housing 88 is attached to the dash panel 9.

A second counterbore hole 892 corresponding to a second hole 902 in the dash panel 9 is formed on the front of the housing cylindrical portion 884. The bolt 887 is inserted into the second counterbore hole 892 and the second hole 902 in the dash panel 9 so that the housing 88 is attached to the dash panel 9.

Here, since the housing cylindrical portion 884 does not form a rear portion of the housing 88, the housing 88 has an L-shaped cross section constituted by the housing cylindrical portion 884 and the housing bottom portion 883.

Also in the ninth embodiment, effects similar to those of the first embodiment are obtained.

Tenth Embodiment

A tenth embodiment is different from the first embodiment in the form of a reaction force generator 90 of a vehicle brake device 80. Other than that, the present embodiment is similar to the first embodiment.

Figure 29:
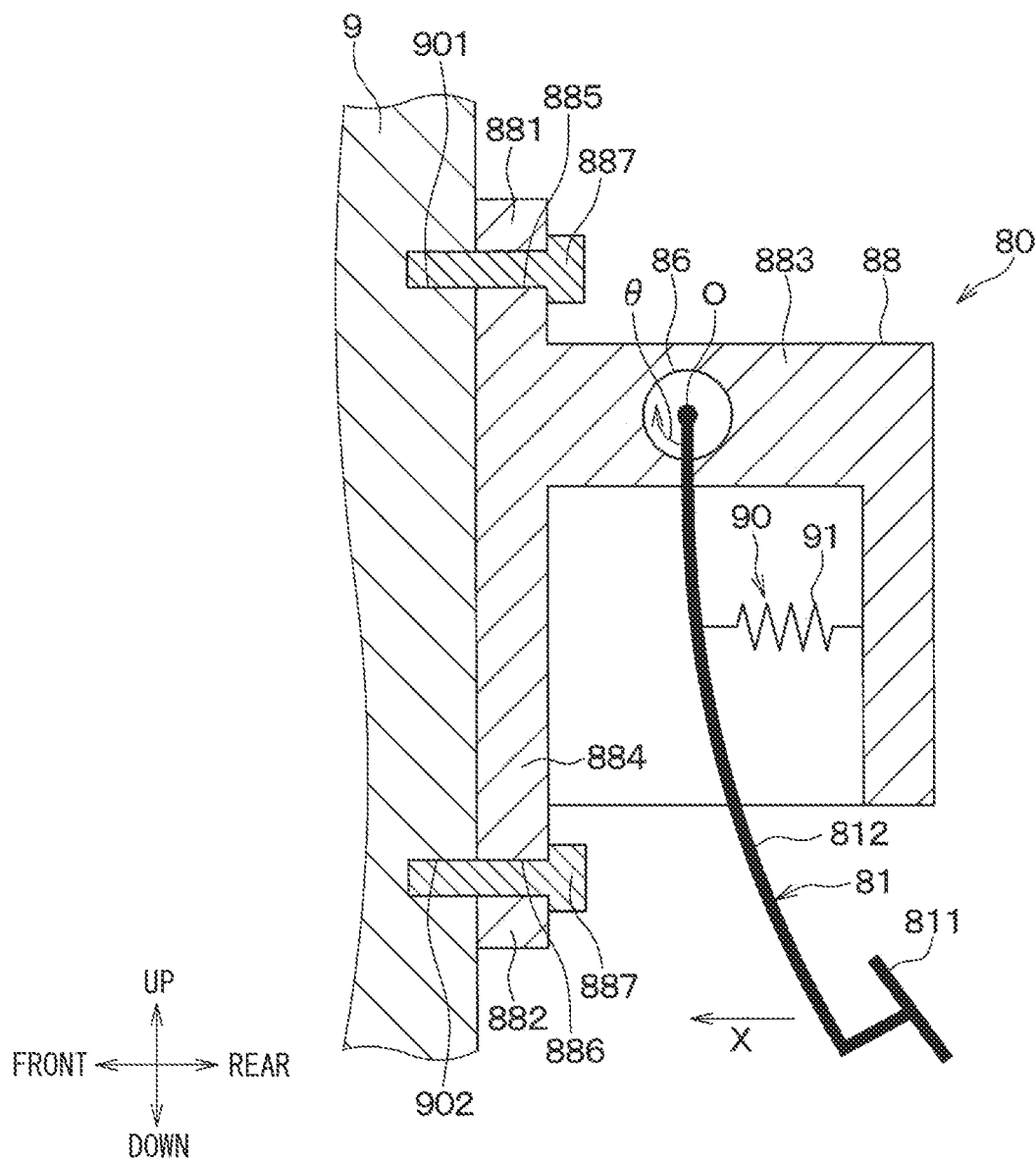
FIG. 29 is a sectional view of a vehicle brake device according to a tenth embodiment.

As illustrated in FIG. 29, an elastic member 91 of the reaction force generator 90 of the vehicle brake device 80 is connected to a lever part 812 of a brake pedal 81 and the rear of a housing cylindrical portion 884. At this time, when the brake pedal 81 is operated by a pedal force of a driver of a vehicle 6, a force corresponding to the pedal force is transmitted from the lever part 812 to the elastic member 91. Thus, the elastic member 91 is stretched, and a restoring force is generated. This restoring force generates a reaction force Fr on the lever part 812. Thus, in a similar manner to the first embodiment, a stroke amount X and the reaction force Fr have a linear relationship as illustrated in FIG. 7. The damper 92 in the second embodiment may also be connected to the lever part 812 of the brake pedal 81 and the rear of the housing cylindrical portion 884 in a similar manner to the above.

Also in the tenth embodiment, effects similar to those of the first embodiment are obtained.

Eleventh Embodiment

An eleventh embodiment is different from the first embodiment in the form of a housing 88, a brake pedal 81, and a reaction force generator 90 of a vehicle brake device 80. Other than that, the present embodiment is similar to the first embodiment.

Figure 30:
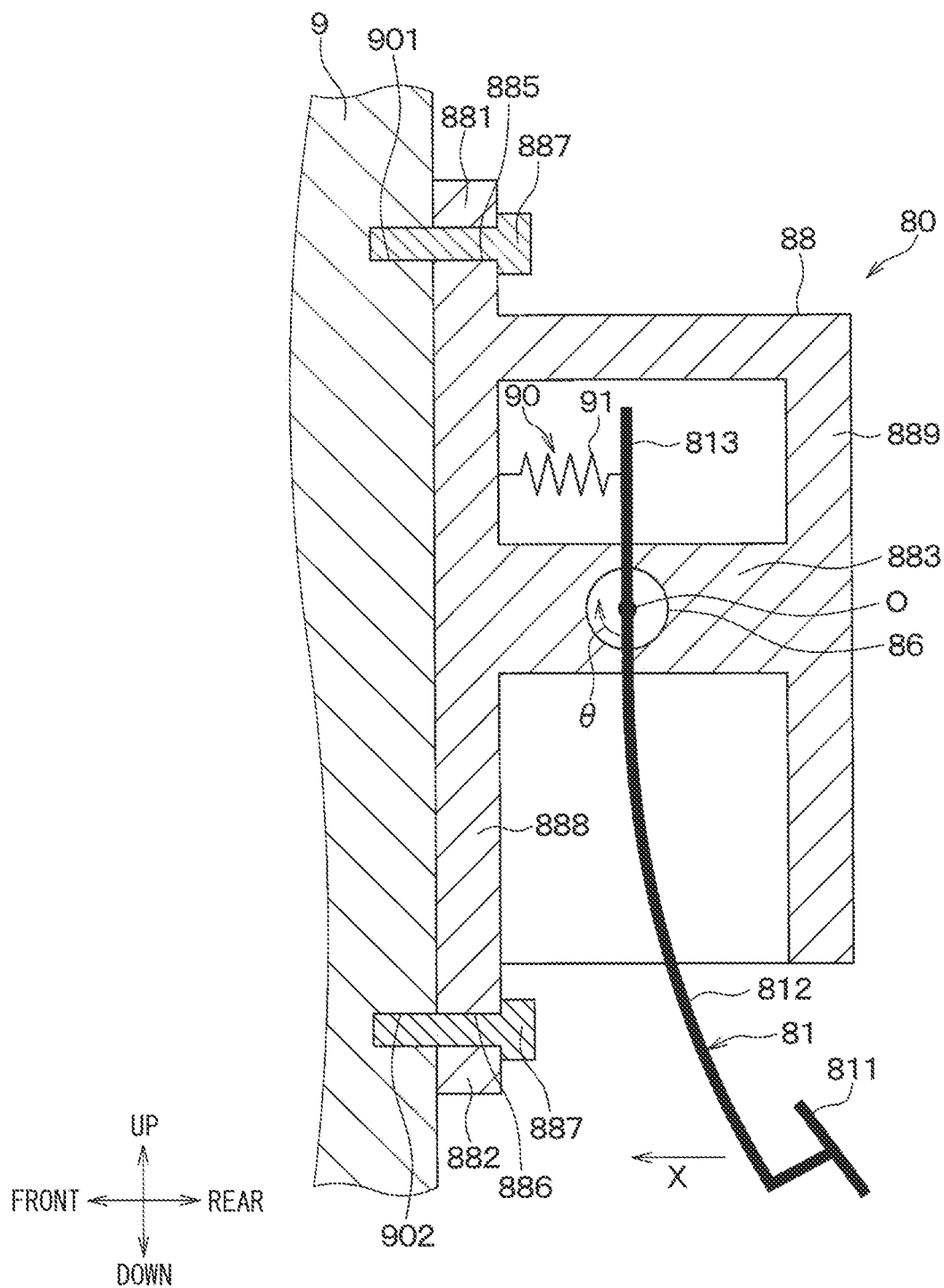
FIG. 30 is a sectional view of a vehicle brake device according to an eleventh embodiment.

As illustrated in FIG. 30, the housing 88 of the vehicle brake device 80 includes a first housing cylindrical portion 888 and a second housing cylindrical portion 889, in addition to the first attachment portion 881, the second attachment portion 882, and the housing bottom portion 883 described above.

The first housing cylindrical portion 888 has a cylindrical shape, is connected to the housing bottom portion 883, and extends downward from the housing bottom portion 883. In this case, the second attachment portion 882 is connected to the first housing cylindrical portion 888, and extends downward from the first housing cylindrical portion 888.

The second housing cylindrical portion 889 has a cylindrical shape, is connected to the housing bottom portion 883, and extends upward from the housing bottom portion 883. In this case, the first attachment portion 881 is connected to the second housing cylindrical portion 889, and extends upward from the second housing cylindrical portion 889.

A lever part 812 of the brake pedal 81 includes a lever extension portion 813. The lever extension portion 813 is connected to a rotational shaft O, and extends upward from the rotational shaft O, here, toward the second housing cylindrical portion 889. Thus, the lever extension portion 813 is housed in the second housing cylindrical portion 889.

An elastic member 91 of the reaction force generator 90 of the vehicle brake device 80 is connected to the front of the second housing cylindrical portion 889 and the lever extension portion 813. At this time, when the brake pedal 81 is operated by a pedal force of a driver of a vehicle 6, a force corresponding to the pedal force is transmitted from the lever extension portion 813 to the elastic member 91. Thus, the elastic member 91 is stretched, and a restoring force is generated. This restoring force generates a reaction force Fr on the lever part 812. The elastic member 91 of the reaction force generator 90 of the vehicle brake device 80 may be connected to the rear of the second housing cylindrical portion 889 and the lever extension portion 813. At this time, when the brake pedal 81 is operated by a pedal force of a driver of the vehicle 6, the elastic member 91 is compressed, and a restoring force is generated. This restoring force generates the reaction force Fr on the lever part 812. The damper 92 in the second embodiment may also be connected to the front of the second housing cylindrical portion 889 and the lever extension portion 813 in a similar manner to the above. Furthermore, the damper 92 in the second embodiment may also be connected to the rear of the second housing cylindrical portion 889 and the lever extension portion 813.

Also in the eleventh embodiment, effects similar to those of the first embodiment are obtained.

OTHER EMBODIMENTS

The present disclosure is not limited to the above-described embodiments, and the above-described embodiments can be modified as appropriate. In each of the above-described embodiments, it is obvious that the elements constituting the embodiment are not necessarily essential, except for a case where it is explicitly stated that the elements are particularly essential, a case where the elements are considered to be obviously essential in principle, and the like.

The controllers and the like and the method thereof described in the present disclosure may be achieved by a dedicated computer provided by configuring a processor and a memory programmed to execute one or a plurality of functions embodied by a computer program. Alternatively, the controllers and the like and the method thereof described in the present disclosure may be achieved by a dedicated computer provided by configuring a processor constituted by one or more dedicated hardware logic circuits. Alternatively, the controllers and the like and the method thereof described in the present disclosure may be achieved by one or more dedicated computers constituted by a combination of a processor and a memory programmed to execute one or a plurality of functions and a processor constituted by one or more hardware logic circuits. Furthermore, the computer program may be stored in a computer-readable non-transition tangible recording medium as an instruction executed by the computer.

(1) In the above-described embodiments, the vehicle brake system 1 includes the power source 40. The vehicle brake system 1 also includes the first power source 401 and the second power source 402. Alternatively, the number of power sources may be three or more, without being limited to one or two.

(2) In the above-described embodiments, the vehicle brake system 1 includes the first microcontroller 61 and the second microcontroller 62. The vehicle brake system 1 also includes the third microcontroller 63. The number of microcontrollers is not limited to one or two, and may be three or more.

(3) In the above-described embodiments, the vehicle brake system 1 includes the first actuator 10 corresponding to the first fluid pressure generator, and the second actuator 20 corresponding to the second fluid pressure generator. The number of fluid pressure generators is not limited to two, and may be three or more.

(4) In the above-described embodiments, the vehicle brake system 1 includes the first drive circuit 71 and the second drive circuit 72. The number of drive circuits is not limited to two, and may be one, or three or more.

(5) In the above-described embodiments, the vehicle brake device 80 includes the sensor power source wire 82, the sensor ground wire 83, the first sensor output wire 841, and the second sensor output wire 842. The number of wires is not limited to one or two, and may be three or more.

(6) In the above-described embodiments, the vehicle brake device 80 includes the stroke sensor 86. The vehicle brake device 80 also includes the first stroke sensor 861 and the second stroke sensor 862. Alternatively, the number of stroke sensors may be three or more, without being limited to one or two.

(7) In the above-described embodiments, the reaction force generator 90 of the vehicle brake device 80 includes the elastic member 91. Alternatively, the number of the elastic members 91 may be two or more, without being limited to one. The reaction force generator 90 of the vehicle brake device 80 also includes the damper 92. The number of the dampers 92 is not limited to one, and may be two or more.

(8) The first to eleventh embodiments may be combined as appropriate.

Figure 31:
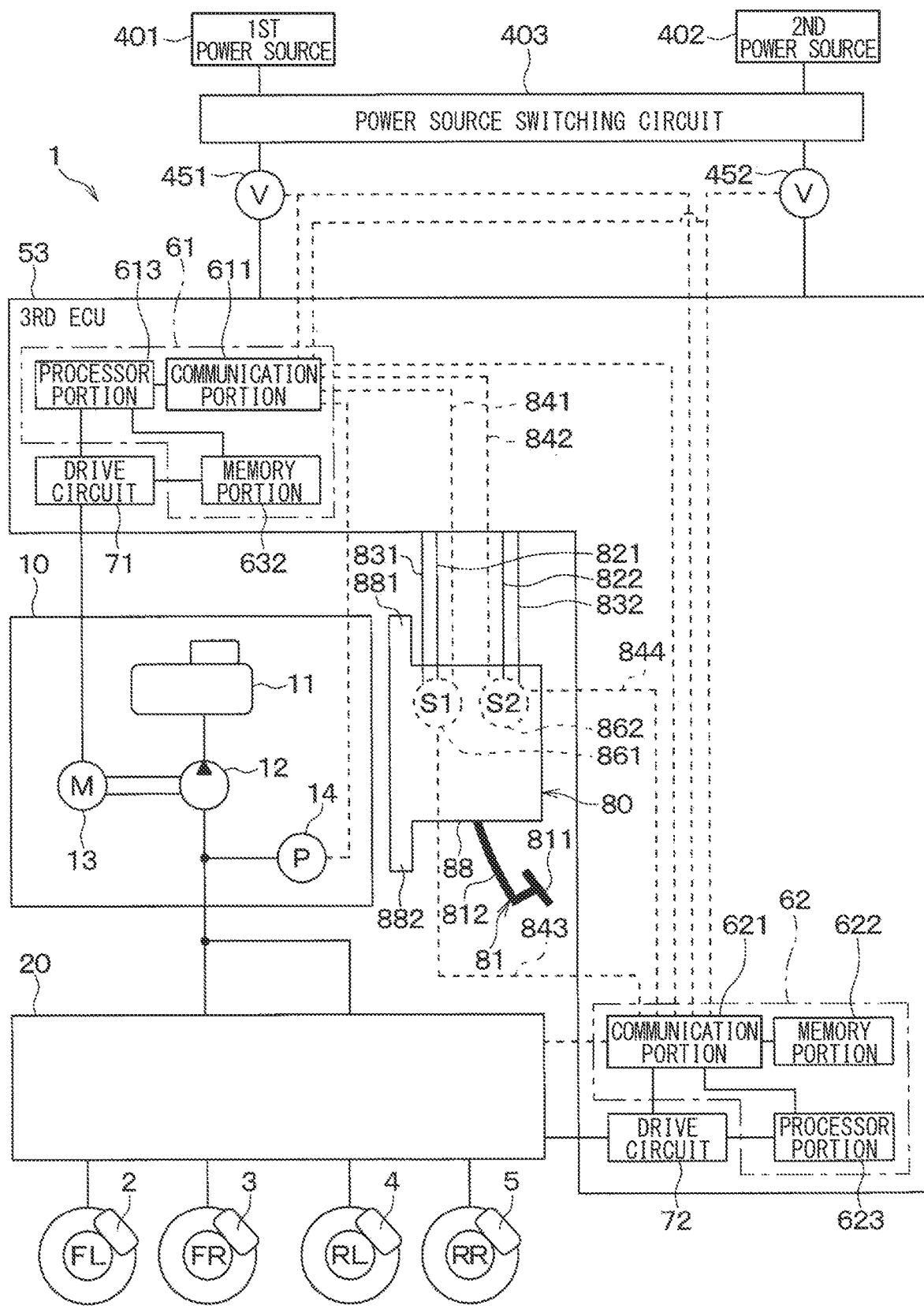
FIG. 31 is a configuration diagram of a vehicle brake system according to another embodiment.

The vehicle brake system 1 according to the third embodiment may include the first power source 401, the second power source 402, the power source switching circuit 403, the first voltage sensor 451, and the second voltage sensor 452 as illustrated in FIG. 31. The third ECU 53 of the vehicle brake system 1 according to the third embodiment may include the first microcontroller 61, the second microcontroller 62, the first drive circuit 71, and the second drive circuit 72.

In addition to driving the first actuator 10, the first drive circuit 71 may drive the second actuator 20 by supplying power to the second actuator motor 30 on the basis of a signal from the first control processor portion 613. Furthermore, in addition to driving the second actuator 20, the second drive circuit 72 may drive the first actuator 10 by supplying power to the first actuator motor 13 on the basis of a signal from the second control processor portion 623.

(9) In the above-described embodiments, the elastic member 91 is a compression coil spring. Alternatively, the elastic member 91 may be a tension spring, or may be a conical spring, a variable pitch spring, or the like, without being limited to an equal pitch spring.

The invention claimed is:

1. A vehicle brake system comprising:
a vehicle brake device including:
   a brake pedal including a pedal part and a lever part rotatable about a rotational shaft according to an operation of the pedal part;
   a stroke sensor configured to output a signal in accordance with a stroke amount of the brake pedal;
   a housing rotatably supporting the lever part and being located in a vehicle compartment of a vehicle and on a partition wall that separates an outside of the vehicle compartment and an inside of the vehicle compartment; and
   a reaction force generator connected to the housing and the lever part and configured to generate a reaction force on the lever part in accordance with the stroke amount;
a first floid pressure generator configured to generate a fluid pressure for braking the vehicle;
a second fluid pressure generator configured to generate a fluid pressure for braking the vehicle; and
a fluid pressure controller configured to control the fluid pressure generated by the first fluid pressure generator and the fluid pressure generated by the second fluid pressure generator based on the signal from the stroke sensor, wherein
the stroke sensor is a first stroke sensor,
the vehicle brake device farther includes a second stroke sensor configured to output a signal in accordance with the stroke amount,
the fluid pressure controller is a first fluid pressure control ured to control the fluid pressure generated by the first fluid pressure generator,
the vehicle brake system further comprising:
a second fluid pressure controller configured to control the fluid pressure generated by the second fluid pressure generator;
a first power source configured to supply power to the first fluid pressure controller; and
a second power source configured to supply power to the second fluid pressure controller, wherein
the vehicle brake device further includes:
   a first sensor power source wire connected to the first fluid pressure controller and the first stroke sensor and configured to supply the power of the first power source from the first fluid pressure controller to the first stroke sensor; and
   a second sensor power source wire connected to the second fluid pressure controller and the second stroke sensor and configured to supply the power of the second power source from the second fluid pressure controller to the second stroke sensor.

2. The vehicle brake system according to claim 1, wherein the vehicle brake device further includes:
   a third sensor power source wire connected to the first fluid pressure controller and the first stroke sensor and configured to supply the power of the first power source from the first fluid pressure controller to the first stroke sensor; and
   a fourth sensor power source wire connected to the second fluid pressure controller and the second stroke sensor and configured to supply the power of the second power source from the second fluid pressure controller to the second stroke sensor.

3. A vehicle brake system comprising:
a vehicle brake device including:
   a brake pedal including a pedal part and a lever part rotatable about a rotational shaft according to an operation of the pedal part;
   a stroke sensor configured to output a signal in accordance with a stroke amount of the brake pedal;
   a housing rotatably supporting the lever part and being located in a vehicle compartment of a vehicle and on a partition wall that separates an outside of the vehicle compartment and an inside of the vehicle compartment; and
   a reaction force generator connected to the housing and the lever part and configured to generate a reaction force on the lever part in accordance with the stroke amount;
a first fluid pressure generator configured to generate a fluid pressure for braking the vehicle;
a second fluid pressure generator configured to generate a fluid pressure for braking the vehicle; and
a fluid pressure controller configured to control the fluid pressure generated by the first fluid pressure generator and the fluid pressure generated by the second fluid pressure generator based on the signal from the stroke sensor, wherein
the stroke sensor is a first stroke sensor,
the vehicle brake device further includes a second stroke sensor configured to output a signal in accordance with the stroke amount, the fluid pressure controller is a first fluid pressure controller configured to control the fluid pressure generated by the first fluid pressure generator, the vehicle brake system further comprising a second fluid pressure controller configured to control the fluid pressure generated by the second fluid pressure generator, wherein the vehicle brake device further includes:
- a first sensor output wire connected to the first fluid pressure controller and the first stroke sensor and configured to transmit the signal of the first stroke sensor to the first fluid pressure controller;
- a second sensor output wire connected to the first fluid pressure controller and the second stroke sensor and configured to transmit the signal of the second stroke sensor to the first fluid pressure controller;
- a third sensor output wire connected to the second fluid pressure controller and the first stroke sensor and configured to transmit the signal of the first stroke sensor to the second fluid pressure controller; and
- a fourth sensor output wire connected to the second fluid pressure controller and the second stroke sensor and configured to transmit the signal of the second stroke sensor to the second fluid pressure controller.

4. The vehicle brake system according to claim 3, further comprising:
- a first power source configured to supply power to the first fluid pressure controller and the second fluid pressure controller; and
- a second power source configured to supply power to the first fluid pressure controller and the second fluid pressure controller.

5. A vehicle brake system comprising:
a vehicle brake device including:
- a brake pedal including a pedal part and a lever part rotatable aboot a rotational shaft according to an operation of the pedal part;
- a stroke sensor configured to output a signal in accordance with a st oke amount of the brake pedal;
- a housing rotatably supporting the lever part and being located in a vehicle compartment of a vehicle and on a partition wall that separates an outside of the vehicle compartment and an inside of the vehicle compartment; and
- a reaction force generator connected to the housing and the lever part and configured to generate a reaction force on the lever part in accordance with the stroke amount;
- a first fluid pressore generator configured to generate a fluid pressore for braking the vehicle;
- a second fluid pressure generator configure ate a fluid pressure for braking the vehicle; and
- a floid pressure controller configured to control the fluid pressure generated by the first fluid pressure generator and the floid pressure generated by the second fluid pressure generator based on the signal from the stroke sensor, wherein the stroke sensor is a first stroke sensor, the vehicle brake device further includes a second stroke sensor configured to output a signal in accordance with the stroke amount, the fluid pressure controller is a first fluid pressure controller configured to control the fluid pressure generated by the first fluid pressure generator, the vehicle brake system further comprising a second fluid pressure controller configured to control the fluid pressure generated by the second fluid pressure generator, wherein the vehicle brake device further includes:
- a first sensor output wire connected to the first fluid pressure controller and the first stroke sensor and configured to transmit the signal of the first stroke sensor to the first fluid pressure controller; and
- a second sensor output wire connected to the second fluid pressure controller and the second stroke sensor and configured to transmit the signal of the second stroke sensor to the second fluid pressure controller, the first fluid pressure controller obtains the signal of the second stroke sensor from the second fluid pressure controller, and the second fluid pressure controller obtains the signal of the first stroke sensor from the first fluid pressure controller.

6. A vehicle brake system comprising:
a vehicle brake device including:
- a brake pedal including a pedal part and a lever pa le out a rotational shaft according to an operation of the pedal part;
- a stroke sensor configured to output a signal in accordance with a stroke amount of the brake pedal;
- a housing rotatably supporting the lever part and being located in a vehicle compartment of a vehicle and on a partition wall that separates an outside of the vehicle compartment and an inside of the vehicle compartment; and
- a reaction force generator connected to the housing and the lever part and configured to generate a reaction force on the lever part in accordance with the stroke amount;
- a first fluid pressore generator configured to generate a fluid pressore for braking the vehicle;
- a second fluid pressure generator configured to generate a fluid pressure for braking the vehicle; and
- a fluid pressure controller configured to control the fluid pressure ger ted by the first fluid pressure generator and the fluid pressure generated by the second fluid pressure generator based on the signal from the stroke sensor, wherein the stroke sensor is a first stroke sensor, the vehicle brake device further includes a second stroke sensor configured to output a signal in accordance with the stroke amount, the fluid pressure controller is a first fluid pressure controller configured to control the fluid pressure generated by the first fluid pressure generator, the vehicle brake system further comprising a second fluid pressure controller configured to control the fluid pressure generated by the second fluid pressure generator, wherein the first fluid pressure controller includes:
- a first drive circuit configured to drive the first fluid pressure generator; and
- a first fluid pressure control portion configured to control the first drive circuit based on the signal of the first stroke sensor and the second stroke sensor to control the fluid pressure generated by the first fluid pressure generator, and the second fluid pressure controller includes:
- a second drive circuit configured to drive the second fluid pressure generator; and a second fluid pressure control portion configured to control the second drive circuit based on the signal of the first stroke sensor and the second stroke sensor to control the fluid pressure generated by the second fluid pressure generator.

* * * * *